United States Patent [19]
Veltman

[11] Patent Number: 5,481,543
[45] Date of Patent: Jan. 2, 1996

[54] RATIONAL INPUT BUFFER ARRANGEMENTS FOR AUXILIARY INFORMATION IN VIDEO AND AUDIO SIGNAL PROCESSING SYSTEMS

[75] Inventor: Markus H. Veltman, Tokyo, Japan

[73] Assignee: Sony Corporation, Tokyo, Japan

[21] Appl. No.: 258,248

[22] Filed: Jun. 10, 1994

Related U.S. Application Data

[63] Continuation-in-part of Ser. No. 32,341, Mar. 16, 1993, Pat. No. 5,396,497.

[30] Foreign Application Priority Data

Jun. 10, 1993 [JP] Japan .................................. 5-138109

[51] Int. Cl.$^6$ ................................ H04J 3/00; H04N 7/08
[52] U.S. Cl. ...................... 370/94.1; 370/110.1; 370/112; 370/118; 348/423; 348/461; 348/465; 348/474
[58] Field of Search ............................ 370/79, 84, 94.1, 370/94.2, 100.1, 105.3, 109, 110.1, 112, 118; 348/423, 461, 464, 465, 512, 518, 473, 474, 384, 390; 358/320, 337, 339; 360/36.1, 36.2; 375/106, 111, 118, 25; 381/29, 31

[56] References Cited

U.S. PATENT DOCUMENTS

| | | | |
|---|---|---|---|
| Re. 33,535 | 2/1991 | Cooper ..................................... | 358/149 |
| 4,851,909 | 7/1989 | Noske et al. ........................... | 358/149 |
| 4,852,084 | 7/1989 | Verbiest et al. ......................... | 370/60 |
| 5,122,875 | 6/1992 | Raychandhuri et al. ............. | 370/110.1 |
| 5,148,272 | 9/1992 | Acampora et al. ................... | 370/110.1 |
| 5,260,978 | 11/1993 | Fleischer et al. ....................... | 375/106 |
| 5,267,036 | 11/1993 | Habraken et al. ...................... | 358/133 |

OTHER PUBLICATIONS

U.S. application Ser. No. 08/032,341, filed Mar. 7, 1995, Veltman.
International Organization for Standardization/Doc. AVC-323, Jul. 1992, "Test Model 2" Draft, Test Model Editing Committee, CCITT SG XV, ISO–IEC/JTC1/SC29/WG11/MPEG 92/NO245.

*Primary Examiner*—Hassan Kizou
*Attorney, Agent, or Firm*—Ian Hardcastle; Limbach & Limbach

[57] ABSTRACT

A method of generating a bit stream by multiplexing non-compressed auxiliary information with an information stream. The information stream is obtained by compressing fixed-size units of an information signal with a varying compression ratio to provide varying-sized units of the information stream. The auxiliary information is for use in subsequently processing the information stream. Units of the auxiliary information correspond to the units of the information signal. In the method, the information stream is divided in time into information stream portions. The non-compressed auxiliary information is also divided in time into auxiliary information portions. The information stream portions and the auxiliary information portions are interleaved to provide the bit stream. Finally, the information stream dividing, auxiliary information dividing, and interleaving steps are controlled by emulating decoding of the bit stream by a hypothetical system target decoder. The hypothetical system target decoder includes a demultiplexer that demultiplexes the bit stream, a serial arrangement of an information stream buffer and an information stream decoder, and a serial arrangement of an auxiliary information buffer and an auxiliary information processor. Each serial arrangement is connected to the demultiplexer. The information stream dividing, auxiliary information dividing, and interleaving steps are controlled such that the information stream buffer and the auxiliary information buffer neither overflow nor underflow.

31 Claims, 24 Drawing Sheets

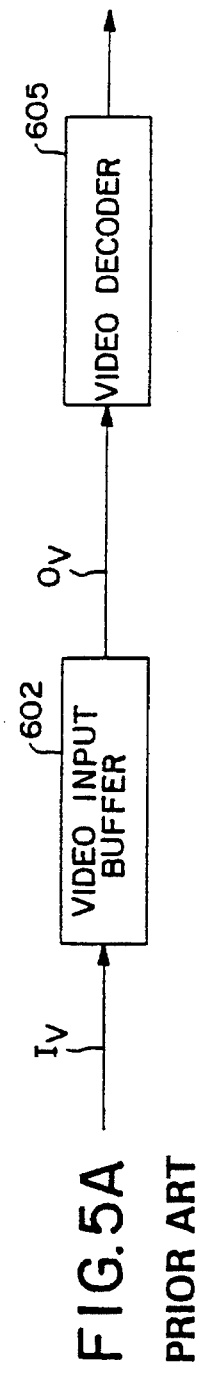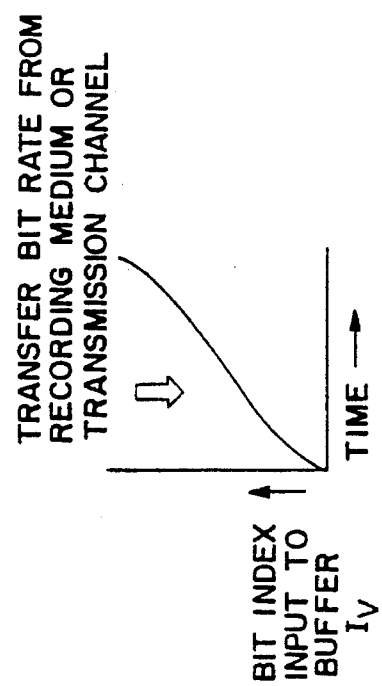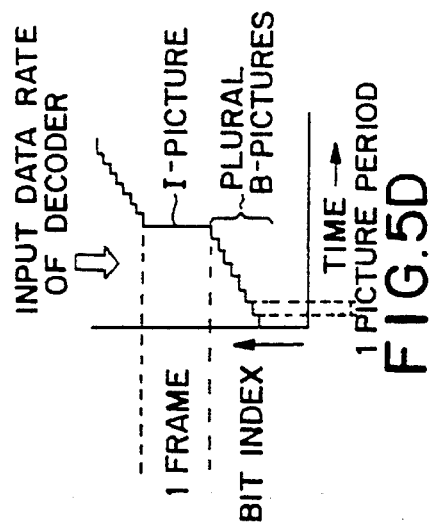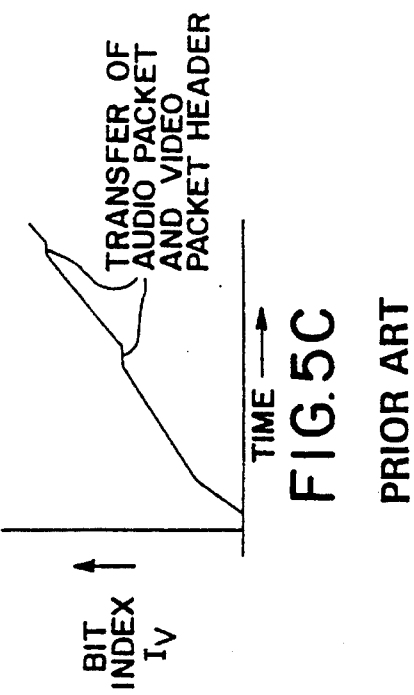

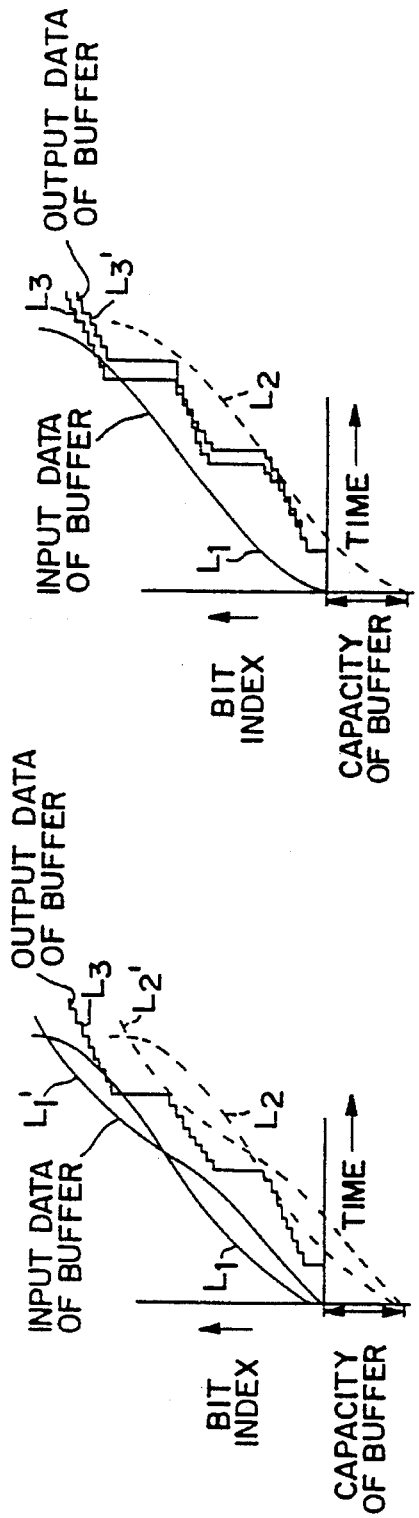
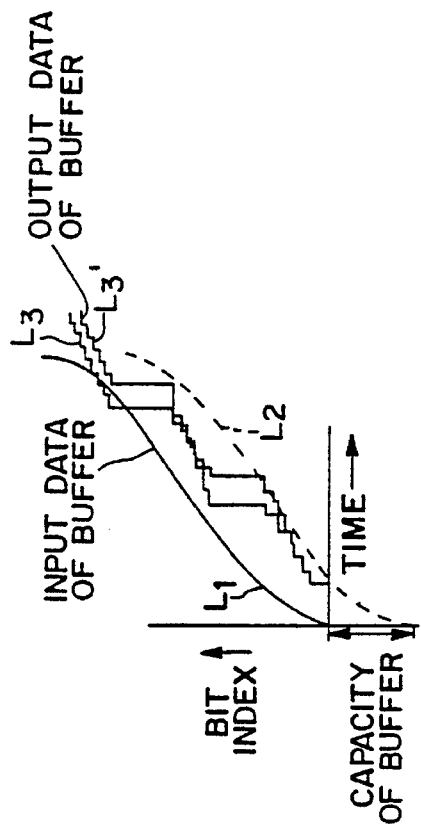

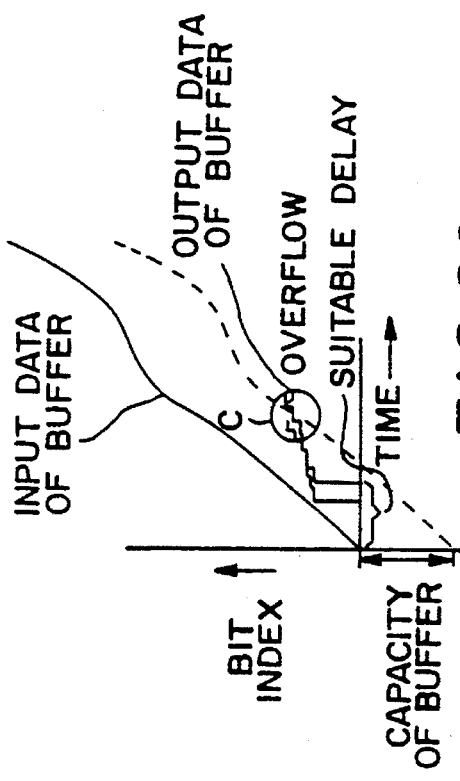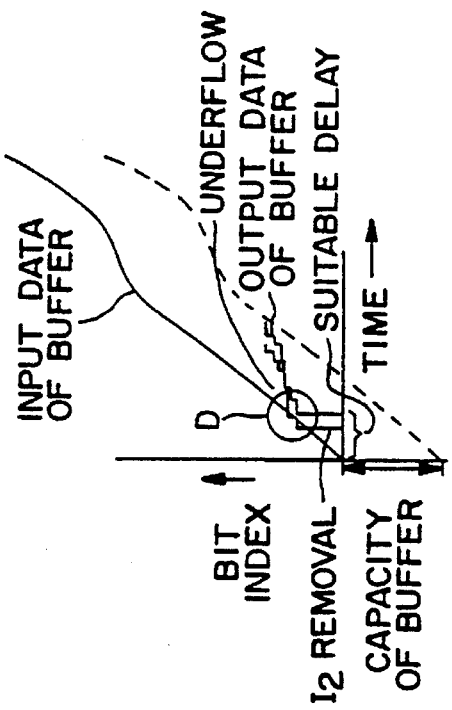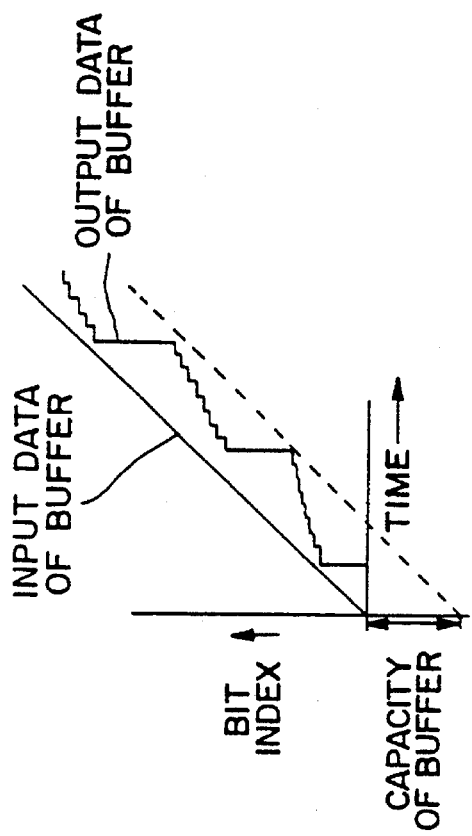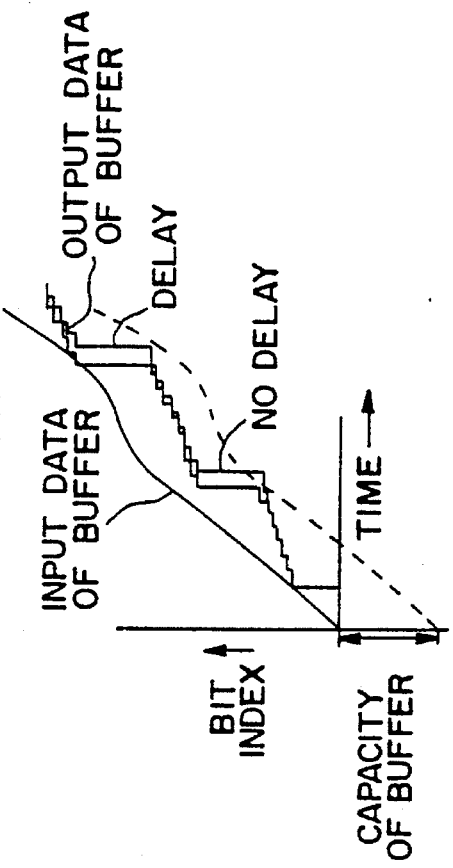

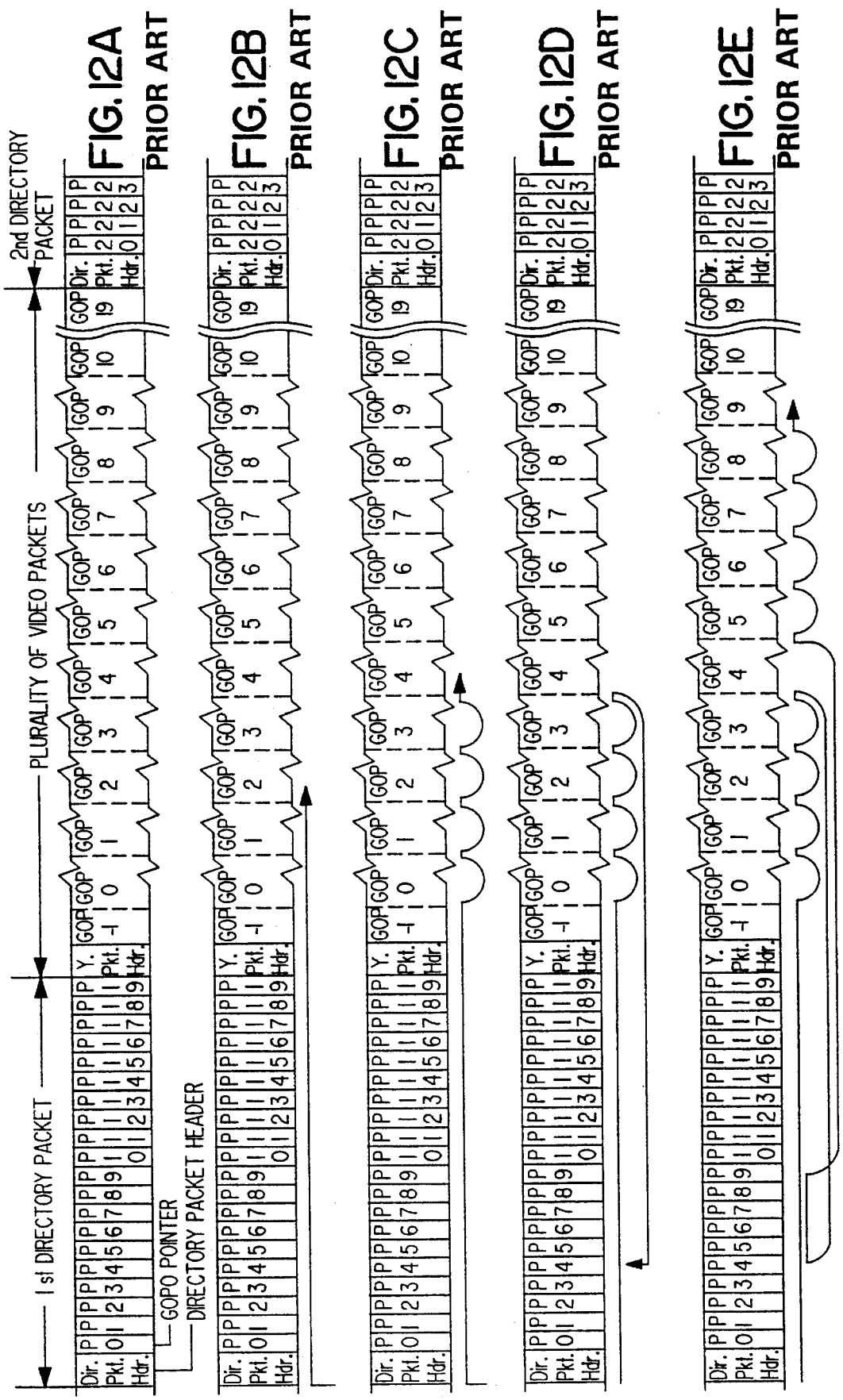

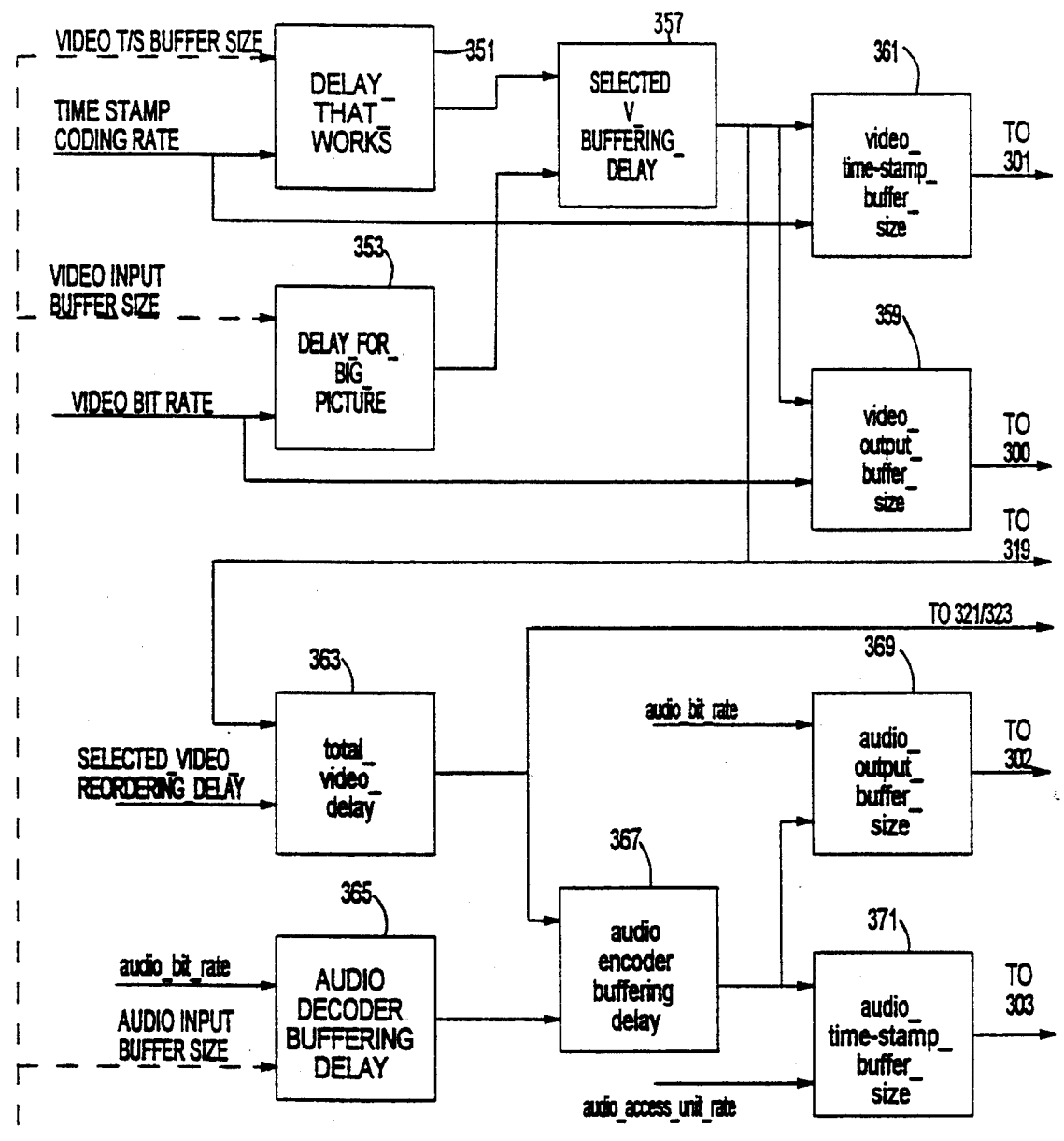
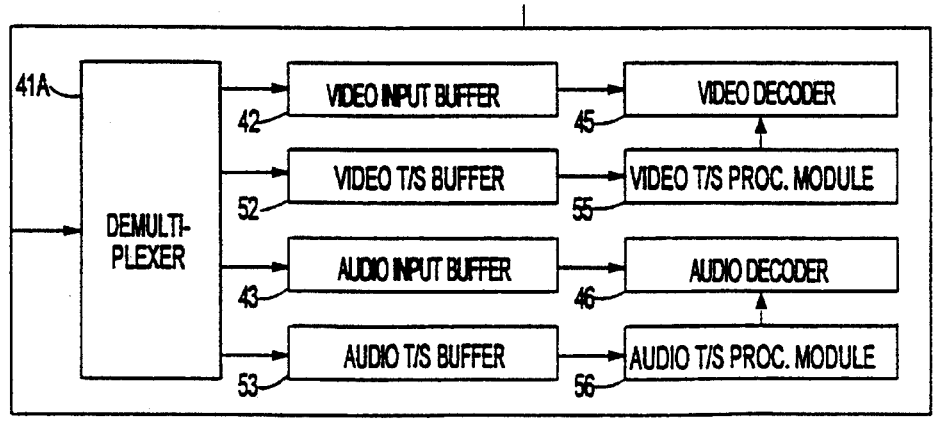
FIG.22B

RATIONAL INPUT BUFFER ARRANGEMENTS FOR AUXILIARY INFORMATION IN VIDEO AND AUDIO SIGNAL PROCESSING SYSTEMS

PRIOR APPLICATIONS

This application is a Continuation-in-Part of prior U.S. patent application Ser. No. 08/032,341, filing date 16 Mar. 1993, of Markus Hendrikus Veltman, now U.S. Pat. No. 5,396,497.

FIELD OF THE INVENTION

This invention relates to apparatus for compressing and expanding digital information signals, and, in particular, to the buffering of auxiliary information included with information signals compressed with a dynamically varying compression ratio.

BACKGROUND OF THE INVENTION

For storage on or distribution via such media as CD-ROMs, laser disks (LDs), video tapes, magneto-optical (MO) storage media, digital compact cassette (DCC), terrestrial or satellite broadcasting, cable systems, fibre-optic distribution systems, telephone systems, ISDN systems etc., video and audio signals are compressed and coded, and the resulting video stream and audio stream are then multiplexed to provide a bit stream for feeding to the medium. The bit stream is later reproduced from the medium, is demultiplexed, and the resulting video stream and audio stream are decoded and expanded to recover the original audio and video signals.

Two of the main international standards related to compressing audio and video signals for storage on or distribution via a medium are those known as MPEG-1 and MPEG-2. These standards have been established by the Motion Picture Experts Group (MPEG) operating under the auspices of the International Standards Organization (ISO) and the International Electrotechnical Committee (IEC).

The MPEG standards are established under the assumption that they will be used in a wide range of applications. As a result, the standards allow for such possibilities a phase-locked system, in which the sampling rate clock of the audio signal is phase locked to the same clock reference (SCR) as the frame rate clock of the video signal, and a non phase-locked system in which the sampling rate clock of the audio system and the frame rate clock of the video system operate independently. Irrespective of whether the system is phase locked, the MPEG standards require the addition of a time stamp to the multiplexed bit stream at least once every 0.7 s, and that the encoder provide separate time stamps for use by the audio decoder and by the video decoder.

One of the aims of the MPEG standards is to provide maximum flexibility for encoder and decoder design while ensuring that the bit stream provided by any encoder can be successfully decoded by any decoder. One of the ways in which this compatibility is established is by the concept of the System Target Decoder.

A typical audio and video signal processing system 110 according to the MPEG-1 and MPEG-2 standards is shown in FIG. 1. In this, the encoder 100 receives the video signal S2 from the video signal storage medium 2, and receives the audio signal S3 from the audio signal storage medium 3. The audio signal S3 could alternatively be (and is more usually) also received from the video signal storage medium 2 instead of from a separate audio storage medium.

The encoder 100 compresses and codes the video and audio signals, and multiplexes the resulting audio stream and video stream to provide the multiplexed bit stream S100, which is fed for storage or distribution by the medium 5. The medium can be any medium suitable for storing or distributing a digital bit stream, for example, a CD-ROM, a laser disk (LD), a video tape, a magneto-optical (MO) storage medium, a digital compact cassette (DCC), a terrestrial or satellite broadcasting system, a cable system, a fibre-optic distribution system, a telephone system, an ISDN system, etc.

The encoder 100 compresses and codes the video signal picture-by-picture. Each picture of the video signal is compressed in one of three compression modes. A picture compressed in the intra-picture compression mode is called an I-picture. In the intra-picture compression mode, the picture is compressed by itself without reference to other pictures of the video signal. Pictures compressed in the inter-picture compression mode are called P-pictures or B-pictures. A P-picture is compressed using forward prediction coding using as a reference picture a previous I-picture or P-picture, i.e., a picture occurring earlier in the video signal. Each block of a B-picture may use as a reference block any one of the following: a block of a previous I-picture or P-picture, a block of a following P-picture or I-picture (i.e., a picture occurring later in the video signal), or a block obtained by performing linear processing on a block of a previous I-picture or P-picture and block of a following I-picture or P-picture. In addition, blocks of a B-picture may be compressed in the intra-picture compression mode. Typically, about 150 kbits (kb; 1 kb=1024 bits) of the video stream are required for an I-picture, 75 kb of the video stream are required for a P-picture, and 5 kb of the video stream are required for a B-picture.

The digital video and audio processing system 110 also includes the decoder 600, which receives as its input signal the bit stream S5 from the medium 5. The decoder performs demultiplexing inverse to the multiplexing performed in the encoder 100. The decoder also applies decoding and expansion to the resulting audio stream and video stream using processing complementary to that performed by the encoder 100 to provide the recovered video signal 6A and the recovered audio signal 6B. The recovered video signal 6A and the recovered audio signal 6B respectively closely match the video signal S2 and the audio signal S3 fed into the encoder 100.

FIG. 1 also shows the system target decoder (STD) 400 which is used to define the processing performed by the encoder 100 and the decoder 600. In practical video and audio signal processing systems, the encoder seldom includes an actual system target decoder, but instead performs the encoding processing and multiplexing taking account of the system target decoder parameters. Also, in practical systems, the decoder is designed to have performance equalling or exceeding that of the system target decoder. These relationships between the system target decoder and the encoder and the decoder are indicated in FIG. 1 by the broken line labelled S4A interconnecting the system target decoder and the encoder, and the broken line labelled S4B interconnecting the system target decoder and the decoder.

The system target decoder 400 is also known as a hypothetical system target decoder, system reference decoder, or reference decoding processing system. From now on it will be referred to as a system target decoder.

System target decoders are defined in international standard specifications such as CCITT H.261 and the MPEG-1 standard to provide guidelines for the designers of video and audio encoders and decoders for these standards.

In the MPEG-1 system standard, the system target decoder includes a reference video decoder and a reference audio decoder. In addition, the system target decoder includes an input buffer for the reference video decoder and an input buffer for the reference audio decoder. The size of each input buffer is defined in the standard. The standard also defines the operation of the two reference decoders, especially with regard to the way in which they remove the audio stream and the video stream from their respective buffers.

The concept of the system target decoder provides compatibility between encoders and decoders of different designs as follows. All encoders are designed to provide a bit stream that can be successfully decoded by the system target decoder, and that does not cause the respective input buffers in the system target decoder to overflow or underflow. In addition, all decoders are designed to have performance parameters that are equal to or better than those defined for the system target decoder. As a result, all such decoders will be capable of successfully decoding the bit stream produced by any of the encoders designed to produce a bit stream capable of being decoded by the system target decoder. The bit stream produced for decoding by the system target decoder is called a "constraint system parameter stream."

The structure of the hypothetical system target decoder 400 shown in FIG. 1 is as follows. The demultiplexer 401 notionally receives the bit stream S100 from the encoder 100. The demultiplexer 401 demultiplexes the bit stream into a video stream and an audio stream. The video stream is fed to the video input buffer 402, the output of which is connected to the video decoder 405. The audio stream from the demultiplexer 401 is fed into the audio input buffer 403, the output of which is connected to the audio decoder 406. In the example shown in FIG. 1, the video input buffer 402 has a storage capacity of 46 k bytes and the audio input buffer 403 has a storage capacity of 4 k bytes, as specified by the MPEG-1 standard. The video decoder 405 removes the video stream from the video input buffer 402 one video access unit at a time, i.e., one picture at time, at a timing corresponding to the picture rate of the video signal, e.g., once every 1/29.94 seconds in an NTSC system. The amount of the video stream removed from the video input buffer for each picture varies because of the different amount of compression applied to each picture. The audio decoder 406 removes the audio stream from the audio input buffer 403 one audio access unit at a predetermined timing.

It is desirable from the standpoint of the construction of the system, and to maximize flexibility, that, in the real decoder 600, the element corresponding to the demultiplexer 401 in the STD include a switching circuit, and that the elements corresponding to the video decoder 405 and the audio decoder 406 in the STD be provided using a high-speed processor (DSP) having a configuration suitable for performing high-speed signal processing operations. Such processors normally cannot include a large amount of storage for cost reasons. Therefore, the MPEG standards take these practical considerations into account and set the storage capacities of the video input buffer 402 and the audio input buffer 403 to the relatively small values set forth above.

FIG. 2 shows the structure of the constraint parameter (multiplex) system bit stream CPSP that is notionally fed into the system target decoder 400. The bit stream shown in FIG. 2 has a multi-layer structure, and includes various headers in a multiplex layer and the audio stream and the video stream in a signal layer. In this structure, plural packs serially arranged in time. Each pack begins with a pack header, and includes at least one video packet and at least one audio packet. Each video packet begins with a packet header and includes the video stream of at least pan of at least one picture. One video packet will accommodate the video stream of more than one B-picture, but several video packets are required to accommodate the video stream of one I-picture. There is no requirement that a picture begin immediately after the packet header: the picture may start at any point in the video packet.

Each video packet header may include at least one video time stamp showing the presentation time of the first picture that begins in the packet. If the first picture is an I-picture or a P-picture, and its decoding time differs from its presentation time, a decoding time stamp may also be included. The purpose and use of the video time stamps will be described below.

Each audio packet includes at least one audio access unit of the audio stream, and begins with an audio packet header. The audio packet header may include a presentation time stamp showing the output timing of the audio signal obtained by decoding the first audio access unit beginning in the audio packet. Each audio access unit is about 384 bytes in MPEG-1.

FIG. 2 shows a video packet that includes the video stream of the end of the picture i, and the video stream of at least the beginning of the picture i+1. The video time stamp vts included in the video packet header shown is the video time stamp of the picture i+1, because the picture i+1 is the first picture that begins in the video packet. FIG. 2 also shows the audio packet that includes the audio signal of the end of the access unit j, and the audio signal of the access units j+1 and j+2. The audio time stamp ats included in the audio packet header is the time stamp of the audio access unit j+1, because the access unit j+1 is the first access unit that begins in the audio packet.

The encoder 100 compresses and codes the video signal S2 and at least codes the audio signal S3 to provide a video stream and an audio stream, respectively, and multiplexes the audio stream, the video stream, and the various headers to provide the multiplexed bit stream S100 having the format shown in FIG. 2. The encoder feeds the multiplexed bit stream to the medium 5 for transmission or storage. The multiplexed bit stream is such that, if the encoder had fed the multiplexed bit stream to the system target decoder 400 for decoding, the system target decoder would have decoded the multiplexed bit stream successfully, and no overflow or underflow would have occurred in either of the input buffers in the system target decoder.

Because of the requirement that the multiplexed bit stream S100 be capable of being successfully decoded by the system target decoder 400, the encoder 100 applies a dynamically-varying compression and coding processing to at least the video signal S2. The compression ratio of the compression applied by the encoder 100 varies with time. Moreover, since the amount of the video stream that can be used to represent a picture of the video signal S2 depends on the occupancy of the video input buffer of the system target decoder at the instant that the picture is compressed, the amount of compression applied to a given picture varies dynamically. The amount of the video stream derived from a given video sequence will differ if the given video sequence is processed on different occasions. Accordingly, the compression ratio of at least the video stream produced by the encoder 100 varies constantly.

As shown above, the audio stream and the video stream are time multiplexed to provide the multiplexed bit stream S100. The audio stream of the audio signal belonging to a given picture of the video signal is located in the multiplexed bit stream some time earlier or later than the video stream of the picture. As a result of this, the decoder 600 must provide timing synchronization between the recovered video signal produced by expanding the video stream, and the recovered audio signal produced by expanding the audio stream. To provide this synchronization, the MPEG standard stipulates that the encoder add the above-mentioned time stamps to at least some of the video packet headers and the audio packet headers. The video time stamps and the audio time stamps show timings prescribing the clocks to be used to perform synchronized decoding of the video stream and the audio stream. The video time stamps and the audio time stamps also show the times at which units (i.e., pictures) of the recovered video signal and units of the recovered audio signal obtained by expanding respective access units of the video stream and the audio stream are to be presented at the decoder output. Such timing information is necessary to prevent audio/video synchronization errors from occurring if the decoder is unable to decode lost or corrupted audio or video access units. This will be described in more detail below.

FIG. 3 shows the structure of the decoder 600. In the decoder 600, the demultiplexer 601 receives the multiplexed bit stream from the medium 5. The demultiplexer demultiplexes the multiplexed bit stream into the video stream, the video time stamps, the audio stream, and the audio time stamps. The video time stamps and the audio time stamps are respectively fed to the picture rate control circuit 698 and the sampling rate control circuit 699 for use in decoding the video stream and the audio stream, respectively. The video stream from the output of the demultiplexer 601 is fed into the video input buffer 602, which precedes the video decoder 605. The audio stream from the demultiplexer is fed into the audio input buffer 603, which precedes the audio decoder 606.

The video decoder 605 removes each access unit of the video stream from the video input buffer 602 for decoding in the order in which the access unit was received by the video input buffer. The video decoder 605 decodes the video stream removed from the video input buffer 602 in response to timing signals received from the picture rate control circuit 698. The picture rate control circuit is, in turn, controlled by the time stamps fed from the demultiplexer 601. Similarly, the audio decoder 606 removes each access unit of the audio stream from the audio input buffer 603 for decoding in the order in which the access unit was received by the audio input buffer. The audio decoder 606 decodes the audio stream removed from the audio input buffer 603 in response to timing signals received from the sampling rate control circuit 699. The sampling rate controller is, in turn, controlled by the audio time stamps fed from the demultiplexer 601.

The video input buffer 602 and the audio input buffer 603 will be described in detail next. The elementary streams entering the decoders must be buffered for the following reasons. The first reason is that, as mentioned above, the compression ratios constantly change. The second reason is that the average transfer rate of the elementary streams from the medium 5 differs from the average input rate of the elementary streams to its respective decoder, depending on clock error. The third reason is that the decoders normally receive access units of their respective streams intermittently, so that the instantaneous transfer rate of the elementary stream in the multiplexed bit stream S5 from the medium 5 and the instantaneous input rate of the elementary stream to its respective decoder do not match. Therefore, the input buffers 602 and 603 are provided between the demultiplexer 601 and the video decoder 605 and the audio decoder 606, respectively, to adjust the differences in the average transfer rate and the average input rate, and in the instantaneous transfer rate and the instantaneous input rate.

FIGS. 4B–4D are bit index curves showing the time dependency of the transfer of the audio stream in the multiplexed signal from the medium 5 into the audio input buffer 603 and the input of the audio stream into the audio decoder 606 from the audio input buffer. The arrangement of the audio input buffer 603 and the audio decoder 606 is shown in FIG. 4A.

The bit index curves show the relationship between the total number of bits (shown on the y-axis) that pass a given point in the circuit at the time indicated on the x-axis.

FIG. 4B shows the average bit index at the point IA at the input of the audio input buffer 603, which reflects the average rate at which the audio stream is transferred from the medium. The curve shows that the average transfer rate of the audio stream from the medium is more or less constant. However, the curve is not a straight line because the transfer rate varies with time due to clock drift.

FIG. 4C shows the actual bit index at the point $I_A$ at the input to the audio input buffer 603. No bits are fed into the audio input buffer at first, because the multiplexer is feeding the video stream into the video buffer. Then, the demultiplexer 601 encounters the first audio packet in the multiplexed bit stream, and feeds the audio access units contained therein into the audio input buffer 603. Following the first audio packet, the demultiplexer ceases transfer of the audio stream into the audio input buffer during the time it feeds the contents of the next video packet(s) into the video input buffer. Then, the demultiplexer encounters another audio packet in the multiplexed bit stream and feeds the audio access units contained therein into the audio input buffer. This process is repeated throughout the decoding process.

FIG. 4D shows the bit index at the point $O_A$ at the output of the audio input buffer 603 as the audio stream is removed from the audio input buffer by the audio decoder 606. The audio decoder removes the audio stream from the audio input buffer one access unit at a time. Removal of the access unit takes place instantaneously, once every 24 ms, for example.

When each picture of the video signal is compressed and subject to variable length coding in the encoder 100, the amount of video stream produced changes significantly from picture-to-picture, depending on the mode in which the video signal of the picture was compressed, as described above. Accordingly, the input rate at which the video decoder 605 removes the video stream from the video input buffer 602 also changes significantly from picture to picture. As a result, the storage capacity of the video input buffer 602 is required to be considerably larger than the storage capacity of the audio input buffer 603. For example, the MPEG-1 standard requires that the size, i.e., the storage capacity, of the video input buffer 602 be 46 k bytes, whereas the standard sets the size of the audio input buffer at only 4 k bytes.

FIGS. 5A–5D include three bit index curves showing the time dependency of the transfer of the video stream in the multiplexed signal from the medium 5 into the video input buffer 602 and the input of the video stream into the video decoder 605 from the video input buffer. The arrangement of the video input buffer 602 and the video decoder 605 is shown in FIG. 5A.

FIG. 5B shows the average bit index at the point $I_V$ at the input of the video input buffer 602, which reflects the average rate at which the video stream is transferred from the medium. The curve shows that the average transfer rate of the video stream from the medium is more or less constant. However, the curve is not a straight line because the transfer rate varies gradually with time due to clock drift.

FIG. 5C shows the actual bit index at the point $I_V$ at the input to the video input buffer 602. The video stream is first fed into the video input buffer at a substantially constant rate until the demultiplexer 601 encounters the first audio packet in the multiplexed bit stream. The multiplexer interrupts feeding the video stream into the video input buffer while it feeds the contents of the audio packet into the audio input buffer 603. During this interruption, the bit index remains unchanged. At the end of the first audio packet, the demultiplexer demultiplexes the video packet header of the following video packet, and then resumes transferring the video stream into the video input buffer until it encounters another audio packet in the multiplexed bit stream. This process is repeated throughout the decoding process.

FIG. 5D shows the bit index at the point $O_V$ at the output of the video input buffer 602 as the video stream is removed from the video input buffer by the video decoder 605. The video decoder removes the video stream from the video input buffer one access unit, i.e., one picture, at a time. Removal of the access unit takes place instantaneously, once every picture period, e.g., once every 33.4 ms in an NTSC system. The amount of the video stream removed each time depends on the mode in which the picture was compressed by the encoder. FIG. 5D shows an example in which a sequence of B-pictures is followed by an I-picture, which is followed by a sequence of B-pictures. It can be seen that a much greater amount of video stream is removed from the video input buffer for one I-picture than for one B-picture.

FIGS. 6A and 6B show the buffering provided by the video input buffer 602 or the audio input buffer 603. In these Figures, the video input buffer 602 is used as an example. The Figures are both bit index curves. FIG. 6A shows ideal buffering, in which the video input buffer 602 is used simply to accommodate the differences between the transfer rate of the video stream from the medium and the input rate of the video steam to the video decoder 605. The video stream is fed into the video input buffer 602 from the multiplexer 601 at a substantially constant transfer rate, as indicated by the straight line marked IS in FIG. 6A. The video decoder removes the video stream from the video input buffer one access unit, i.e., one picture, at a time, as shown. The amount of video stream removed for any one picture can vary from about 150 kbits for an I-picture to about 5 kbits for a B-picture. Thus, the video stream bit index at the output of the video input buffer changes in steps, the step size of which depends on the number of bits used to encode each picture, as indicated by the stepped curve marked OS.

In the ideal buffering illustrated in FIG. 6A, both of the following conditions are met at all times:

(a) the difference between the amount of the video stream transferred into the video input buffer 602 from the medium and the storage capacity of the video input buffer 602 (indicated by the broken line SC), does not exceed the amount of the video stream removed from the video input buffer by the video decoder, i.e., there is no overflow; and (b) the amount of the video stream removed from the video input buffer 602 by the video decoder 605 does not exceed the amount of the video stream transferred into the video input buffer from the medium, i.e., there is no underflow.

However, as illustrated in FIG. 6B an overflow or an underflow can sometimes occur in buffering. In FIG. 6B the transfer rate at which the video stream is received from the medium 5 varies with time. The video stream is otherwise similar to that shown in FIG. 6A. Initially, the video input buffer 602 receives an excess amount of video stream compared with that required by the video decoder 605, with the result that the video input buffer overflows at the point indicated by the letter A. Later, the transfer rate of the video stream received by the video input buffer falls below the demand of the video decoder for the video stream, with the result that the video input buffer underflows at point indicated by the letter B.

By controlling various ones of the parameters involved, input buffer overflow or underflow can be prevented. Some ways of preventing overflow or underflow are illustrated in the bit index curves shown in FIGS. 7A through 7C.

The first method illustrated in FIG. 7A is called the medium slave method. In this method, the amount of the video stream transferred from the medium 5 to the video input buffer 602 is controlled to prevent an overflow or underflow from occurring. Without such control, the transfer rate is indicated by the curve $L_1$. With control, the transfer rate is that indicated by the curve $L_{1'}$. The amount of the video stream transferred from the medium is controlled so that the following two conditions are satisfied:

(a) the difference between the amount of the video stream (indicated by curve $L_{1'}$) transferred into the video input buffer 602 from the medium and the storage capacity of the video input buffer does not exceed the amount of the video stream (indicated by the curve $L_3$) removed from the video input buffer by the video decoder 605, i.e., there is no overflow; and (b) the amount of the video stream (indicated by the curve $L_3$) removed by the video decoder 605 from the video input buffer 602 does not exceed the amount of the video stream (indicated by the curve $L_{1'}$) transferred into the video input buffer 602, i.e., there is no underflow.

The curve $L_2$ shows how controlling the amount of the video stream transferred into the video input buffer 602 from the medium controls the difference between the amount of the video stream transferred into the video input buffer and the storage capacity of the video input buffer. The curve $L_{2'}$ shows this difference when the amount of the video stream transferred into the video input buffer from the medium is not controlled.

The second method illustrated in FIG. 7B is called the decoder slave method. In this method, the picture rate of the video decoder is controlled to change the amount of the video stream removed from the video input buffer by the video decoder. The picture rate is controlled such that the following two conditions are both met:

(a) the amount of video stream (indicated by the curve $L_2$), which is the difference between the amount of the video stream (indicated by the curve $L_1$) fed into the video input buffer 602 and the storage capacity of the video input buffer, does not exceed the amount of the video stream (indicated by the curve $L_3'$) removed from the video input buffer by the video decoder 605, i.e. there is no overflow; and (b) the amount of the video stream (indicated by the curve $L_3'$) removed from the video input buffer by the video decoder does not exceed the amount of the video stream (indicated by the curve $L_1$) transferred into the video input buffer 602 from the medium, i.e., there is no underflow.

The actual amounts of the video stream removed from the video input buffer by the video decoder are indicated by the curve $L_{3'}$.

The above explanation is made with reference to the video stream, but similar results can be obtained for the audio stream by changing the sampling rate of the audio decoder 606 to adjust the rate at which the audio stream is removed from the audio input buffer 603.

The third method illustrated in FIG. 7C adjusts the amount of the video stream removed from the video input buffer 603 by the video decoder 605. For example, the method may cause the video decoder to skip decoding portions of the video stream or to repeat decoding portions of the video stream to adjust the amount of the video stream removed from the video input buffer.

The curve $L_3'$ shows the changes in the amount of the video stream removed from the video input buffer 602. To prevent an overflow from occurring early in the sequence, the amount of the video stream removed from the video input buffer is increased by removing some video access units from the video input buffer but not decoding them. Later, to prevent an underflow, the amount of the video stream removed from the input buffer is reduced by removing some video access units from the video input buffer and decoding them more than once. This provides additional pictures without removing video access units from the video input buffer.

Changing the picture rate of the video decoder, the sampling rate of the audio decoder, or the transfer rate of the multiplexed bit stream from the medium 5, as just described, causes undesirable side effects on the systems external to the video and audio signal processing system 110. Therefore, the changes just described cannot be made freely, and may only be made within a limited range. Consequently, it is desirable to control the multiplexed bit stream produced by the encoder so that the buffering requirements in the decoder can be met comfortably without having to resort to the correction methods just described.

Malfunctions in the buffering process are most likely to occur at the start of decoding. An underflow will result if the decoder attempts to remove an access unit of the stream from the input buffer before the whole of that access has been transferred into the input buffer from the medium. To prevent this, the decoding processing is started only after certain delay time has elapsed after transfer of the bit stream from the medium has begun. This allows the audio stream and the video stream to accumulate in the respective audio and video input buffers before the respective decoders start removing units of the audio stream and the video stream for decoding.

FIGS. 8A through 8D show some effects of a startup delay on buffering. FIG. 8A shows ideal buffering, similar to that shown in FIG. 6A. FIG. 8B shows the beneficial effect of a suitable startup delay when the multiplexed bit stream is transferred from the medium at a varying transfer rate. In FIG. 8B, the startup delay allows additional video stream to accumulate in the video input buffer 602 before the video decoder 605 starts to remove access units of the video stream from the video input buffer.

Care must be exercised in determining the optimum startup delay. FIG. 8C shows the effect of an excessively long startup delay. In FIG. 8C, the video decoder 605 waits too long before it starts to remove the video stream from the video input buffer 602. As a result, an overflow occurs at point C. FIG. 8D shows the effect of a startup delay that is too short. The short startup delay does not allow sufficient video stream to accumulate in the video input buffer before the video decoder starts to remove the video stream from the video input buffer for decoding. As a result, insufficient video stream has accumulated in the video input buffer when the video decoder tries to remove the video stream of the first I-picture 12, and an underflow occurs at point D. FIG. 8D also shows that, with a suitable start-up delay, the video stream of the first I-picture $I_2$ can be removed without causing an underflow.

FIG. 9 illustrates in detail how the multiplexed bit stream transferred from the medium 5 is processed by the demultiplexer 601, the video input buffer 602, and the video decoder 605 to decode the video stream in the multiplexed bit stream. The circuit arrangement of the multiplexer 601, the input buffer 603, and the video decoder 605 is shown at the top of the drawing.

An example of a portion of the multiplexed bit stream is shown at the left side of the drawing. The portion of the demultiplexed bit stream includes all of the pack n, and the beginning part of the pack n+1. Each pack begins with the pack header, which includes the clock reference SCR, which shows the decoding timing of the pack.

The pack n begins with the pack header (Pack Header n), and contains the video packet m, which, in turn, contains the video stream for the pictures i and i+1. The video packet m begins with the video packet header (V.Packet H), which includes the presentation time stamp PTSm and the decoding time stamp DTSm.

The pack n+1 follows the pack n, and includes the pack header (Pack Head n+1), which includes the clock reference SCRn+1. Following the pack header are the video packets m+1 and m+2, and possibly more video packets. Each of the video packets m+1 and m+2 includes a packet header including a decoding time stamp DTS, and the video stream of one picture.

FIG. 9 also shows the bit index curves for the input (marked $I_V$) and the output (marked $O_V$) of the video input buffer 602. Various events in the multiplexed bit stream are linked to the bit index curves with broken lines, and are also shown on the x-axis of the bit index curve. The bit index curve $I_V$ represents the bit index of the video stream transferred to the video input buffer 602 from the medium 5 via the demultiplexer 601. The bit index curve $O_V$ represents the bit index of the video stream removed from the video input buffer by the video decoder 605.

The multiplexed bit stream is processed as follows: at the timing indicated by the clock reference SCRn in the pack header of the pack n, the video stream contained in the pack n, i.e., the video stream of the pictures i and i+1, is transferred via the demultiplexer 601 to the video input buffer 602. Then, at the timing indicated by the clock reference SCRn+1 the video stream contained in the pack n+1 is transferred into the video input buffer 602 via the demultiplexer 601. The time stamps in the video packet headers are stored elsewhere.

Later, at the time indicated by the decoding time stamp DTSm in the header of the video packet m, the video stream of the picture m is instantaneously removed from the video input buffer 602 by the video decoder 605. Then, one picture period later, the video stream of the picture i+1, which was also included in the video packet m, is removed from the video input buffer by the video decoder. Later, at the timing indicated by the decoding time stamp DTSm+1 included in the packet header of the video packet m+1, the video stream of the picture i+2, which is the first picture beginning in the video packet m+1, is removed from the video input buffer 602 by the video decoder 605.

At the time indicated by the decoding time stamp DTSm+2 in the packet header of the video packet m+2, the video stream of the picture i+3, which is the first picture beginning in the video packet m+2, is removed from the video input buffer 602 by the video decoder 605. Following removal of the video stream of the picture i+3, the video streams of the pictures whose video streams follow the video stream of the picture i+ in the video packet i+3, are removed from the video input buffer 602 at times that are increments of one picture period later than the time indicated by the decoding time stamp DTSm+2.

The timings indicated by the time stamps may be stored as absolute timings using, for example, a crystal oscillator and a reference clock of 90 kHz. In this way it is possible to use the difference between the clock reference and the time stamps as the start-up delay.

As mentioned above, when a decoder according to the MPEG standard is used for decoding an audio stream and a video stream, it is necessary to synchronize the times at which units of the respective decoded signals resulting from decoding corresponding access units of the audio stream and the video stream are fed to the decoder output. The time at which a decoded signal unit is fed to the decoder output is called the presentation time of that unit. The time stamps in the multiplexed bit stream are used to provide this synchronization.

Part of providing the necessary synchronization includes reordering the video signal resulting from decoding the video stream. This is illustrated in FIG. 10. As mentioned above, the video stream includes the video streams of pictures that are compressed as I-pictures, as P-pictures, and as B-pictures. Of these pictures, the decoding time and the presentation time are only the same for B-pictures. Incidentally, the decoding time and the presentation time are also the same for the audio stream. I-pictures and P-pictures have a presentation time that is later by a number of picture periods than the decoding time. The video decoder 605 removes the video stream of an I-picture or a P-picture from the video input buffer 602 at the time indicated by the decoding time stamp DTS. After the video stream of a picture has been decoded, the resulting decoded video signal is temporarily stored in the video decoder output buffer 611. Then, at the time indicated by a presentation time stamp PTS, the video signal of the picture is fed from the video decoder output buffer to the output of the video decoder 605 to provide a picture of the video output signal.

For example, in FIG. 10, the video stream of the I-picture $I_2$ is removed from the video input buffer 602 at the time indicated by the display time stamp DTSm for decoding, and the resulting video signal is stored in the output buffer 611 provided in the video decoder 605 for temporarily storing the video signals of decoded I-pictures and P-pictures.

Then, the video decoder 605 consecutively removes the video streams of the B-pictures $B_0$ and $B_1$ from the video input buffer 602, consecutively decodes them, and feeds the resulting video signals to its output one picture period apart.

Next, the video decoder 605 removes the video stream of the P-picture $P_5$ from the video input buffer 602. The video decoder instantaneously decodes the video stream, and stores the resulting video signal in the output buffer 611. Also, at the time indicated by the presentation time stamp PTS of the I-picture $I_2$, which has the same value as the decoding time stamp of the P-picture $P_5$, the video decoder feeds the video signal of the picture $I_2$ to its output.

Finally, in this example, the video decoder 605 consecutively removes the video streams of the B-pictures $B_3$ and $B_4$ from the video input buffer 602, consecutively decodes them using the stored pictures $I_2$ and $P_5$ as reference pictures, and feeds the resulting video signals to its output one picture period apart.

Since the video streams of I-pictures and P-pictures differ in their decoding timing and their presentation timing, a presentation time stamp and a decoding time stamp, respectively indicating the presentation time and the decoding time, are included in the video packet headers of the video packets in which the video streams of I-pictures or P-pictures begin. However, both types of time stamps need not be included, because, according to the MPEG decoding rules, the presentation time of each I-picture or P-picture is the same as the decoding time of the following I-picture or P-picture. In other words, the decoding time stamps can be omitted, and each I-picture or P-picture can be decoded at the time indicated by the presentation time stamp of the previous I-picture or P-picture.

FIG. 10 also shows the consequence of the differing decoding and presentation times of the MPEG video signal. It can be seen from the bit index curve that the video decoder removes the video streams of the pictures from the video input buffer in the order in which they were transferred into the input buffer from the medium 5, i.e., in non-sequential picture order. However, the presentation time stamps of the pictures cause the pictures to be displayed in their sequential order shown at the bottom of the Figure.

As stated above, the time stamps are included in the multiplex layer of the multiplexed bit stream, and not in the audio or video stream layer. This means that when the multiplexed bit steam is demultiplexed in the decoder, the correlation between the time stamps and the access units to which they pertain is lost. The decoder must therefore include a provision to link the time stamps extracted from the multiplexed bit stream with their respective access units. One approach is shown in FIGS. 11A and 11B.

In FIG. 11A, the decoder 600 includes the demultiplexer 601, which receives the multiplexed bit stream from the medium 5. The demultiplexer demultiplexes the video stream and the video time stamps from the multiplexed bit stream and feeds these into the video stream reconfiguration unit 692. The demultiplexer also demultiplexes the audio stream and the audio time stamps from the multiplexed bit stream and feeds these into the audio stream reconfiguration unit 693. The output of the video stream reconfiguration unit is fed into the video input buffer 602, which precedes the video decoder 605. The decoding in the video decoder is controlled by the picture rate control circuit 698 in response to the video time stamps. The output of the audio stream reconfiguration unit 693 is fed into the audio input buffer 603, which precedes the audio decoder 606. Decoding in the audio decoder is controlled by the sampling rate control circuit 699 in response to the audio time stamps.

The demultiplexer 601 receives the multiplexed bit stream S5 from the medium 5 and separates it into the video stream, the video time stamps, the audio stream, and the audio time stamps. The video stream and the video time stamps are fed into the video stream reconfiguration unit 692, which inserts the video time stamps into the video stream. For example, a video time stamp is inserted between the picture i and the picture i+1 shown in FIG. 11B. The video stream, reconfigured as shown in FIG. 11B, is fed to the video input buffer 602, where it is temporarily stored. The video decoder 605 removes the video stream, including the video time stamps, from the video input buffer 602 in the order in which it was received by the video input buffer.

In a similar manner, the audio stream reconfiguration unit 693 receives the audio stream and the audio time stamps from the multiplexer 601 and inserts the audio time stamps into the audio stream. For example, an audio time stamp is inserted between the access unit j and the access unit j+1 of the audio stream shown in FIG. 11B. The audio stream, reconfigured as shown in FIG. 11B, is then fed from the audio stream reconfiguration unit to the audio input buffer 603, where it is temporarily stored. The audio decoder 606 removes the audio stream, including the audio time stamps, from the audio input buffer in the order in which it was received by the audio input buffer.

The video decoder 605 decodes the video stream removed from the video input buffer 602 in response to timing signals received from the picture rate control circuit 698. The picture rate control circuit is, in turn, controlled by the time stamps fed from the video decoder. Similarly, the audio decoder 606 decodes the audio stream removed from the audio input buffer 603 in response to timing signals received from the sampling rate control circuit 699. The sampling rate controller is, in turn, controlled by the audio time stamps fed from the audio decoder.

The decoder just described solves the problem of correlating the time stamps included in the multiplex layer with the video and audio access units to which they belong. However, embedding the time stamps into the audio and video streams results in streams that are no longer standard. A decoder that is suitable for decoding, for example, a video stream with embedded time stamps would be unsuitable for decoding a video stream in an application in which time stamps are not used. It is therefore preferable to correlate the time stamps with the access units to which they belong in a way that does not result in a non-standard stream and a non-standard decoder.

Recently, the MPEG standards have permitted packets of information other than an audio stream or a video stream to be included in the multiplexed bit stream. For example, packets of directory information may be added to the bit stream. Directory information allows pictures to be displayed during fast forward operations by providing the address of successive access points in the multiplexed bit stream. An access point is a access unit can be decoded without requiring that another access unit be decoded. For example, a video access point is a picture that is wholly or partially coded using intra-picture coding. An access point is normally located at the beginning of each Group of Pictures.

The MPEG standards stipulate that the packets containing directory information (directory packets) be interleaved with the audio packets and the video packets in the multiplexed bit stream, and also stipulate that a directory information buffer be provided in the decoder. However, the MPEG standards define neither the size nor the operation of the directory buffer. Because of the memory constraints in processors used in MPEG decoders, decoder designers allocate relatively little memory for buffering the directory information. Moreover, encoder designers have customarily made the directory packets relatively large, so that the directory packets occur relatively rarely in the multiplexed bit stream.

The impact of the present relationship between the directory buffer size and the size and spacing of the directory packets on the fast-forward operation of a video tape recorder is shown in FIGS. 12A–12E. FIG. 12A shows the arrangement of part of the multiplexed bit stream as recorded on the video tape. The directory packet consists of the directory packet header (Dir.Pkt.Hdr), followed by a set of directory entries, one directory entry for each one of the following Groups of Pictures. Following the directory packet are plural video packets containing the video stream of the Groups of Pictures. Since, in this example, there are 20 Groups of Pictures following the directory packet, the directory packet includes 20 directory entries. In these Figures, the audio packets interleaved with the video packets have been omitted to simplify the drawing.

During the fast-forward operation, the directory packet header is recognized, and the contents of the directory packet are read from the tape, and transferred into the directory buffer, as shown in FIG. 12B. However, since the directory buffer typically has a capacity of about 500 bits, and each directory typically requires about 100 bits, the directory buffer overflows after the first five directory entries have been stored.

After the contents of the directory packet have been reproduced from the tape, the address of the beginning of the first Group of Pictures (GOP 0) is read from the directory buffer, and the tape is advanced to this address to enable the access point at the beginning of the first Group of Pictures to be reproduced from the tape, as shown in FIG. 12C. While this picture is being decoded for display, the address of the beginning of the second Group of Pictures (GOP 1 ) is read from the directory buffer, and the tape is advanced to this address to enable the access point, e.g., I-picture, at the beginning of the second Group of Pictures to be reproduced from the tape, also as shown in FIG. 12C. This process is repeated, as shown in FIG. 12C up to the fifth Group of Pictures (GOP 4), after which the contents of the directory buffer are exhausted.

Then, the tape has to be rewound back to the directory packet to reproduce the next five of the directory entries. These directory entries are stored in the directory buffer, as shown in FIG. 12D. The tape recorder then uses these five new directory entries to fast forward through the pictures at the beginnings of the sixth through tenth Groups of Pictures (GOPs 5–9), as shown in FIG. 12E. In all, the directory packet must be reproduced four times for the pictures at the beginning of each of the twenty Groups of Pictures GOP 0–COP 19 to be reproduced.

The mismatch between the directory buffer capacity, and the size and spacing of the directory packets makes the fast forward operation an extremely slow one if pictures are to be reproduced during the fast-forward operation, something that is routine during the fast forward operation in an analog video tape recorder.

Using a larger directory buffer is not a complete solution to the problem just described (although a larger buffer may reduce the seriousness of the problem) because the MPEG standards do not define the size and operation of the directory packet. Hence, no matter how large the directory buffer is made, the possibility of a directory packet larger than the directory buffer always exists.

As an alternative to embedding time stamps in the audio and video streams following demultiplexing, it has been proposed to provide time stamp buffers to store the time stamps until they are needed. Separate buffers may be provided for the time stamps relating to audio access units and for the time stamps relating to video access units. Again, the MPEG standards include no direct specification for the size and operation of these buffers. However, the current MPEG standards require that the system target decoder have a maximum buffering delay of one second for both audio and video. This means that the time stamps need only be buffered for a maximum of one second, which enables the maximum size of the time stamp buffers to be calculated. If a time stamp is provided for each picture in the video stream, a buffer capacity of 30 time stamps must be provided for the video time stamps. Similarly, if a time stamp is provided for each audio access unit, a buffer capacity of 115 time stamps must be provided for the audio time stamps.

In the manner just described, the MPEG standards indirectly impose maximum size on the audio and video time stamp buffers. However, this way of setting the maximum size of the time stamp buffers has an undesirable side effect, namely, it makes the MPEG standards unsuitable for use in applications in which a longer buffer delay is necessary. For example, the low picture-rate, low bit-rate video signal shown in FIG. 13, although otherwise capable of being multiplexed according to an MPEG-standard bit rate, cannot be multiplexed by the MPEG standard because it requires a decoder buffer delay of about 5 seconds.

Since the MPEG standards are meant to be used in many applications, it is desirable to eliminate the maximum delay requirement defined by the MPEG standard and to establish instead a more rational way of defining the time stamp buffer sizes.

SUMMARY OF THE INVENTION

The invention provides a method of generating a bit stream by multiplexing non-compressed auxiliary information with an information stream. The information stream is obtained by compressing fixed-size units of an information signal with a varying compression ratio to provide varying-sized units of the information stream. The auxiliary information is for use in subsequently processing the information stream. Units of the auxiliary information correspond to the units of the information signal. In the method, the information stream is divided in time into information stream portions. The non-compressed auxiliary information is also divided in time into auxiliary information portions. The information stream portions and the auxiliary information portions are interleaved to provide the bit stream. The information stream dividing, auxiliary information dividing, and interleaving steps are controlled by emulating decoding of the bit stream by a hypothetical system target decoder. The hypothetical system target decoder includes a demultiplexer that demultiplexes the bit stream, a serial arrangement of an information stream buffer and an information stream decoder, and a serial arrangement of an auxiliary information buffer and an auxiliary information processor. Each serial arrangement is connected to the demultiplexer. The information stream dividing, auxiliary information dividing, and interleaving steps are controlled such that the information stream buffer and the auxiliary information buffer neither overflow nor underflow.

The demultiplexer receives the bit stream and extracts from the bit stream the information stream and the auxiliary information for feeding to the information stream buffer and the auxiliary information buffer, respectively. The information stream buffer and the auxiliary information buffer respectively have a first target size and a second target size. The information stream decoder removes the varying-sized units of the information stream from the information stream buffer at a first target timing, and the auxiliary information processor removes the corresponding fixed-sized units of the auxiliary information from the auxiliary information buffer at a second target timing.

According to the method, when the bit stream is a multi-layered bit stream, the interleaving step may interleave the information stream portions and the auxiliary information portions in the same one of the layers of the bit stream, or may interleave the information stream portions and the auxiliary information portions in different layers of the bit stream.

The auxiliary information may be directory information for the information stream, in which case, the information stream may include plural access points, and each unit of the directory information relates to one of the access points. The information stream may comprise plural access units, and the auxiliary information may be a set of time stamps for decoding the access units of the information stream.

The invention also provides an encoder for generating a bit stream. The encoder includes a compressor that compresses fixed-sized units of an information signal with a varying compression ratio to provide varying-sized units of an information stream. An information stream divider divides the information stream in time into information stream portions. An auxiliary information divider divides non-compressed auxiliary information in time into auxiliary information portions. The auxiliary information is for use in subsequently decoding the information stream. Units of the auxiliary information correspond to the units of the information signal. A multiplexer sequentially arranges the information stream portions and the auxiliary information portions to provide the bit stream. The multiplexer includes a controller that controls the information stream divider and the auxiliary information divider by emulating decoding of the bit stream by a system target decoder. The system target decoder includes a demultiplexer that demultiplexes the bit stream, a serial arrangement of an information stream buffer and an information stream decoder, and a serial arrangement of an auxiliary information buffer and an auxiliary information processor. Each of the serial arrangements is connected to the multiplexer. The controller controls the information stream divider and the auxiliary information divider such that the information stream buffer and the auxiliary information buffer neither underflow nor overflow.

The invention also provides a system in which an information signal is compressed for transfer, together with non-compressed auxiliary information, to a medium as a bit stream and in which the bit stream is transferred from the medium and is processed to recover the information signal by expansion, and to recover the auxiliary information. The auxiliary information is for use in processing the information signal. The system comprises an encoder and a decoder.

The encoder comprises an information signal compressor that provides an information stream by compressing fixed-sized units of the information signal with a varying compression ratio to provide varying-sized units of the information stream. The encoder also includes an multiplexer that sequentially arranges time-divided portions of the information stream and time-divided portions of the non-compressed auxiliary information to provide the bit stream for transfer to the medium. The multiplexer includes a controller that determines the division of the information stream and of the auxiliary information into the respective time-divided portions by emulating decoding of the bit stream by a hypothetical system target decoder. The hypothetical system target decoder includes a demultiplexer that demultiplexes the bit stream, a serial arrangement of an information stream buffer and an information stream decoder, and a serial arrangement of an auxiliary information buffer and an auxiliary information processor. Each serial arrangement is connected to the demultiplexer.

The decoder is similar to the system target decoder and includes demultiplexer that extracts the information stream and the auxiliary information from the bit stream transferred from the medium. A first input buffer receives the auxiliary information from the demultiplexer, and a circuit removes a unit of the auxiliary information from the first input buffer. The first input buffer has a size of at least the size of the auxiliary information buffer. A second input buffer receives the information stream from the demultiplexer. The second input buffer has a size of at least the size of the information stream buffer. A decoder removes one of the varying-sized units of the information stream from the second input buffer and for expands the removed unit of the information stream to recover a unit of the information signal.

The invention also provides a decoder for a bit stream obtained by multiplexing non-compressed auxiliary information with an information stream. The information stream is obtained by compressing fixed-size units of an information signal with a varying compression ratio to provide varying-sized units of the information stream. The auxiliary information is for use in subsequently processing the information stream. Units of the auxiliary information correspond to the units of the information signal. The decoder comprises a demultiplexer that extracts the information stream and the auxiliary information from the bit stream. A first input buffer receives the auxiliary information from the demultiplexer, and a circuit removes a unit of the auxiliary information from the first input buffer. A second input buffer receives the information stream from the demultiplexer. A decoder removes one of the varying-sized units of the information stream from the second input buffer in response to the unit of auxiliary information, and expands the removed unit of the information stream to recover a unit of the information signal.

The invention further provides a method of deriving a bit stream from an information signal. In the method, an encoder is provided. The encoder includes a compressor that compresses units of the information signal to provide access units of an information stream. A first buffer having a first size buffers the access units of the information stream. A circuit provides a time stamp each time the first buffer receives an access unit of the information stream. A second buffer having a second size buffers the time stamps. A multiplexer multiplexes the information stream and the time stamps to provide the bit stream.

A hypothetical system target decoder for decoding the multiplexed bit stream is defined. The hypothetical system target decoder includes a demultiplexer for demultiplexing the bit stream, a serial arrangement of an information stream buffer and an information stream decoder, and a serial arrangement of a time stamp buffer and a time stamp processor. Each serial arrangement is connected to the demultiplexer.

The size of the first buffer and the size of the second buffer are determined by emulating decoding of the bit stream using the hypothetical system target decoder. Then, the information signal is encoded using the encoder with the size of the first buffer and the size of the second buffer set to the respective sizes determined by the determining step.

Finally, the invention provides a method for deriving a bit stream from an information signal. In the method, units of the information signal are compressed to provide units of an information stream. The units of the information stream include access points. Pointers pointing the access points in the information stream are derived from the information stream. Then, the information stream, divided into information packets, is multiplexed together with pointer packets to provide the bit stream. The multiplexing is performed such that a set of information packets containing plural consecutive access points is multiplexed adjacent a pointer packet containing the pointers pointing only to the plural consecutive access points.

BRIEF DESCRIPTION OF THE DRAWINGS

FIG. 5A shows the video input buffer and video decoder in the decoder of the system shown in FIG. 1.

FIG. 5B is a bit index curve showing the average bit index at the input of the video input buffer in the decoder of the system shown in FIG. 1.

FIG. 5C is a bit index curve showing the actual bit index at the input of the video input buffer in the decoder of the system shown in FIG. 1.

FIG. 5D is a bit index curve showing the bit index at the output of the video input buffer

FIGS. 7A, 7B, and 7C show various ways of remedying buffering errors in the video input buffer in the decoder of the system shown in FIG. 1.

FIGS. 8A, 8B, 8C, and 8D show the effect of the buffering start up delay on the buffering provided by the video input buffer in the decoder of the system shown in FIG. 1.

FIGS. 12A–12E show the effect of the known way of multiplexing directory packets into the multiplexed bit stream on the fast-forward operation of a video tape recorder.

FIG. 22B is a block diagram illustrating the process by which the operational parameters of the encoder shown in FIG. 22A are determined with reference to the second embodiment of the system target decoder according to the invention.

DETAILED DESCRIPTION OF THE INVENTION

The invention expands the definition of the system target decoder (STD) to include an input buffer and a decoder for each stream of non-compressed auxiliary information, such as time stamps and directory information, in addition to the input buffer and decoder for the audio stream and the input buffer and decoder for the video stream. As a consequence of the redefined STD, a practical decoder according to the invention will include an input buffer and a decoder for each stream of auxiliary information in addition to the respective input buffer and decoder for each of the audio stream and the video stream. Finally, an encoder according to the invention multiplexes the audio stream, the video stream, and each of the auxiliary information streams taking account of the parameters of the modified STD according to the invention.

This approach allows many different types of auxiliary information streams to be included in the multiplexed bit stream provided that (a) an input buffer and a decoder is provided in the system target decoder for each auxiliary information stream, and (b) each auxiliary information stream is included in the multiplexed bit stream such that none of the input buffers in the STD overflows or underflows.

Figure 14:
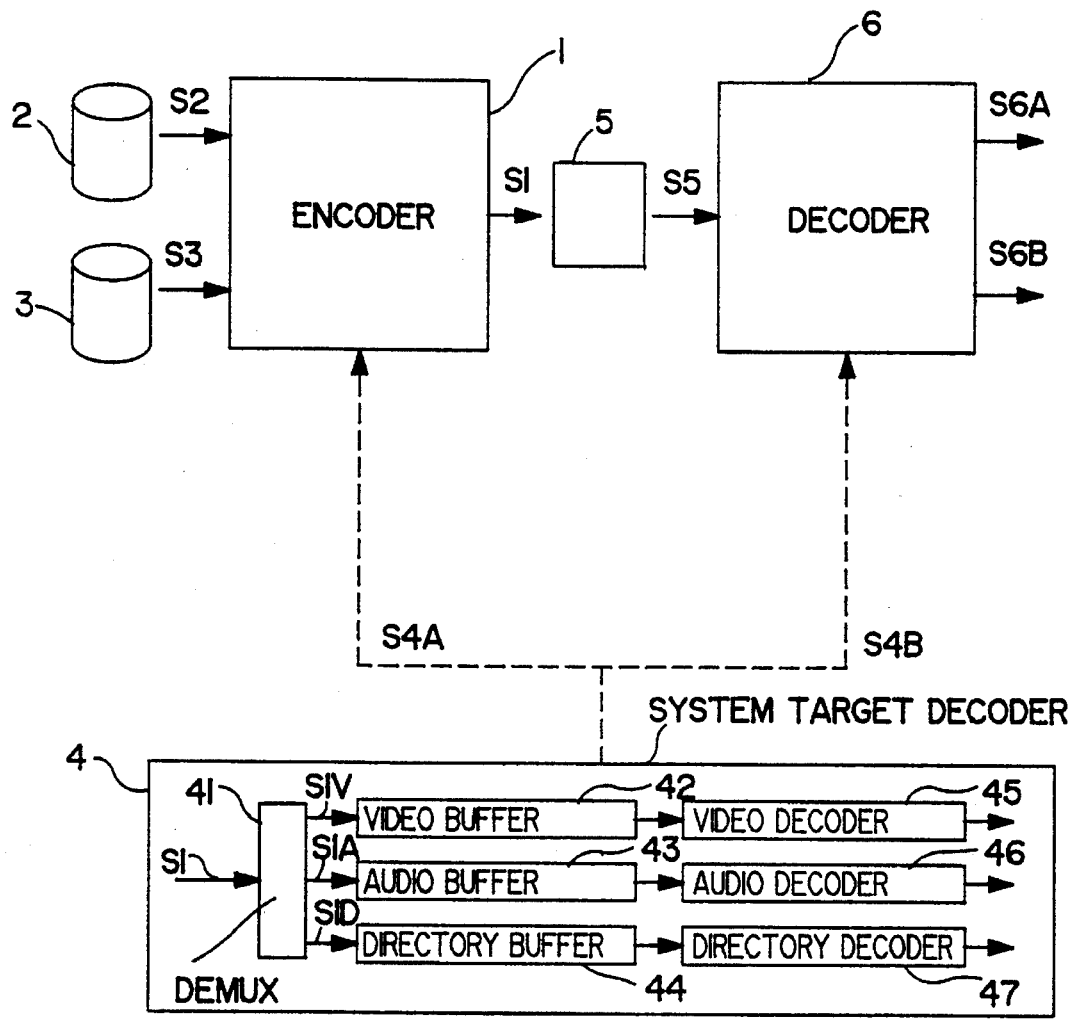
FIG. 14 is a block diagram of a first embodiment of an encode/decode system according to the invention for an audio signal and a video signal, showing the relationship between the system and a first embodiment of a system target decoder according to the invention.

A first embodiment of an encode/decode signal processing system 10 according to the invention, in which a directory input buffer and a directory decoder are provided according to the invention in the system target decoder, is shown in FIG. 14.

In this, the encoder 1 receives the video signal S2 from the video signal storage medium 2, and receives the audio signal S3 from the audio signal storage medium 3. The audio signal S3 could alternatively be (and is more usually) also received from the video signal storage medium 2 instead of from a separate audio storage medium.

The encoder 1 compresses and codes the video and audio signals, and multiplexes the resulting audio stream and video stream to provide the multiplexed bit stream S1, which is fed to the medium 5 for storage or distribution. The medium can be any medium suitable for storing or distributing a digital bit stream, for example, a CD-ROM, a laser disk (LD), a video tape, a magneto-optical (MO) storage medium, a digital compact cassette (DCC), a terrestrial or satellite broadcasting system, a cable system, a fibre-optic distribution system, a telephone system, an ISDN system, etc.

The encoder 1 compresses and codes the video signal picture-by-picture. Each picture of the video signal is compressed in one of three compression modes. A picture compressed in the intra-picture compression mode is called an I-picture. In the intra-picture compression mode, the picture is compressed by itself without reference to other pictures of the video signal. Pictures compressed in the inter-picture compression mode are called P-pictures or B-pictures. A P-picture is compressed using forward prediction coding using as a reference picture a previous I-picture or P-picture, i.e., a picture occurring earlier in the video signal. A B-picture is compressed using bidirectional prediction coding. Each block of a B-picture may use as a reference block any one of the following: a block of a previous I-picture or P-picture, a block of a following P-picture or I-picture (i.e., a picture occurring later in the video signal), or a block obtained by performing linear processing on a block of a previous I-picture or P-picture and block of a following I-picture or P-picture. In addition, blocks of a B-picture may be compressed in the intra-picture compression mode. Typically, about 150 kbits (kb; 1 kb=1024 bits) of the video stream are required for an I-picture, 75 kb of the video stream are required for a P-picture, and 5 kb of the video stream are required for a B-picture.

The digital video and audio processing system 10 also includes the decoder 6, which receives as its input signal the bit stream S5 from the medium 5. The decoder 6 performs demultiplexing inverse to the multiplexing performed by the encoder 1. The decoder performs processing complementary to that performed by the encoder 1 to decode and expand the resulting audio stream and video stream to provide the recovered video signal S6A and the recovered audio signal S6B respectively. The recovered video signal S6A and the recovered audio signal S6B closely match the video signal S2 and the audio signal S3 fed into the encoder 1.

FIG. 14 also shows the system target decoder (STD) 4 which is used to define the processing performed by the encoder 1 and the decoder 6. In practical video and audio signal processing systems, the encoder does not include an actual system target decoder, but instead performs the encoding processing and multiplexing taking account of the system target decoder parameters. Also, in practical systems, the decoder is designed taking the system target decoder parameters into account. These relationships between the system target decoder and the encoder and the decoder are indicated in FIG. 14 by the broken line labelled S4A interconnecting the system target decoder 4 and the encoder 1, and the broken line labelled S4B interconnecting the system target decoder 4 and the decoder 6.

The system target decoder 4 includes a reference video decoder, a reference audio decoder, and their respective input buffers. In addition, the system target decoder includes a directory decoder and an input buffer for the directory decoder. The size of the audio input buffer, the size of the video input buffer, and the operation of the audio and video decoders are defined by the MPEG standards. In addition, the invention defines the size of the directory buffer and the operation of the directory decoder to make them compatible with the sizes of the other buffers and the operation of the other decoders defined by the MPEG standard.

As mentioned above, the concept of the system target decoder provides compatibility between encoders and decoders of different designs as follows. All encoders are designed to provide a bit stream that can be successfully decoded by the system target decoder, and that does not cause the respective input buffers in the system target decoder to overflow or underflow. In addition, all decoders are designed taking the system target decoder parameters into account. As a result, all such decoders will be capable of successfully decoding the bit stream produced by any of the encoders designed to produce a bit stream capable of being decoded by the system target decoder. By including a directory buffer and a directory decoder in the STD, the invention enables encoders and decoders to be made compatible with one another in an additional respect, namely, that of providing and decoding directory information.

The structure of the hypothetical system target decoder 4 shown in FIG. 14 is as follows. The demultiplexer 41 notionally receives the bit stream S1 from the encoder 1. The demultiplexer 41 demultiplexes the bit stream into a video stream $S_{1V}$, an audio stream $S_{1A}$, and a directory stream $S_{1D}$. The video stream is fed to the video input buffer 42, the output of which is connected to the video decoder 45. The audio stream from the demultiplexer 41 is fed into the audio input buffer 43, the output of which is connected to the audio decoder 46. The directory stream from the demultiplexer 41 is fed into the directory input buffer 44, the output of which is connected to the directory decoder 47.

In the example shown in FIG. 14, the video input buffer 42 and the audio input buffer 43 have the respective storage capacities defined by the MPEG standards, namely, 46 k bytes and 4 kbytes in the MPEG-1 standard. The directory input buffer 44 according to the invention has a storage capacity of 1 kbits, so that it will hold 10 directory entries. This capacity is of the same order as, but is larger than, the directory buffer capacity currently used. These capacities are set in consideration of the practical constraints imposed by providing the real decoder 6 using a processor that cannot include a large amount of storage.

The video decoder 45 removes the video stream from the video input buffer 42 one video access unit at a time, i.e., one picture at time, at a timing corresponding to the picture rate of the video signal, e.g., once every 1/29.94 seconds in an NTSC system. The amount of the video stream removed from the video input buffer for each picture varies because of the different amount of compression applied to each picture.

The audio decoder 46 removes the audio stream from the audio input buffer 43 one audio access unit at a time at a predetermined timing.

The directory decoder 47 removes the directory stream from the directory input buffer one directory entry at a time as required. For example, in the fast-forward mode described above, after the access point at the beginning of each Group of Pictures is read, the directory decoder removes from the directory input buffer the directory stream of the directory entry indicating the location of the access point at the beginning of the next Group of Pictures.

Figure 15:
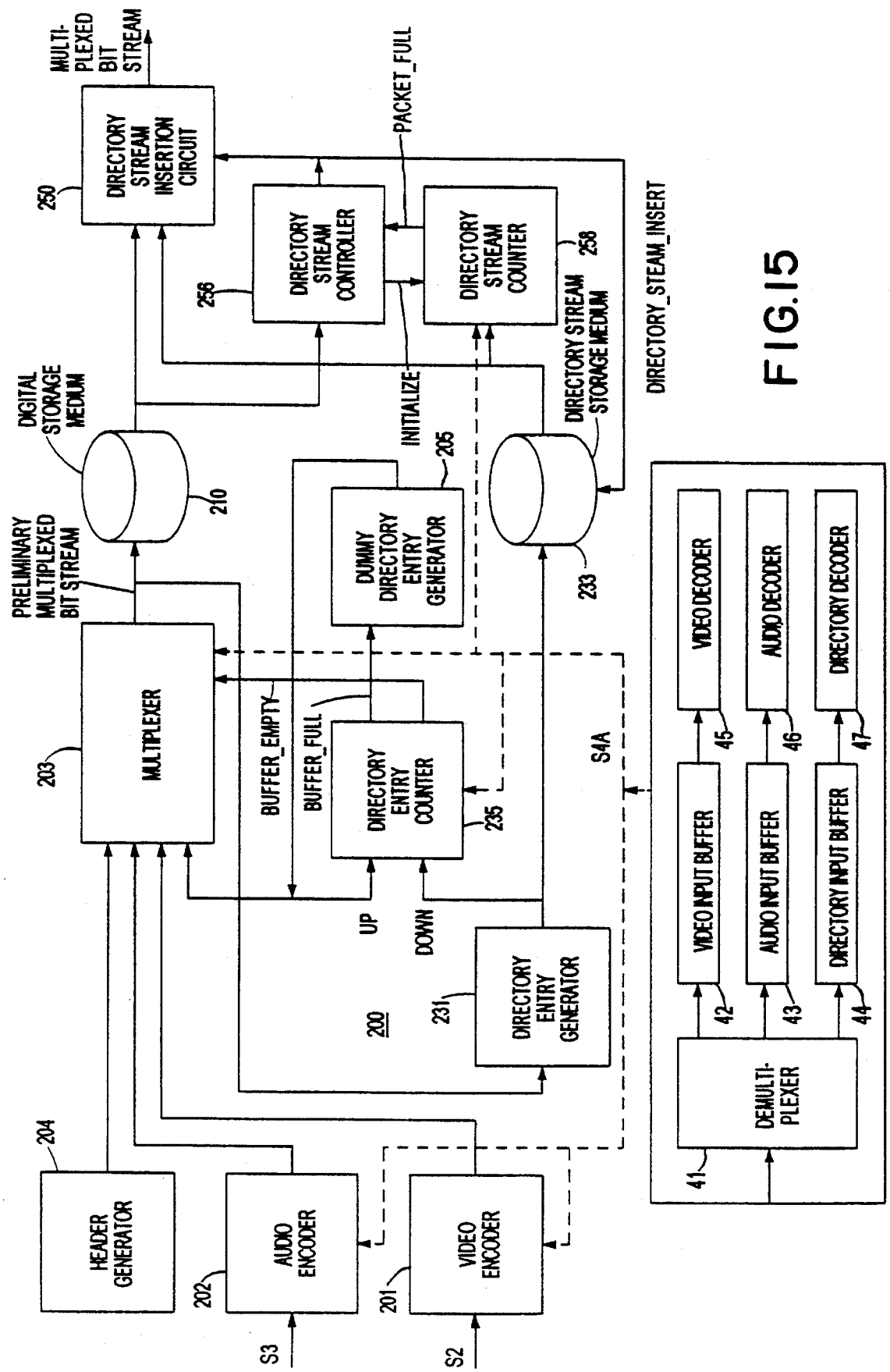
FIG. 15 shows the structure of a first embodiment of an encoder according to the invention showing the reference of various element of the encoder to the system target decoder according to the invention.

The structure of an embodiment of the encoder 1 according to the invention is shown in FIG. 15. The encoder generates a multiplexed bit stream from an audio signal and a video signal for feeding to the medium 5. The encoder also includes directory information in the multiplexed bit stream to enable program selections to be located, and to enable pictures to be displayed in fast forward and fast rewind operations. In the multiplexed bit stream, each directory packet of directory information must be located ahead of the video packets containing the video stream to which the directory entries in the directory packets belong. However, the directory entries in the directory packet are generated from the video stream following the directory packet. Therefore, the directory entries must be added to the directory packets after the video signal has been encoded and multiplexed into the multiplexed bit stream. The encoder 1 can only do this in one pass if the medium 5 has a random access capability (such as a hard disk) so that the medium can occasionally go back to write the directory entries into the directory packets. If the medium 5 does not have a random access capability, or if the medium 5 is a transmission medium, the encoder can provide the multiplexed bit stream including directory entries in two passes. As an example, an embodiment of the encoder will be described that provides a multiplexed bit stream in two passes for recording on the master tape from which distribution media (such as video tapes or video discs) are manufactured.

In the encoder 1, the digital video signal S2 is fed into the video encoder 201, and the digital audio signal S3 is fed into the audio encoder 202. The video stream and the audio steam from the video encoder 201 and the audio encoder 202, respectively, are fed, after internal buffering (not shown) into the multiplexing circuit 203. The output of the multiplexing circuit 203 is connected to the digital storage medium (DSM) 210, where the resulting preliminary multiplexed bit stream is temporarily stored.

The multiplexer 203 assembles the preliminary multiplexed bit stream by time multiplexing the elementary streams, i.e., the video stream, the audio stream, and a directory stream of dummy directory entries, into packets, and the packets into packs. The multiplexer also adds the multiplexing layer, i.e., the packet header for each packet, and pack header for each pack. The multiplexer 203 receives the headers from the header generator 204, and receives the dummy directory entries from the dummy directory entry generator 205.

The multiplexer 203 also feeds the preliminary multiplexed bit stream to the directory entry generator 231, which counts the bit index of the preliminary multiplexed bit stream and detects the access point at the beginning of each Group of Pictures to generate a directory entry for each access point. The directory entry generator assembles the directory entries into a directory stream, which it feeds to the directory storage medium 233 for storage.

The directory entry counter 235 tracks the state of the directory input buffer 46 in the system target decoder 4. The directory entry counter monitors the output of the dummy directory entry 205 fed to the multiplexer 203. Each dummy directory entry fed into the multiplexer 203 increments the directory entry counter by one. The directory entry counter 235 also monitors the output of the directory entry generator 231 fed to the directory stream storage medium 233. Each directory entry decrements the count of the directory entry counter by one.

A preset limit is applied to the directory entry counter 235 according to the size of the directory input buffer 44 in the system target decoder 4. When the count of the directory entry counter reaches the preset level, indicating that the directory input buffer is full, the directory entry counter feeds a buffer_full interrupt to the dummy directory entry generator 205. The buffer_full interrupt stops the dummy directory generator from feeding dummy directory entries to the multiplexer 203. When the directory buffer has a capacity of 1 kbits, the preset limit corresponds to ten dummy directory entries. When the count of the directory entry counter 235 indicates that the directory input buffer 46 is empty, the directory entry counter feeds the buffer_empty interrupt to the multiplexer 203 to cause the multiplexer to insert another directory packet of dummy directory entries into the preliminary multiplexed bit stream.

During second step of the encoding process, in which the directory entries are written over the dummy directory entries in the preliminary multiplexed bit stream to provide the multiplexed bit stream, the digital storage medium 210 feeds the preliminary multiplexed bit stream and the directory storage medium 233 feeds the directory stream to the directory stream insertion circuit 250. The directory stream controller 256 monitors the preliminary bit stream read out from the digital storage medium 210 to determine the locations in the preliminary bit stream of the directory packets into which the directory stream is to be inserted. When it detects each directory packet header, the directory stream controller feeds the directory_stream_insert control signal to the directory stream insertion circuit 250 and the directory stream storage medium 233. The directory stream counter 258 determines the number of directory entries inserted into the directory packet, and causes the directory stream controller to change the state of the directory_stream_insert control signal when the directory packet is full.

The video encoder 201, the audio encoder 202, the multiplexer 203, the directory entry counter 235, and the directory stream counter 258 are all designed to provide a preliminary multiplexed bit stream that, when notionally decoded by the system target decoder 4, causes none of the input buffers 42, 43, and 44 in the system target decoder to overflow or underflow. This relationship is indicated by the dotted line S4A.

The encoder 1 operates as follows. At the beginning of the recording, the multiplexer 203 turns to the header generator 204 to receive all the headers for the start of the recording, and feeds these headers to the DSM 210. The multiplexer then receives from the header generator the pack header for the first pack in the recording, followed by the packet header for the first packet. The first packet is a directory packet, since the first packet of the recording is a directory packet.

The multiplexer 203 then turns to the dummy directory entry generator 205, and feeds dummy directory entries from the dummy directory entry generator to the DSM 210. Each dummy directory entry fed to the multiplexer increments the directory entry counter 235 by one. When the count of the directory entry counter reaches the preset limit corresponding to the number of directory entries that can be accommodated in the directory input buffer 44 in the system target decoder 4, the directory entry counter feeds the buffer_full interrupt to the dummy directory entry generator 205, which causes the dummy directory entry generator to stop feeding directory entries into the multiplexer.

After it has fed the directory packet full of dummy directory entries to the DSM 210, the multiplexer 203 turns back to the header generator 204 to receive the packet header of the first video packet, which it feeds to the DSM 210. Then, taking the respective states of the video input buffer 42 and the audio input buffer 43 in the system target decoder 4 into account, the multiplexer multiplexes the video stream and the audio stream together to provide video packets and audio packets which it feeds to the DSM 210.

During this process, the directory entry generator 231 monitors the preliminary multiplexed bit stream fed from the multiplexer 203 to the DSM 210 to detect each access point in the bit stream. An access point is an access unit that is capable of being decoded on its own, without the need to decode other access units in the bit stream. For example, a video access point is a picture that is compressed wholly or partially using intra-picture coding. An audio access point is any audio access unit. In MPEG bit streams, an access point occurs at the beginning of each Group of Pictures. The directory entry generator 231 also counts the bit index of the preliminary multiplexed bit stream. Each time it detects an access point in the preliminary multiplexed bit stream, the directory entry generator converts the bit index of the access point into a relative address on the final storage medium, i.e., the video cassette in this example. The directory entry generator then creates a directory entry for that access point, which it feeds to the directory entry storage medium 233 for storage as a unit of the directory stream.

The directory entry counter 235 decrements its count for each directory entry generated by the directory entry generator 231 and fed to the directory entry storage medium 233. When the state of the directory entry counter corresponds to the directory input buffer 44 of the system target decoder 4 being empty, the directory entry counter 235 provides the buffer_empty interrupt to the multiplexer 203.

Figure 16A:
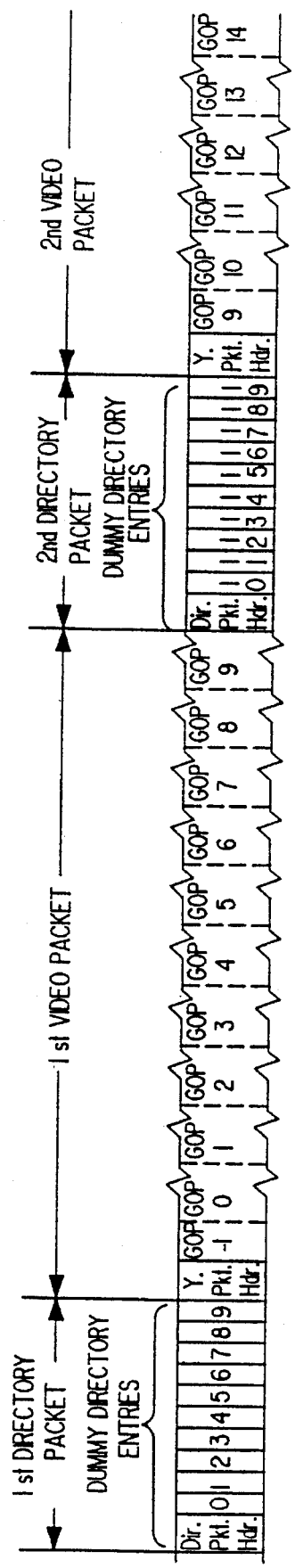
FIG. 16A shows the preliminary multiplexed bit stream generated by the encoder shown in FIG. 15.

The buffer_empty interrupt indicates to the multiplexer 203 that the multiplexer has received all of the access points whose directory entries will be stored in the preceding directory packet (in this example, the directory packet at the beginning of the pack), and that it must include another directory packet in the preliminary multiplexed bit steam before the next access point in the video stream. Accordingly, in response to the buffer_empty interrupt, the multiplexer 203 completes the current video packet, and the following audio packet, if any. After this, the multiplexer turns to the header generator 204 to receive a directory header, which it feeds to the DSM 210. The multiplexer then turns to the dummy directory entry generator 205, and feeds dummy directory entries from the dummy directory entry generator to the DSM 210 until it receives the buffer_full interrupt from the directory entry counter 235. The multiplexer then proceeds to multiplex more of the video stream and the audio stream, until another buffer_empty interrupt indicates that another directory packet must be inserted. The resulting preliminary multiplexed bit stream recorded on the DSM 210 is shown in FIG. 16A.

When the preliminary multiplexed bit stream and the directory entries for the whole recording are respectively stored on the digital storage medium 210 and the directory storage medium 233, the second pass of the encoding process is performed. In the second pass, the dummy directory entries in the directory packets in the preliminary multiplexed bit stream are replaced with directory entries from the directory stream stored on the directory storage medium 233 to provide the multiplexed bit stream. The preliminary multiplexed bit stream is reproduced from the DSM 210 from its beginning, and is fed into the directory stream insertion circuit 250. The directory stream controller 256 monitors the preliminary multiplexed bit stream for directory headers.

Each time the directory stream controller 256 detects a directory header in the preliminary multiplexed bit stream, it sends the directory_entry_insert signal to the directory entry storage medium 233 and to the directory stream insertion circuit 250, and initializes the directory stream counter 258. The directory stream counter is initialized to the preset value determined with reference to the size of the directory input buffer 44 in the system target decoder 4, as discussed above. In response to directory_entry_insert signal, the directory entry storage medium 233 feeds the directory stream to the directory stream insertion circuit 250. The directory stream insertion circuit places each directory entry in the directory stream into the directory packet following the directory header in the preliminary multiplexed bit stream. The directory stream insertion circuit then overwrites the dummy directory entries in the preliminary multiplexed bit stream with the directory entries. The directory stream insertion circuit feeds the resulting multiplexed bit stream to the medium 5 (FIG. 14).

Figure 16B:
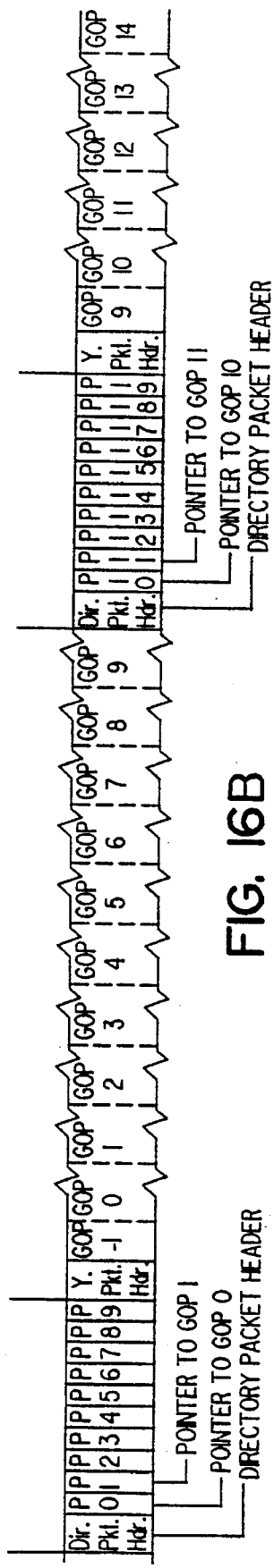
FIG. 16B shows the multiplexed bit stream generated by the encoder shown in FIG. 15.

The directory stream counter 258 monitors the directory entries in the directory stream fed to the directory stream insertion circuit 250. Each directory entry fed to the directory stream insertion circuit decrements the directory stream counter by one. When the directory stream counter reaches zero, the directory stream counter feeds the packet_full signal to the directory stream insertion controller 256. In response to this signal, the directory stream insertion controller changes the state of the directory_entry_insert signal. This causes the directory entry storage medium 233 to stop sending the directory stream to the directory stream insertion circuit 250, and causes the directory stream insertion circuit to feed the preliminary multiplexed bit stream out unchanged as the multiplexed bit stream until the directory stream controller once more detects a directory packet header in the preliminary multiplexed bit stream. The resulting multiplexed bit stream fed to the medium 5 (FIG. 14) is shown in FIG. 16B.

The same basic circuit arrangement can optionally be used to provide pictures in the fast-rewind mode in addition to the fast-forward mode. If the same size directory input buffer 44 is employed in the system target decoder 4, controlling the multiplexing of the directory packets according to the state of the directory input buffer in the system target decoder 4 results in approximately twice the number of directory packets being inserted into the preliminary multiplexed bit stream than when pictures are to be provided only in the fast-forward mode. This is because each directory packet must hold the directory entries for the n/2 access points following the directory packet (for use in the fast forward mode) and for the n/2 access points before the directory packet (for use in the fast rewind mode), where n is the number of directory entries that can be stored in the directory input buffer 44 in the system target decoder 4.

Figure 17:
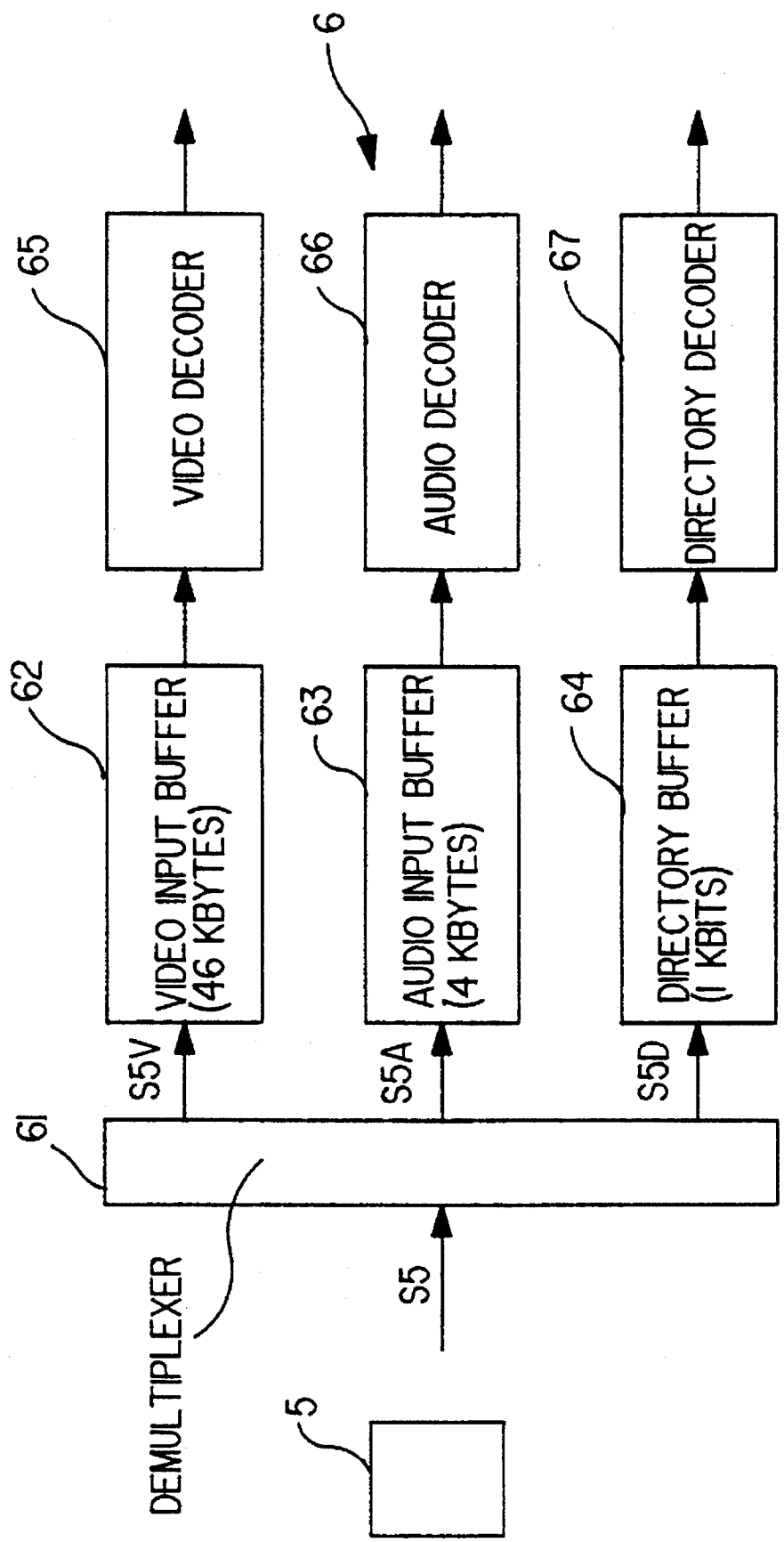
FIG. 17 is a block diagram of a first embodiment of a decoder according to the invention.

FIG. 17 shows the structure of the decoder 6. The decoder 6 is designed in consideration of the parameters of the system target decoder 4 (FIG. 14) to decode the multiplexed bit stream shown in FIG. 16B produced by the encoder 1. As a result, the decoder 6 has a structure very similar to that of the system target decoder 4.

The decoder 6 includes the demultiplexer 61, which receives the multiplexed bit stream S5 from the medium 5. The demultiplexer demultiplexes the multiplexed bit stream into the video stream $S_{5V}$, the audio stream $S_{5A}$, and the directory stream $S_{5D}$. Incidentally, as will be described in more detail below, the multiplexer also demultiplexes the video time stamps and the audio time stamps (not shown) from the multiplexed bit stream.

The video stream $S_{5V}$ from the output of the demultiplexer 61 is fed into the video input buffer 62, which precedes the video decoder 65. The audio stream $S_{5A}$ from the demultiplexer is fed into the audio input buffer 63, which precedes the audio decoder 66. The directory stream $S_{5D}$ from the demultiplexer is fed into the directory input buffer 64, which precedes the directory decoder 67.

The video decoder 65 removes each access unit, i.e., picture, of the video stream from the video input buffer 62 for decoding in the order in which the access unit was received by the video input buffer. The audio decoder 66 removes each access unit of the audio stream from the audio input buffer 63 for decoding in the order in which the access unit was received by the audio input buffer. The directory decoder 67 removes each directory entry of the directory stream from the directory input buffer 64 in the order in which the directory entry was received by the directory input buffer.

The input buffers 62, 63, and 64 will be described in detail next. The elementary streams entering the respective decoders must be buffered for the following reasons. The first reason for this is that, as mentioned above, the compression ratios constantly change. The second reason for this is that the average transfer rates of the elementary streams from the medium 5 differ from the average input rate of the elementary streams to the respective decoders 65, 66, and 67, depending on the error in the sampling rate clocks. The third reason is that elementary streams are transferred from the medium 5 via the demultiplexer 61 intermittently, and the decoders demand the access units of their respective elementary streams intermittently. Consequently, the instantaneous transfer rate of the elementary streams from the medium 5 and the instantaneous input rate of the elementary streams into their respective decoders do not match. Therefore, the input buffers 62, 63, and 64 are provided between the demultiplexer 61 and the respective decoders 65, 66, and 67 to accommodate the differences in the average transfer rate and the average input rate, and in the instantaneous transfer rate and the instantaneous input rate.

Figure 18:
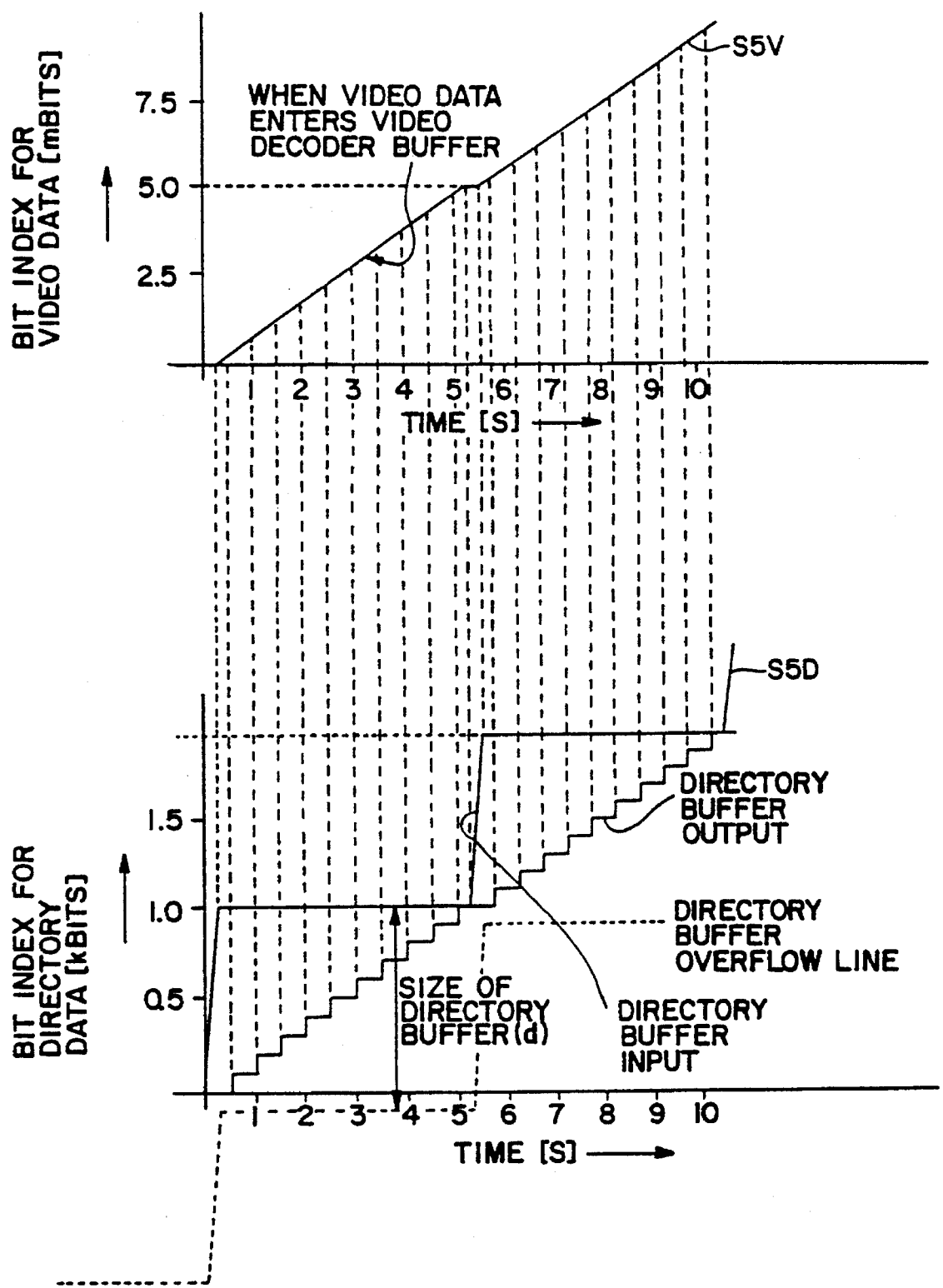
FIG. 18 shows the bit index at the input of the video input buffer and at the input and the output of the directory input buffer in the first embodiment of the decoder shown in FIG. 17.

FIG. 18 shows in its upper part a bit index curve showing the time dependency of the transfer of the video stream $S_{SV}$ in the multiplexed signal from the medium 5 into the video input buffer 62. No video stream is fed into the video input buffer at first, because the demultiplexer 61 first feeds the directory stream into the directory buffer 64. Then, following the first video packet header in the multiplexed bit stream, the demultiplexer transfers the video stream in the following video packet(s) into the video input buffer 62 at a substantially constant bit rate until it encounters the next directory packet header in the multiplexed bit stream. In response to the directory packet header, the demultiplexer interrupts feeding the video stream into the video input buffer while it feeds the directory stream in the directory packet into the directory input buffer 64. During this interruption, the bit index of the video stream remains unchanged. At the end of the directory packet, in response to the packet header of the first following video packet, the demultiplexer resumes transferring the video stream contained in the video packet(s) into the video input buffer until it encounters another directory packet header in the multiplexed bit stream. This process is repeated throughout the decoding process. The bit index at the output of the video input buffer is the same as that shown in FIG. 5D.

Figure 1:
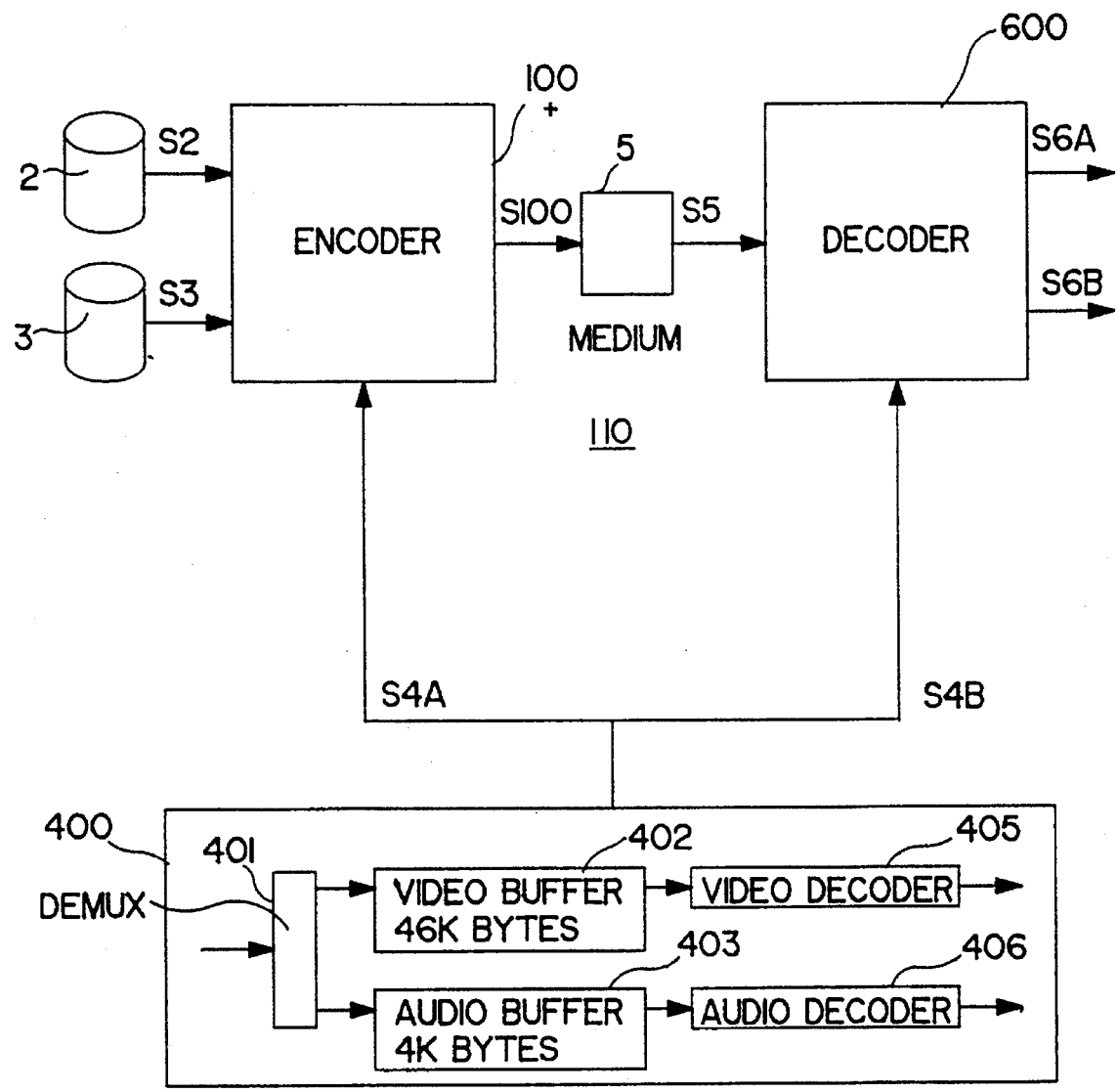
FIG. 1 is a block diagram of an encode/decode system for an audio signal and a video signal showing the relationship between the system and a system target decoder according to the prior art.
Figure 2:
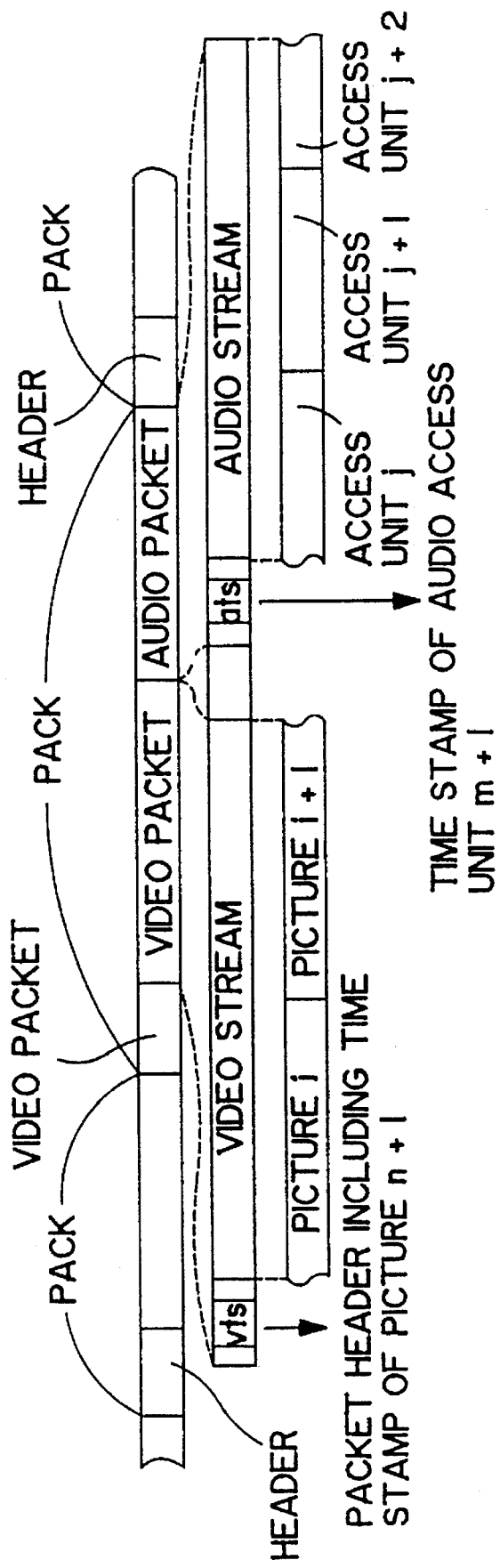
FIG. 2 shows the structure of the multiplexed bit stream produced by the encoder of the system shown in FIG. 1.
Figure 3:
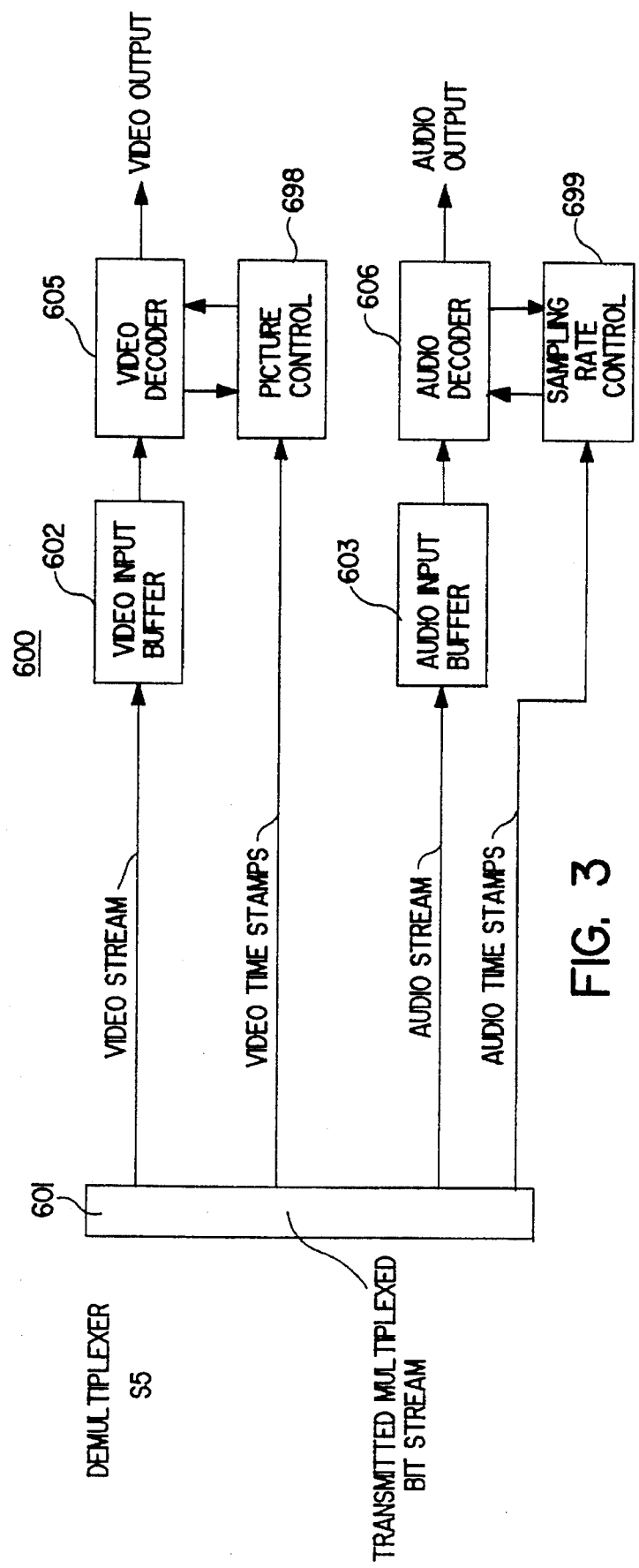
FIG. 3 shows the structure of the decoder of the system shown in FIG. 1.
Figure 4A:
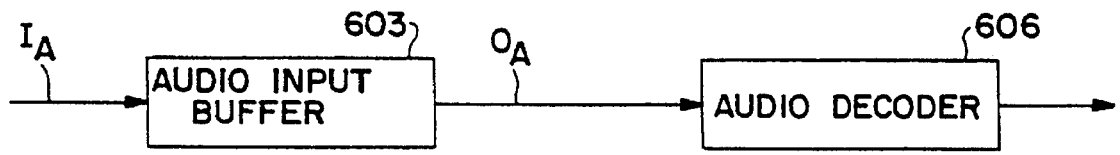
FIG. 4A shows the audio input buffer and the audio decoder in the decoder of the system shown in FIG. 1.
Figure 4B:
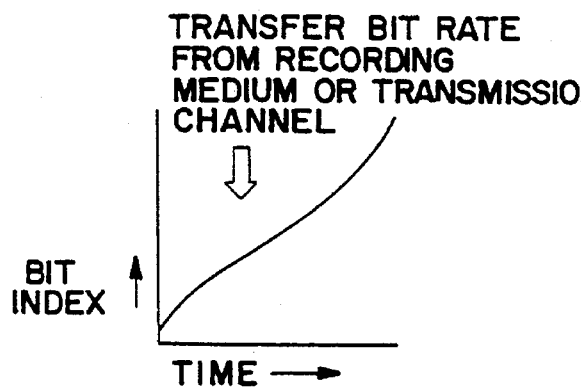
FIG. 4B is a bit index curve showing the average bit index at the input of the audio input buffer in the decoder of the system shown in FIG. 1.
Figure 4D:
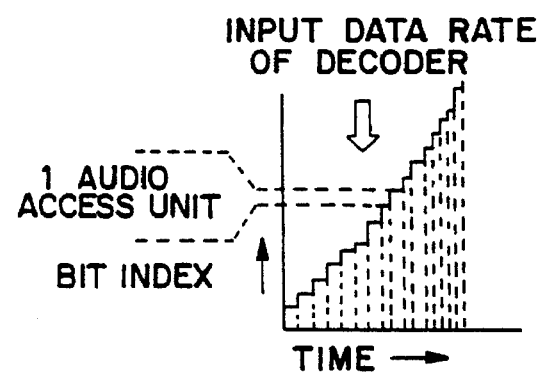
FIG. 4D is a bit index curve showing the bit index at the output of the audio input buffer in the decoder of the system shown in FIG. 1.
Figure 4C:
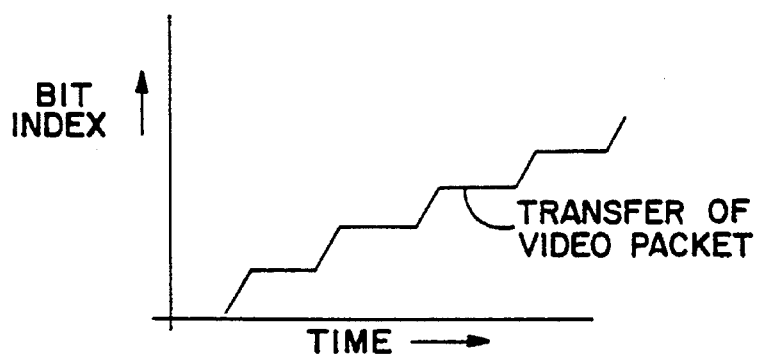
FIG. 4C is a bit index curve showing the actual bit index at the input of the audio input buffer in the decoder of the system shown in FIG. 1.
Figure 6B:
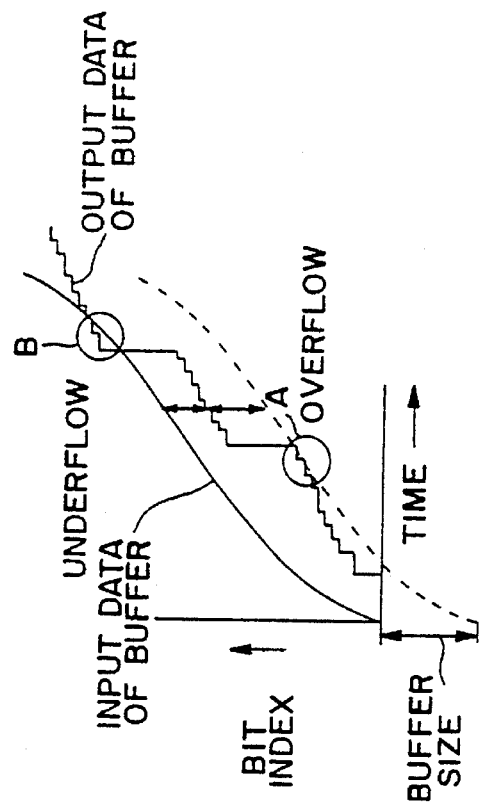
FIG. 6B shows the effect of a changing input bit rate on the buffering provided by the video input buffer in the decoder of the system shown in FIG. 1.
Figure 6A:
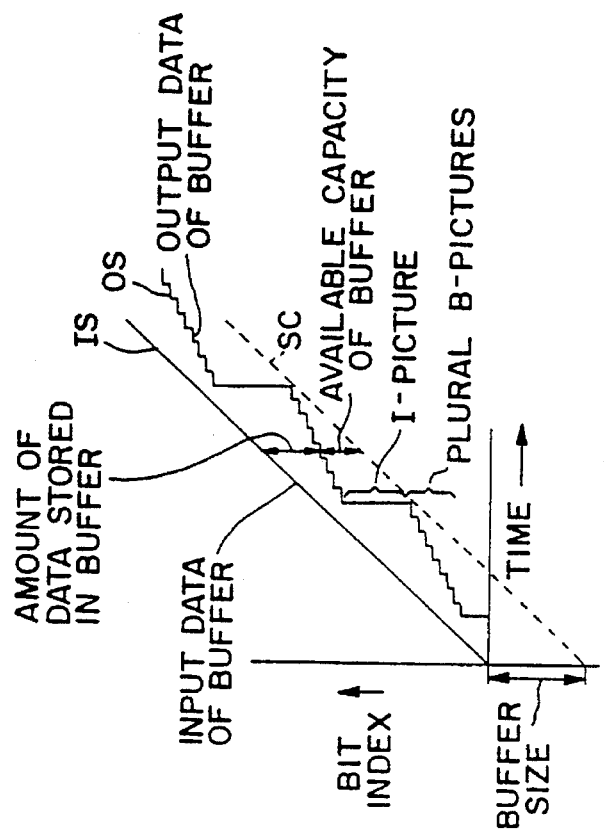
FIG. 6A shows ideal buffering in the video input buffer in the decoder of the system shown in FIG. 1.
Figure 9:
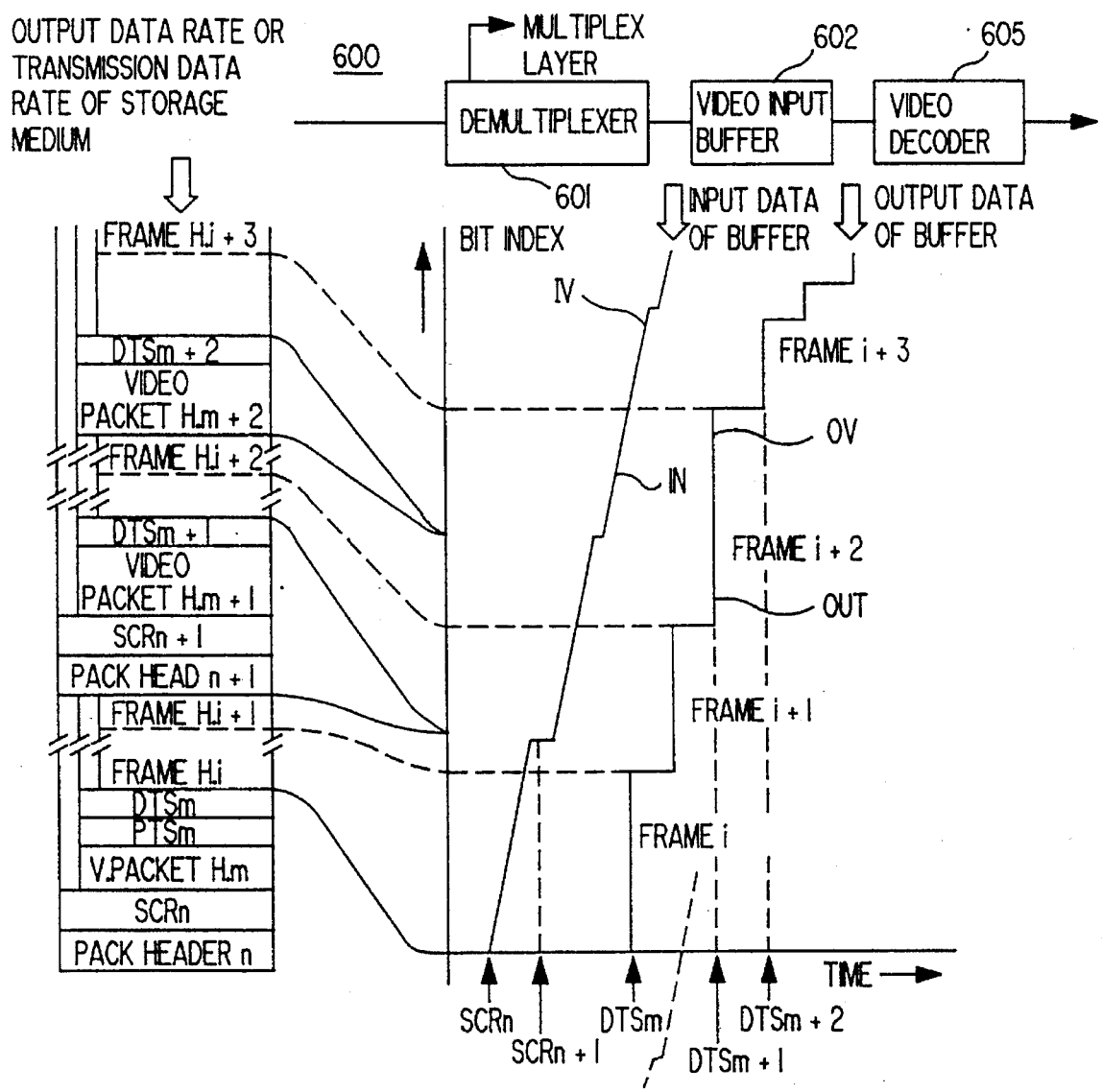
FIG. 9 shows the relationship between the structure of the multiplexed bit stream and the operation of the video input buffer in the decoder of the system shown in FIG. 1.
Figure 10:
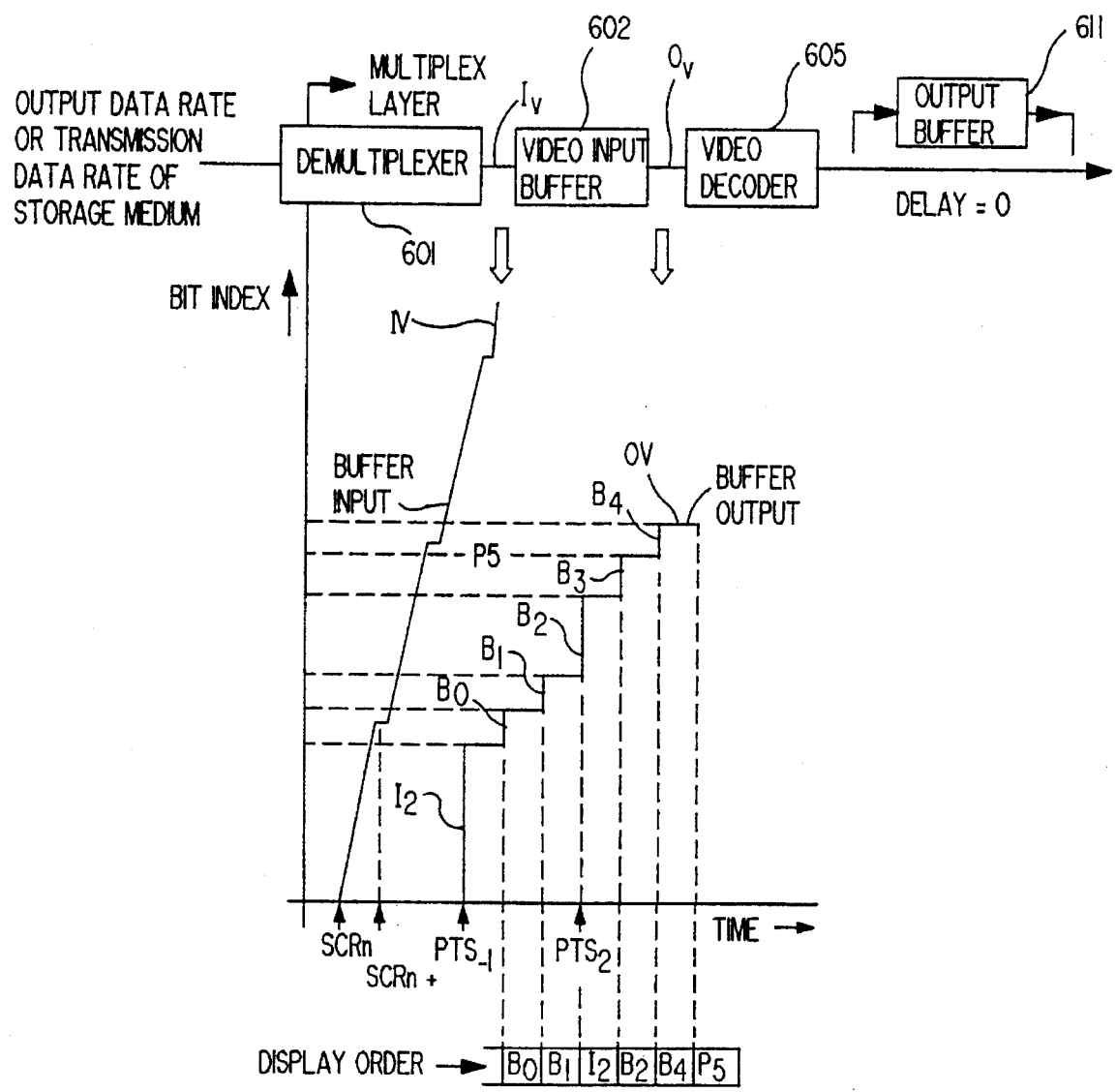
FIG. 10 shows the relationship between various types of picture encoding and the operation of the video input buffer in the decoder of the system shown in FIG. 1.
Figure 11A:
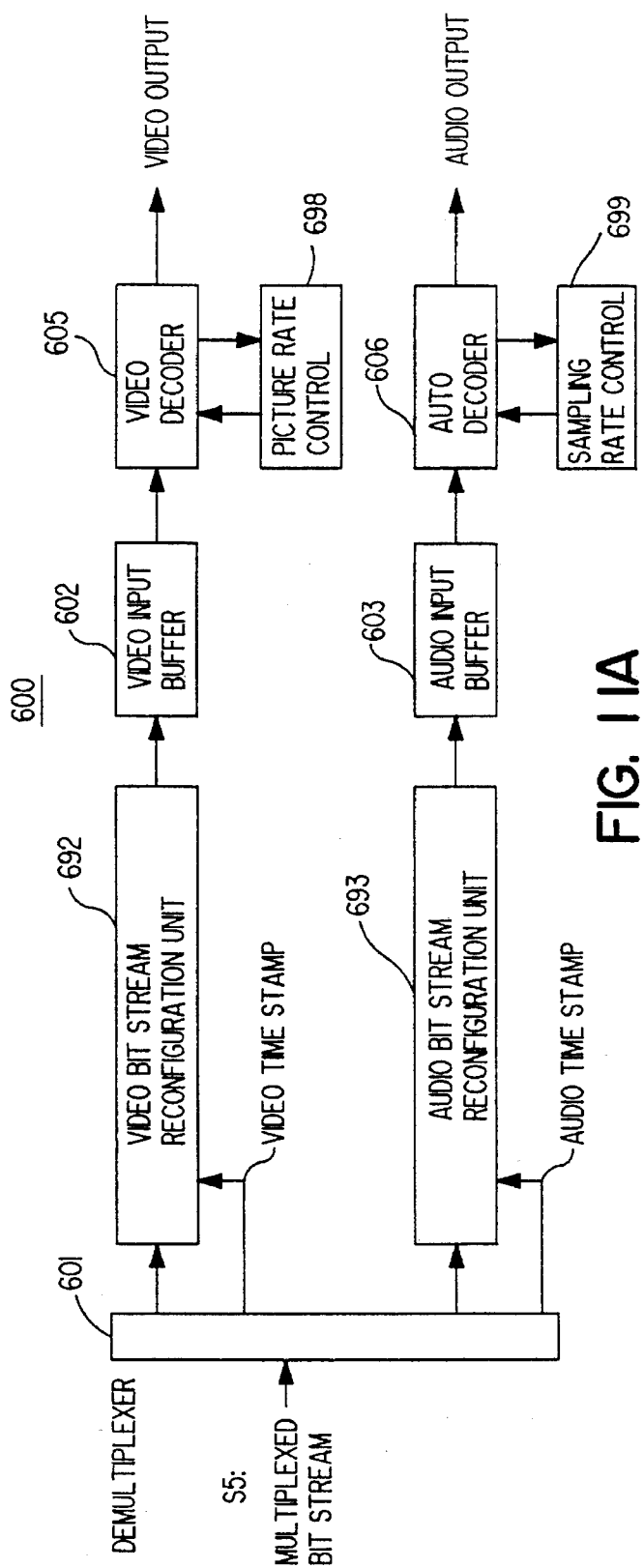
FIG. 11A shows an alternative structure for the decoder of the system shown in FIG. 1, in which, after demultiplexing the multiplexed bit stream, the respective time stamps are embedded into the video and audio streams.
Figure 11B:
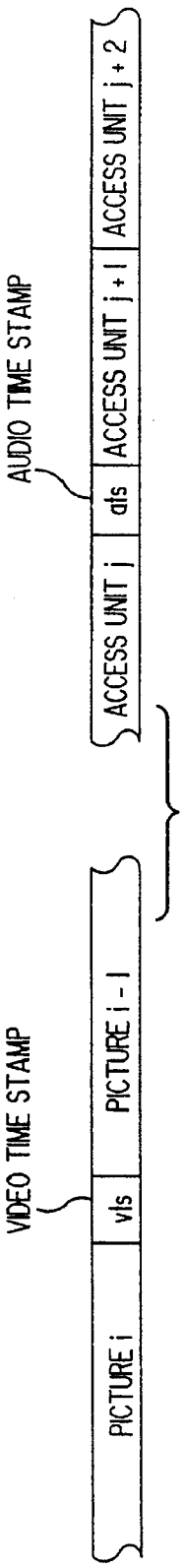
FIG. 11B shows the audio and video streams with embedded time stamps produced by the decoder shown in FIG. 11A.
Figure 13:
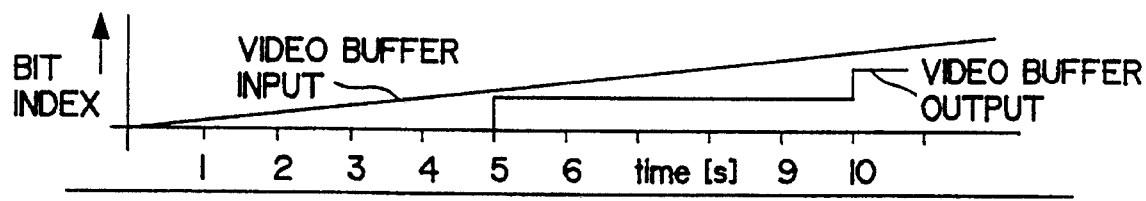
FIG. 13 shows a low-bit rate video signal that cannot be decoded using a decoder conforming with the buffering delay limit imposed by the MPEG-1 standard.

Transfer of the video stream into the video input buffer 62 is also interrupted when the multiplexer encounters an audio packet header in the multiplexed bit stream and transfers the audio stream in the following audio packet into the audio input buffer 63, as shown in FIG. 4C. These interruptions occur more frequently than the interruptions to transfer the directory stream, but they have been omitted from FIG. 18 to simplify the drawing.

FIG. 18 shows in its lower pan a bit index curve of the time dependency of the transfer of the directory stream $S_{SD}$ in the multiplexed signal from the medium 5 into the directory input buffer 64. The demultiplexer 61 detects the directory packet header at the beginning of the multiplexed bit stream and transfers the directory access unit contained in the following directory packet from the medium 5 into the directory input buffer 64. Following the first directory packet, the demultiplexer stops transferring the directory stream into the directory input buffer while it feeds the video stream in the following video packet(s) into the video input buffer 62 and the audio stream in the following audio packet(s) into the audio input buffer 63. Then, the demultiplexer 61 encounters the next directory packet header in the multiplexed bit stream and feeds the directory stream in the directory packet following the directory packet header into the directory input buffer. This process is repeated throughout the decoding process.

The lower part of FIG. 18 also shows the bit index of the output of the directory input buffer 64. The initial transfer of directory stream into the directory input buffer at the beginning of the multiplexed bit stream fills the directory input buffer to capacity. Then, as the video stream is received, the directory decoder 67 removes directory entries one-by-one from the directory input buffer until the directory input buffer is empty. However, because the multiplexed bit stream has been constructed to take account of the operation of the directory input buffer and the directory decoder, another directory packet occurs in the multiplexed bit stream before the next access point. As a result, the directory stream in the next directory packet is transferred into the directory input buffer (a) when the directory input buffer is empty, so that transferring the directory stream into the directory input buffer does not cause the directory buffer to overflow, and (b) before the directory decoder attempts to remove another directory entry from the directory input buffer, so that removing the next directory entry does not cause the directory input buffer to underflow.

Figure 19:
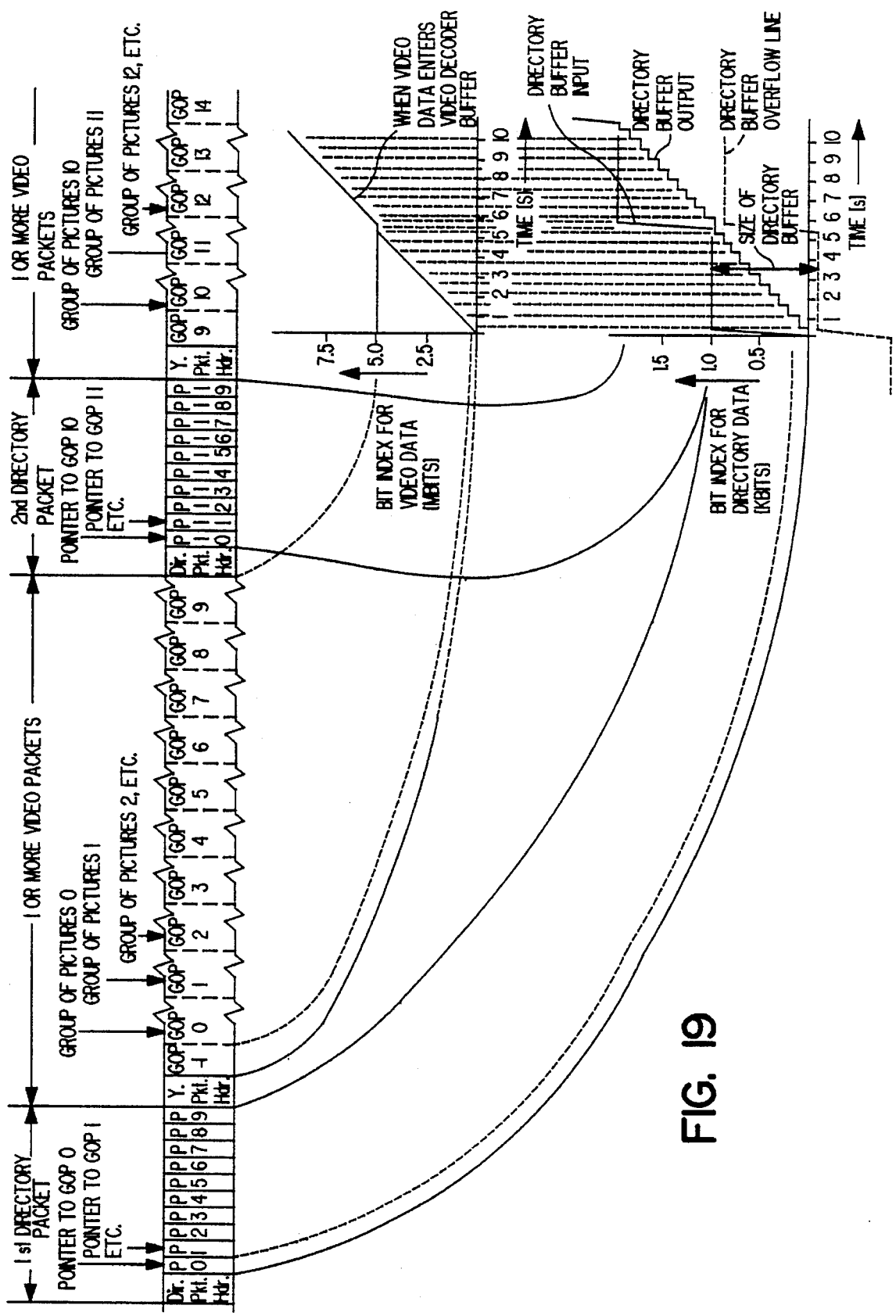
FIG. 19 shows the relationship between the structure of the multiplexed bit stream produced by the first embodiment of the encoder shown in FIG. 15 and the bit indices of the input of the video input buffer and the input and the output of the directory input buffer in the first embodiment of the decoder shown in FIG. 17.

FIG. 19 shows how the bit indices shown in FIG. 18 relate to the multiplexed bit stream produced by the encoder 1 (FIG. 14). In FIG. 19, the directory packets in the bit stream are linked to the transfer of the directory stream into the directory input buffer 64 by solid lines, and the events in the video stream of the multiplexed bit stream are linked to the transfer of the video stream into the video input buffer 62 by curved broken lines. Also, transfer of the access point at the beginning of each group of pictures into the video input buffer 62 is linked to the removal of the directory entry for that access point from the directory input buffer by straight broken lines interconnecting the bit index curve of the video input buffer 62 and the bit index curve of the directory input buffer 64.

Figure 20:
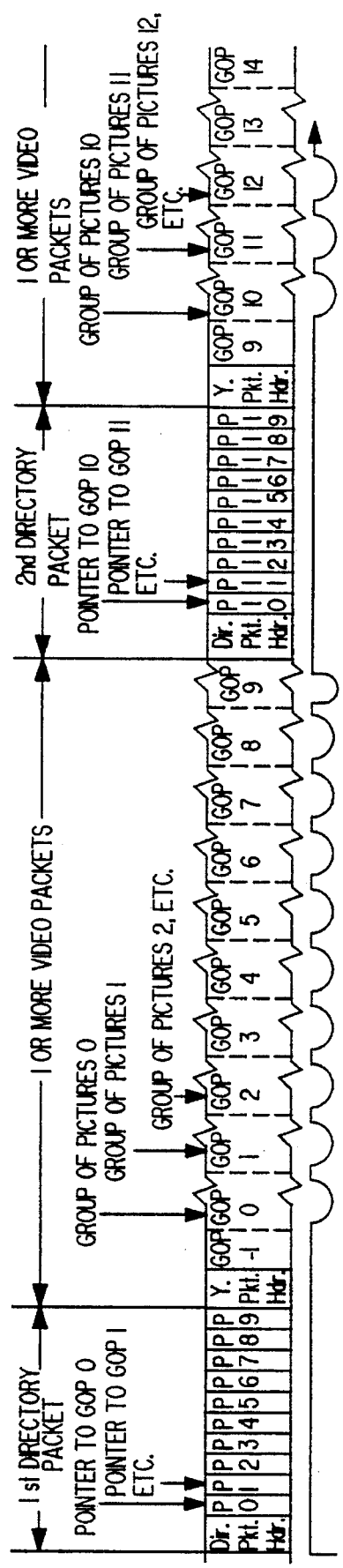
FIG. 20 shows the effect of the way of multiplexing directory packets into the multiplexed bit stream according to the invention on the fast-forward operation of a video tape recorder.

FIG. 20 shows the beneficial effect on the fast forward operation of a video tape recorder of the rational sizing and placement of the directory packets in the multiplexed bit stream resulting from using the modified system target decoder according to the invention to control the multiplexing of the multiplexed bit stream. The resulting sizing of the directory packets in the multiplexed bit stream ensures that each directory packet contains only the number of directory entries that can be accommodated in the directory input buffer 44 of the system target decoder, and, hence, in the directory input buffer 64 of the decoder 6. The resulting placing of the directory packets in the multiplexed bit stream ensures that the directory entries contained in each directory packet belong only to the access points in the video stream between the current directory packet and the next directory packet. Consequently, FIG. 20 differs from FIGS. 12A–12E in that the video tape recorder does not have to go back several times to read the contents of the directory packet.

During the fast-forward operation illustrated in FIG. 20, the video tape recorder first reads the directory packet at the beginning of the multiplexed bit stream, and transfers the directory stream to the directory input buffer 64. The directory stream fills the directory input buffer to capacity. The directory decoder 67 then removes the first directory entry from the directory input buffer, and instructs the video tape recorder to skip to the address indicated by the first directory entry. At that address, the video tape recorder reproduces the video stream of the picture at the access point located at that address at the beginning of the zero-th Group of Pictures. The video stream of the picture is then decoded for display.

The directory decoder then removes the second directory entry from the directory input buffer, and instructs the video tape recorder to skip to the address indicated by the second directory entry. At that address, the video tape recorder reproduces the video stream of the picture at the access point located at that address at the beginning of the first Group of Pictures. The video stream of the picture is then decoded for display.

The process just described repeats until the directory decoder has removed the tenth directory entry from the directory buffer and the picture at the access point at the beginning of the ninth Group of Pictures has been reproduced and displayed. The directory buffer 64 is now empty, and, if the directory decoder 67 attempted to remove another directory entry, it would cause the directory input buffer to underflow. However, the next directory packet is located before the next access point. The video tape recorder reproduces the directory stream from the directory packet and transfers it into the directory input buffer, which, being empty, can accommodate the whole of the directory stream in the directory packet. The directory decoder then removes the first directory entry from the directory input buffer, and instructs the video tape recorder to skip to the address indicated by the first directory entry. At that address, the video tape recorder reproduces the video stream of the picture at the access point located at that address at the beginning of the tenth Group of Pictures. The video stream of the picture is then decoded for display. This process repeats until the fast-forward process stops.

The encoder 1 according to the invention has used the modified system target decoder 4 according to the invention to size and place the directory packets in the multiplexed bit stream so that at no time during the fast-forward process does the decoder 6 have to attempt to remove directory entries from an empty directory input buffer (which would result in an underflow of the directory input buffer) or to fill the directory input buffer with directory stream when the directory input buffer is not empty (which would result in an overflow of the directory input buffer.

Figure 21:
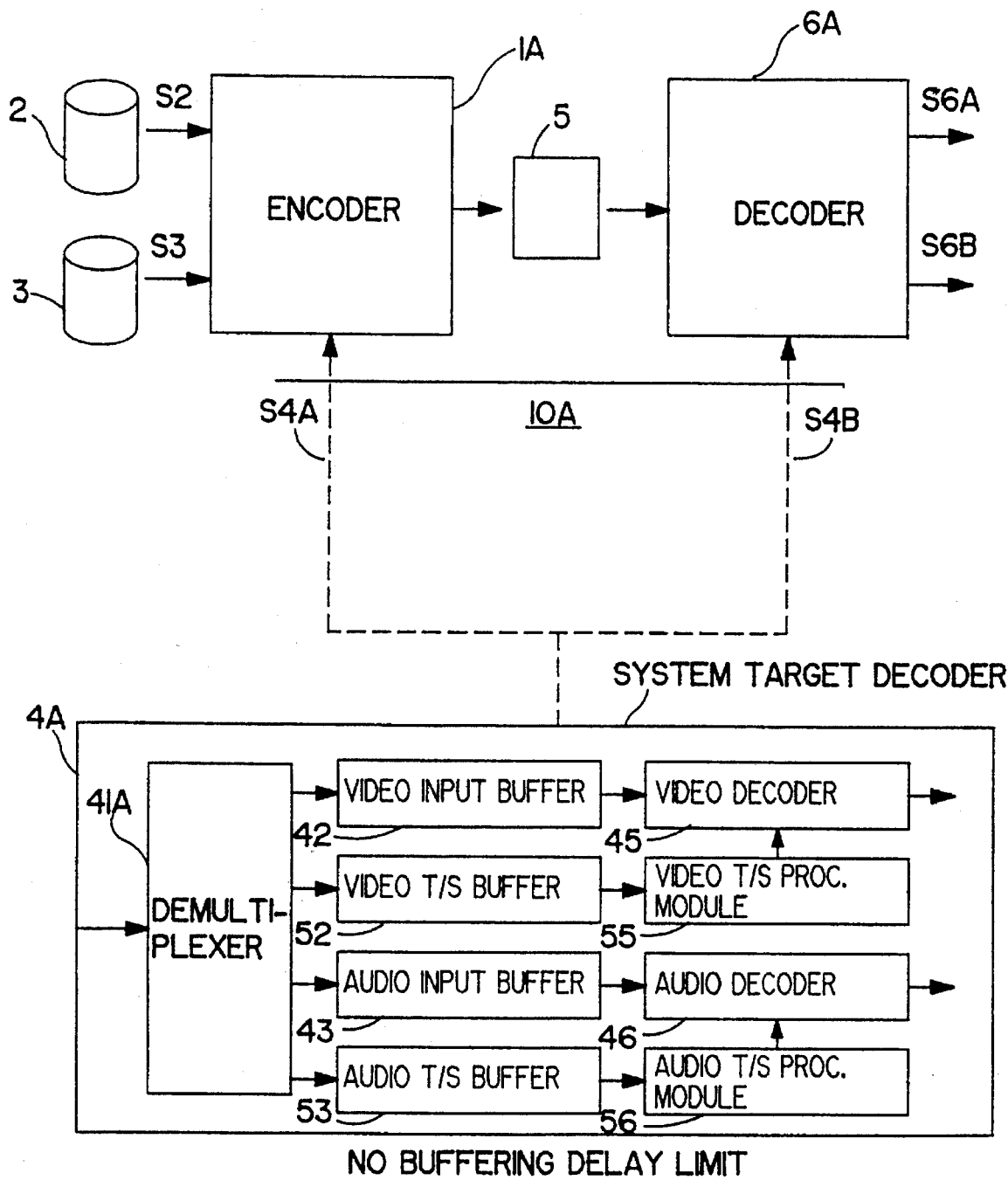
FIG. 21 is a block diagram of a second embodiment of an encode/decode system according to the invention for an audio signal and a video signal, showing the relationship between the system and a second embodiment of the a target decoder according to the invention.

FIG. 21 shows a second embodiment of the digital video and audio signal processing system 10A according to the invention, in which a time stamp buffer and a time stamp decoder is provided in the modified system target decoder 4A according to the invention for each of the audio time stamps and the video time stamps.

Using the modified system target decoder 4A according to the invention, the encoder 1A is able to optimize the system video stream buffering delay and other encoding parameters to generate compliant bit streams with the best possible picture quality for the required video bit rate, while keeping the decoder buffering delays as low as is practical in a one-pass system.

In the system shown in FIG. 21, the encoder 1A receives the video signal S2 from the video signal storage medium 2, and receives the audio signal S3 from the audio signal storage medium 3. The audio signal S3 could alternatively be (and is more usually) also received from the video signal storage medium 2 instead of from a separate audio storage medium.

The encoder 1A compresses and codes the video and audio signals, and multiplexes the resulting audio stream and video stream to provide the multiplexed bit stream S1A, which is fed to the medium 5 for storage or distribution. The medium can be any medium suitable for storing or distributing a digital bit stream, for example, a CD-ROM, a laser disk (LD), a video tape, a magneto-optical (MO) storage medium, a digital compact cassette (DCC), a terrestrial or satellite broadcasting system, a cable system, a fibre-optic distribution system, a telephone system, an ISDN system, etc.

The encoder 1A compresses and codes the video signal picture-by-picture. Each picture of the video signal is compressed as an I-picture, a P-picture or a B-picture as described above.

The digital video and audio processing system 10A also includes the decoder 6A, which receives as its input signal the bit stream S5A from the medium 5. The decoder 6A performs demultiplexing inverse to the multiplexing performed by the encoder 1A. The decoder performs processing complementary to that performed by the encoder 1A to decode the resulting audio stream and video stream to provide the recovered video signal S6A and the recovered audio signal S6B. The recovered video signal S6A and the recovered audio signal S6B respectively closely match the video signal S2 and the audio signal S3 fed into the encoder 1A.

FIG. 21 also shows the system target decoder (STD) 4A which is used to define the processing characteristics of the encoder 1A and the decoder 6A. In practical video and audio signal processing systems, the encoder does not include an actual system target decoder, but instead performs the encoding processing and multiplexing taking account of the system target decoder parameters. Also, practical decoders are designed taking the system target decoder parameters into account to minimize hardware cost, etc. These relationships between the system target decoder and the encoder and the decoder are indicated in FIG. 21 by the broken line labelled S4A interconnecting the system target decoder 4A and the encoder 1A, and the broken line labelled S4B interconnecting the system target decoder 4A and the decoder 6A.

The system target decoder 4 includes a reference video decoder 45, a reference audio decoder 46, and their respective input buffers 42 and 43. In addition, the system target decoder includes a video time stamp processing module 55, an audio time stamp processing module 56, and their respective input buffers 52 and 53. The size of the audio input buffer, the size of the video input buffer, and the operation of the audio and video decoders are defined by the MPEG standards, as described above. In addition, the invention defines the sizes of the video time stamp buffer and the audio time stamp buffer, and the time stamp coding frequency. The size of the time stamp buffers and the time stamp coding frequency are defined to optimize the utilization of the other input buffers.

Again, as discussed above, the concept of the modified system target decoder according to the invention provides compatibility between encoders and decoders of different designs not only with respect to the audio and video streams, but also with respect to the audio and video time stamp buffering. In particular, the modified system target decoder according to the invention provides this compatibility without the need to impose a maximum on the buffering delay. This enables the scope of the MPEG standard to be extended to cover such applications as low bit-rate video slide shows and the like.

The structure of the hypothetical system target decoder 4A shown in FIG. 21 is as follows. The demultiplexer 41A notionally receives the bit stream S1A from the encoder 1A. The demultiplexer 41A demultiplexes the bit stream into a video stream $S_{1V}$, an audio stream $S_{1A}$, video time stamps VTS and audio time stamps ATS. The video stream $S_{1V}$ is fed to the video input buffer 42, the output of which is connected to the video decoder 45. The audio stream from the demultiplexer 41A is fed into the audio input buffer 43, the output of which is connected to the audio decoder 46. The video time stamps from the demultiplexer 41A are fed into the video time stamp buffer 52, the output of which is connected to the video time stamp processing module 55. The video time stamp processing module controls the timing of the decoding of the video stream by the video decoder 45. The audio time stamps from the demultiplexer 41A are fed into the audio time stamp input buffer 53, the output of which is connected to the audio time stamp processing module 56. The audio time stamp processing module controls the timing of the decoding of the audio stream by the audio decoder 46.

In the example shown in FIG. 21, the video input buffer 42 and the audio input buffer 43 have the respective storage capacities defined by the MPEG standards, namely, 46 kbytes and 4 kbytes in the MPEG-1 standard. These capacities are set in consideration of the practical constraints imposed by providing the decoder 6A using a processor that, because of cost constraints, cannot have a large amount of storage.

The video decoder 45 removes the video stream from the video input buffer 42 one video access unit at a time, i.e., one picture at time, at a timing corresponding to the video time stamps and the picture rate of the video signal, e.g., once every 1/29.94 seconds in an NTSC system. The amount of the video stream removed from the video input buffer for each picture varies because of the different amount of compression applied to each picture.

The audio decoder 46 removes the audio stream from the audio input buffer 43 one audio access unit at a time at a timing corresponding to the audio time stamps and a predetermined timing.

Figure 22A:
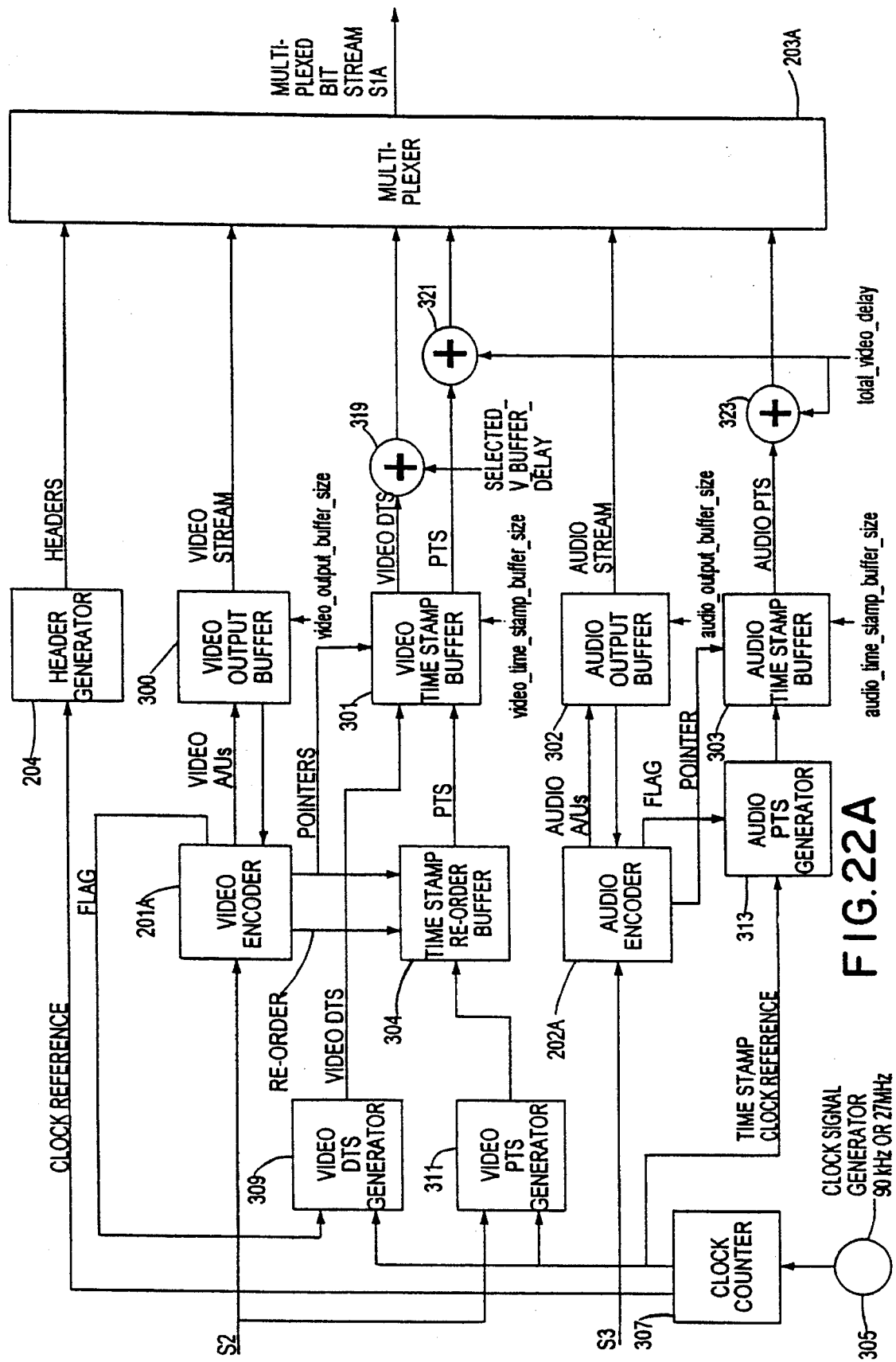
FIG. 22A shows the structure of a second embodiment of an encoder according to the invention showing the various operational parameters of the encoder determined by reference to the second embodiment of the system target decoder according to the invention.

The structure of the encoder 1A is shown in FIG. 22A. Access units of the video signal S2 are fed to the input of the video encoder 201A, which compresses each access unit, i.e., picture, of the video signal. The resulting access unit of video stream is fed from the output of the video encoder to the input of the video output buffer 300, where it is temporarily stored. The video stream from the output of the video output buffer is fed to the multiplexer 203A. Feedback from the video output buffer to the video encoder prevents the output of the video encoder from causing the video output buffer to overflow.

The audio signal S3 is fed to the input of the audio encoder 202A, which compresses it. The resulting audio access units are fed from the output of the audio encoder to the input of the audio output buffer 302, where they are temporarily stored. The audio stream from the output of the audio output buffer is fed to the multiplexer 203A. Feedback from the audio output buffer to the audio encoder prevents the output of the audio encoder from causing the audio output buffer to overflow.

The encoder 1A also includes the clock signal generator 305. In the MPEG-1 systems, the frequency of the clock signal generator is 90 kHz, in MPEG-2 systems, the frequency is 27 MHz. The output of the clock signal generator is fed to the clock counter 307, the output of which provides a clock reference signal. The clock reference signal has a value that is incremented by one each cycle of the clock signal. The clock reference signal is connected to the header generator 204. In the MPEG-2 standard, the clock counter 307 also divides MPEG-2 clock signal by 300 to provide a time stamp clock reference signal having a value that is incremented by one at a rate of 90 kHz. The clock counter feeds the time stamp clock reference signal to the video decoding time stamp generator 309, the video presentation time stamp generator 311, and the audio presentation time stamp generator 313. In MPEG-1, the clock counter 307 feeds the clock reference signal to the video decoding time stamp generator 309, the video presentation time stamp generator 311, and the audio presentation time stamp generator 313 as the time stamp clock reference signal.

The video input signal S2 is also fed to the input of the video presentation time stamp generator 311. The video presentation time stamp generator generates a presentation time stamp (PTS) in response to each picture of the video input signal and the time stamp clock reference signal. The presentation time stamps are fed via the time stamp re-ordering buffer 304 to the video time stamp buffer 301. Each video presentation time stamp is the value of the time stamp clock reference signal at the instant the video encoder receives the start of a picture of the video input signal.

The time stamp re-ordering buffer 304 receives a re-order flag signal from the video encoder 201A each time the latter, in the course of compressing the video input signal S2, changes the order of the access units of the video stream relative to the order of the access units of the video input signal S2. In response to the re-order flag signal, the time stamp re-ordering buffer changes the order of the presentation time stamps generated by the video presentation time stamp generator 311 to match the order of the access units of the video stream the video encoder feeds into the video output buffer 300. The time-stamp re-ordering circuit feeds the video presentation time stamps to the video time stamp buffer 301.

The video encoder 201A feeds a flag signal to the input of the video decoding time stamp generator 309 at the same instant as it feeds the start of an access unit of the video stream to the video output buffer 300. In response to each flag signal and the time stamp clock reference signal, the video decoding time stamp generator generates a video decoding time stamp (video DTS), which it feeds to the video time stamp buffer 301. The video decoding time stamp is the value of the time stamp clock reference signal at the instant the flag signal indicates that the encoder has fed the start of the access unit of the video stream into the video input buffer.

The video time stamp buffer 301 temporarily stores the video time stamps. The video time stamp buffer also receives and stores pointers from the video encoder 201A to enable it to relate each video time stamp that it receives to the picture header of each video access unit stored in the video output buffer 300. The video time stamp buffer later feeds the video time stamps to the multiplexer 203A. The video decoding time stamps are fed to the multiplexer via the adder 319, where they are incremented by the value of the SELECTED_V_BUFFERING_DELAY (which will be described in more detail below). The video presentation time stamps PTS are fed to the multiplexer via the adder 321, where they are incremented by the value of the total_video_delay (which will be described below). The multiplexer selectively adds the video time stamps to the packet headers of the video packets in the multiplexed bit stream according to the occupancy of the video time stamp buffer 42 of the system target decoder 4A.

The audio encoder 202A feeds a flag signal to the input of the audio presentation time stamp generator 313 coincident with it feeding the start of each access unit of the audio stream to the audio output buffer 302. In response to this flag signal and the time stamp clock reference signal, the audio presentation time stamp generator generates an audio presentation time stamp, which it feeds to the audio time stamp buffer 303. Each audio presentation time stamp is the value of the time stamp clock reference signal at the instant the flag signal indicates that the audio encoder has fed an access unit of the audio stream into the audio input buffer.

The audio time stamp buffer 303 temporarily stores the audio presentation time stamps. The audio time stamp buffer also receives pointers from the audio encoder 202A to enable it to relate each audio time stamp that it receives to the address of the header of each audio access unit stored in the audio output buffer 302. The audio time stamp buffer 303 later feeds the audio presentation time stamps to the multiplexer 203A. The multiplexer selectively adds the audio time stamps to the packet headers of the audio packets in the multiplexed bit stream according to the occupancy of the audio time stamp buffer 43 of the system target decoder 4A.

The video output buffer 300, video time stamp buffer 301, audio output buffer 302, audio time stamp buffer 303 and time stamp re-ordering buffer 304 are all first-in first-out (FIFO) buffers.

The time stamp generators 309, 311, and 313 may be integrated with their respective video and audio time stamp buffers 301 and 302. Moreover, a single clock reference signal could be used, and could be divided by 300 in the time stamp generators to provide the time stamp clock reference signal.

The header generator 204 generates the various headers of the multiplex layer, i.e., the pack headers and the various packet headers. The header generator receives the clock reference from the clock counter 307, and feeds the headers into the multiplexer 203A.

Figure 23:
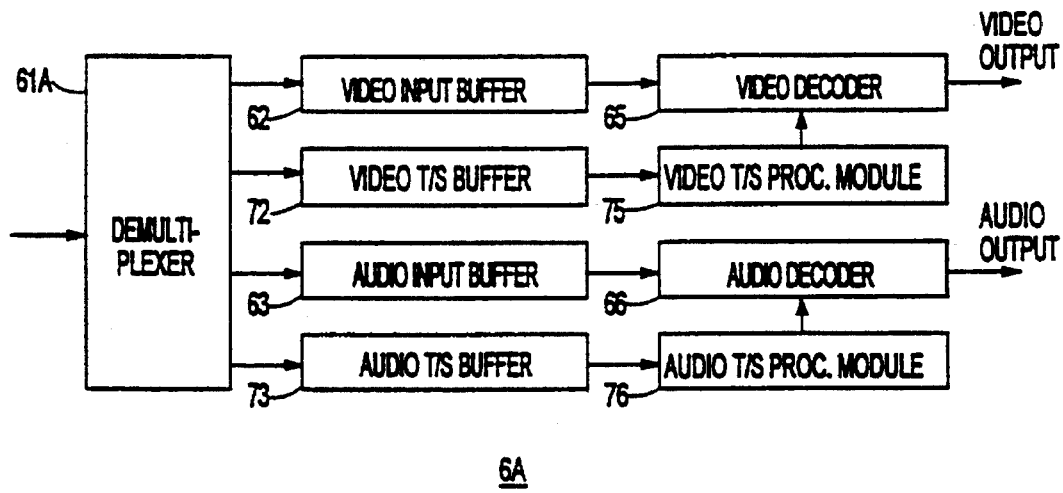
FIG. 23 is a block diagram of a second embodiment of a decoder according to the invention.

FIG. 23 shows the structure of the decoder 6A in the encoding/decoding system 10A. The decoder 6A is designed in consideration of the parameters of the system target decoder 4A (FIG. 21) to decode the multiplexed bit stream produced by the encoder 1A. As a result, the decoder 6A has a structure very similar to that of the system target decoder 4A.

The decoder 6A includes the demultiplexer 61A, which receives the multiplexed bit stream S5 from the medium 5. The demultiplexer demultiplexes the multiplexed bit stream into the video stream $S_{5V}$, the audio stream $S_{5A}$, the video time stamps $S_{STV}$ and the audio time stamps $S_{STA}$.

The video stream $S_{5V}$ from the output of the demultiplexer 61 is fed into the video input buffer 62, which precedes the video decoder 65. The audio stream $S_{5A}$ from the demultiplexer is fed into the audio input buffer 63, which precedes the audio decoder 66. The video time stamps $S_{STV}$ from the demultiplexer are fed into the video time stamp buffer 72. The video time stamps are read out from the video time stamp buffer into the video time stamp processing module 75, which controls the timing of the decoding of the video access units in the video stream $S_{5V}$ by the video decoder 65. The audio time stamps $S_{STA}$ from the demultiplexer are fed into the audio time stamp buffer 73. The audio time stamps are read out from the audio time stamp buffer into the audio time stamp processing module 76, which controls the timing of the decoding of the audio access units in the audio stream $S_{5A}$ by the audio decoder 66.

The video decoder 65 removes each access unit, i.e., picture, of the video stream from the video input buffer 62 for decoding in the order in which the access unit was received by the video input buffer. The audio decoder 66 removes each access unit of the audio stream from the audio input buffer 63 for decoding in the order in which the access unit was received by the audio input buffer.

The operation of the encoding and decoding system 10A described above will now be described.

If still pictures are encoded, the MPEG 2 standard requires that:

each still picture have an associated time stamp that determines how long the picture will be displayed;

each still picture be displayed for at least 2 picture periods. Consequently, the maximum still picture rate is, e.g. 25 Hz/2=12.50 Hz for PAL display devices, and 29.97 Hz/2=14.99 Hz for NTSC display devices; and still picture video consist only of I-pictures.

Consequently, decoders receiving the bit stream from the encoder must buffer and use all video time stamps to reconstruct a still picture video bit stream with the correct timing. In an actual decoding system according to the invention, a separate video time stamp buffer is used for this purpose. To allow relatively small time stamp buffers to be used for this purpose and to guarantee that such time stamp buffers will never overflow, the system target decoder according to the invention also includes a video time stamp buffer (or a functionally-equivalent parameter constraint) which affects certain parameters of the encoding system.

Using the arrangement shown in FIG. 22B, the one-pass encoder shown in FIG. 22A can configure itself to comply with the constraints of this model in addition to being capable of configuring itself to encode a normal full-motion video signal.

Referring to FIGS. 22A and 22B, to comply with the STD video time stamp buffer constraint, the encoder 1A first determines, at block 351, the STD video stream buffering delay that will prevent the STD video time stamp buffer 52 from overflowing. This value will be called DELAY_THAT_WORKS. DELAY_THAT_WORKS=size of STD time stamp buffer 52/time stamp coding frequency.

In a system with a relatively low video bit rate (e.g., in many still picture applications), a buffering delay longer than the value of DELAY_THAT_WORKS is necessary for optimum picture quality. Therefore, in such a system, the time stamp coding frequency is reduced as much as possible (as is allowed for still-picture video by the MPEG-2 standard). Using locked encoding systems helps achieve this goal. Alternatively, the size of the video time stamp buffer 52 in the system target decoder may be increased to provide a longer delay. As a further alternative, both the time stamp coding frequency may be reduced and the STD video time stamp buffer size may be increased.

For example, for still picture video using, e.g., a 25 frame per second display device, the encoder will calculate the time stamp coding frequency tscf using the formula:

tscf=12.5/N (N is a positive integer)

Since the MPEG-2 standard requires that one time stamp be provided for each still picture, when used for generating a bit stream representing still picture video, the video encoder 201A will also generate I-pictures at a reduced rate, i.e., at the rate of 12.5/N Hz, if the time stamp coding frequency is reduced. The value of N is set by the encoder operator.

Block 353 determines the video stream buffering delay that is needed to generate the worst case (i.e., the largest possible) picture using the size of the STD video input buffer 42. This value will be called DELAY_FOR_BIG_PICTURE.

DELAY_FOR_BIG_PICTURE=size of STD video input buffer 42/bit rate of the video stream.

In practice, to make the video bit stream "safe" for all decoders, the encoder 1A may use a value smaller than the actual size of the system target decoder video input buffer 42 in the above formula.

The value of DELAY_FOR_BIG_PICTURE can easily be longer than one second in systems in which the video bit rate is relatively low.

Block 357 compares DELAY_FOR_BIG_PICTURE with DELAY_THAT_WORKS to determine the value of the selected decoder video buffering delay (SELECTED_V_BUFFERING_DELAY). If DELAY_FOR_BIG_PICTURE=<DELAY_THAT_WORKS, the encoding system will set the value of SELECTED_V_BUFFERING_DELAY to DELAY_FOR_BIG_PICTURE.

In some applications, DELAY_FOR_BIG_PICTURE will be larger than DELAY_THAT_WORKS. In this case, to satisfy all STD constraints, the encoder will set the value of SELECTED_V_BUFFERING_DELAY=DELAY_THAT_WORKS.

The value of SELECTED_V_BUFFERING_DELAY is fed to the adder 319 and to block 363.

Block 359 calculates the memory quantity video_output_buffer_size required for the video output buffer 300. The memory quantity video_output_buffer_size is calculated using the SELECTED_V_BUFFERING_DELAY and the available video bit rate as follows:

video_output_buffer_size (bytes)=SELECTED_V_BUFFERING_DELAY * available video bit rate/8.

Block 359 feeds the value of video_output_buffer_size to the video output buffer 300.

Block 361 calculates the memory quantity video_time_stamp_buffer_size required for the video time stamp buffer 301. The memory quantity required is that which will hold the number of presentation time stamps (PTS) and decoding time stamps (DTS) given by: SELECTED_V_BUFFERING_DELAY * time stamp coding frequency.

Block 361 feeds the value of video_time_stamp_buffer_size to the video time stamp buffer 301.

At blocks 363, 365 and 367, the encoder calculates the audio encoder buffering delay (from which the audio output buffer size and the audio time stamp buffer size are calculated) from the total_video_delay and the audio decoder buffering delay. To achieve end-to-end synchronization between audio and video, the end-to-end delays of the video stream and the audio stream through the encoder and the decoder must be equal, as shown in FIG. 24B.

Figure 24A:
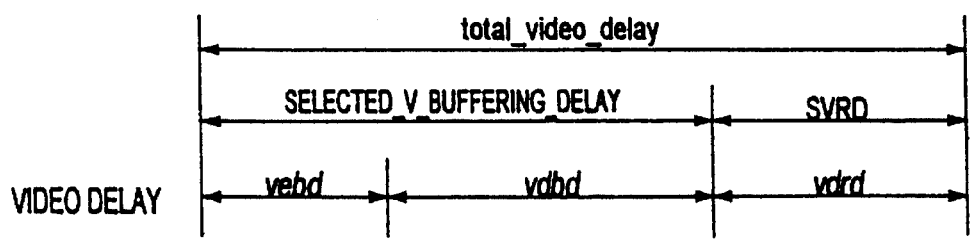
FIG. 24A illustrates the components of the total_video_ delay of the encode/decode system.
Figure 24B:
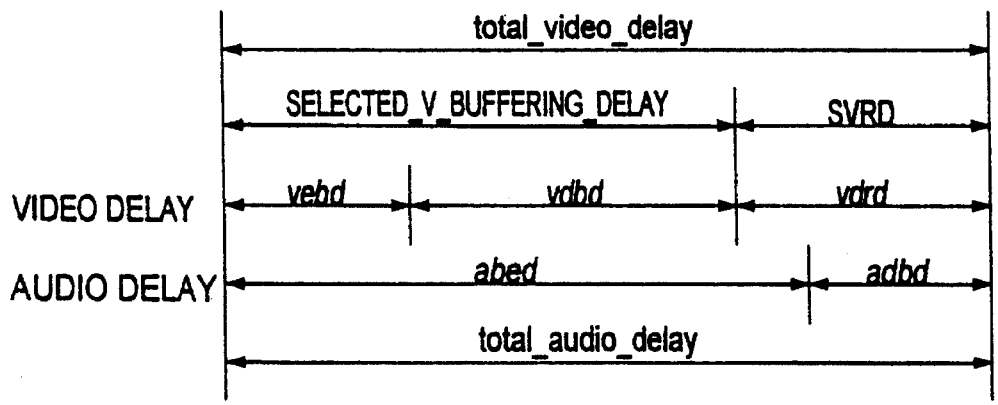
FIG. 24B illustrates the components of the total_video_ delay and the total_audio_delay of the encode/decode system according to the invention.

FIG. 24A shows the components of the end-to-end system delay total_video_delay of the video stream, which is calculated in block 363. This delay is called the total_video_delay.

total_video_delay=SELECTED_V_BUFFERING_DELAY+
SELECTED_V_REORDERING_DELAY.

The value of the SELECTED_V_REORDERING_DELAY (SVRD), which also affects picture quality, is usually one or more picture periods. The SELECTED_V_REORDERING_DELAY is the sum of two components, namely, the video encoder reordering delay (verd) and the video decoder reordering delay (vdrd). In this example, verd is assumed to be zero, and vdrd is set to one picture period. Consequently, the SELECTED_V_REORDERING_DELAY is one picture period.

The SELECTED_V_BUFFERING_DELAY is also the sum of two components, namely, the video encoder buffering delay (vebd) and the video decoder buffering delay (vdbd).

The value of total_video_delay calculated by the block 363 is fed to the adders 321 and 323, and to the block 367.

The audio input buffer 43 of the system target decoder 4A is relatively small, and the audio decoder 46 removes the audio stream from the audio input buffer at a relatively constant rate. Furthermore, the audio access units are not reordered. Block 365 calculates the audio decoder buffering delay (adbd) of the audio stream in the STD as follows:
audio_decoder_buffering_delay=size of STD audio input buffer 43/audio bit rate.

In practice, to make the audio bit stream "safe" for all decoders, the encoder may use a value smaller than the actual size of the system target decoder audio input buffer 43 in the above formula.

The audio_decoder_buffering_delay is small compared with the total_video_delay. As a result, the audio_decoder_buffering_delay (adbd) calculated by block 365 is usually relatively short. To provide the required end-to-end synchronization between audio and video, it is not usually possible to reduce the total_video_delay because of picture quality requirements. Therefore, the block 367 calculates from the total_video_delay and the audio_decoder_buffering_delay a value of the audio_encoder_buffer_delay (aebd) that is sufficiently large to make the total_audio_delay match the total_video_delay, as shown in FIG. 24B.

To provide the audio_encoder_buffering_delay aebd calculated by block 367, block 369 calculates the memory quantity audio_output_buffer_size required for the audio output buffer 302 as follows:

audio_output_buffer_size (bytes)=audio_encoder_buffering_delay * audio_bit_rate/8.

The block 369 feeds the value of audio_output_buffer_size to the audio output buffer 302.

Block 371 calculates the memory quantity audio_time_stamp_buffer_size (in time stamps) required for the audio time stamp buffer 303 as follows:

audio_time_stamp_buffer_size (time stamps)=audio_encoder_buffering_delay * audio_access_unit_rate.

The block 371 feeds the value of audio_time_stamp_buffer_size to the audio time stamp buffer 303.

The above encoder set up procedure was described with reference to a low bit-rate application. A similar procedure can be used to set up the encoder 1A for normal full-motion video, or for applications, such as professional video applications, in which a very short buffering delay (e.g., about 0.2 s) is required.

Returning now to FIG. 22A, after the encoder 1A has calculated the parameters just described, and has used these parameters to set up the video output buffer 300, the video time stamp buffer 301, the audio output buffer 302, the audio time stamp buffer 303 and the adders 319, 321, and 323, the encoder operates with these parameters to encode the video input signal S2 and the audio input signal S3 as follows. The video encoder 201A and the audio encoder 202A start encoding their respective input signals at the same time. Once the encoding process has started, and until the end of the respective input signals S2 and S3, the video encoder 201A will generate video access units at the selected picture rate and feed them to the video output buffer 300, and the audio encoder 202A will generate audio access units (AAU) depending on the selected audio sampling rate and number of samples per AAU, and feed them to the audio output buffer 302. The video encoder 201A includes a rate control mechanism (indicated by the path connecting the video output buffer and the video encoder) that prevents overflow of the video output buffer 300. By preventing overflow of the video output buffer having a size set according to the value of video_output_buffer_size, as described above, the video encoder 201A executes one of the tasks necessary to make the multiplexed bit stream S 1A compliant with the constraints imposed by the system target decoder 4A.

During the encoding process, the 33-bit clock reference signal from the clock counter 307 continuously increments at the rate of 90 kHz in an MPEG-1 system, or at 27 MHz in an MPEG-2 system. Also, in an MPEG-2 system, the 33-bit time stamp clock reference signal increments at the rate of 90 kHz.

Each time the beginning of an access unit of the video input signal S2 arrives at the video encoder 201A, the video PTS generator 311 determines the value of the time stamp clock reference signal from the clock counter 307 as a video presentation time stamp (PTS). The video PTS generator feeds the PTS to the time stamp re-ordering buffer 304, where it is temporarily stored. The PTS is associated with the address of the picture header of the corresponding video access unit in the re-ordering buffer by, for example, a pointer received from the video encoder. If, in encoding the video input signal, the video encoder reorders a video access unit of the video input signal S2, the video encoder feeds the re-order flag to the time-stamp reordering buffer. In response to the re-order flag, the time stamp re-ordering buffer re-orders the PTS belonging to that access unit. In other words, the time-stamp re-ordering buffer re-orders the PTSs so that their order at the output of the time stamp re-ordering buffer 304 is the same as the order of video access units at the output of the video encoder 201A. The time-stamp re-ordering circuit then feeds the video presentation time stamps to the video time stamp buffer 301.

Each time the video encoder 201A feeds an access unit of the video stream into the video output buffer 300, the video DTS generator 309 determines the value of the time stamp clock reference signal from the clock counter 307 as the video decoding time stamp (video DTS) of that video access unit. The video DTS generator feeds the video DTS to the video time stamp buffer 301, where it is stored together with the PTS from the time-stamp re-ordering buffer 304. Together with the video time stamps, the video output buffer also receives from the video encoder 201A and stores a pointer that indicates the address in the video output buffer 300 of the picture header of the video access unit to which the time stamps belong.

Each time the audio encoder 202A feeds an access unit of the audio stream into the audio output buffer 302, the audio PTS generator 313 determines the value of the time stamp clock reference signal from the clock counter 307 as the audio presentation time stamp (audio PTS) of that audio access unit. The audio PTS is stored in the audio output buffer 303, together with a pointer indicating the address in the audio output buffer 302 of the header of the access unit to which the audio time stamp belongs.

To generate the correct time stamp values, except for the picture reordering delay, the video encoder 201A and the audio encoder 201A theoretically produce access units instantaneously, and without delay. Consequently, for certain pictures, the video PTS and the video DTS stored in the time stamp buffer will have exactly the same values. Because real hardware implementations operate with delays, these delays must be taken into account when the time stamps are generated. For example, the time stamp generators 309, 311 and 313 can provide time stamp values that are additionally incremented to take account of real processing delays.

When the beginning of the video stream enters the video output buffer 300, the header generator 204 generates a header, which it feeds to the multiplexer 203A. The header generator receives the clock reference signal from the clock counter 307, and includes in the clock reference field of the header the value of the clock reference signal at the instant that the head of the video stream entered the video output buffer.

Next, the header generator 204 generates the video packet header for the first video packet of the multiplexed bit stream, and feeds the video packet header to the multiplexer 203A. The video packet header includes a length field, the value of which depends on the number of bytes of video stream that will follow the video packet header. The video packet length depends on the application, and on the multiplexing strategy.

If the video packet includes an access unit header, the video packet header may also include a time stamp. Whether the video packet header is to include a time stamp can be determined by checking the video stream to be inserted in the video packet (which depends on the current read pointer to the video output buffer 300 and the video packet length) and by checking whether the pointer stored in video time stamp buffer 301 points to this segment of the video stream. Also, the multiplexer performs processing that emulates tracking the state of occupancy of the video time stamp buffer 52 in the system target decoder. If adding a time stamp to the video packet header would cause the video time stamp buffer to overflow, the multiplexer will not add a time stamp. On the other hand., if the video time stamp buffer is close to empty, the multiplexer may begin a new video packet so that a time stamp can be added to the multiplexed bit stream. In the manner just described, the multiplexer prevents the video time stamp buffer from overflowing or underflowing. Similar processing is carried out to prevent the audio time stamp buffer 53 from overflowing or underflowing.

The decoding time stamps and presentation time stamps are respectively fed from the video time stamp buffer 301 into the multiplexer 203A via the adders 319 and 321. The adder 321 increments each presentation stamp by the value of the total__video__delay calculated by the total video delay calculation circuit 363 as described above, and the adder 319 increments each decoding time stamp by the SELECTED__ V__BUFFERING__DELAY calculated by the SELECTED__ V__BUFFERING__DELAY calculating circuit 357 as described above. If the incremented PTS and the incremented DTS have different values, the multiplexer 203A will insert both of them into the video packet header. If the incremented PTS and the incremented DTS have the same value (i.e., when the picture is a B-picture) only one time stamp is inserted into the video packet header.

When the video input signal S2 is a full-motion video signal, the multiplexer 203A will read the video stream for the video packet from the video output buffer 300 and insert it into the multiplexed bit stream S1A after completing the video packet header. While the video stream is being read from the video output buffer 300, the read pointer to the video output buffer 300 is compared with the oldest pointer in the time stamp buffer 301 that points to the address of one of the picture headers stored in the video output buffer 300. When these pointers are equal, the PTS, DTS and associated pointer will be removed from the video time stamp buffer 301. This happens when the video packet includes more than one picture header. When the video input signal S2 is an MPEG-style still picture video signal, because each picture must have an associated time stamp, the encoder will insert a new video packet header including time stamps just before each picture header.

The encoder will reduce the size of a video packet and/or stop inserting new video packets into the multiplexed bit stream for a number of reasons, including:

1. to insert an audio packet into the multiplexed bit stream;

2. the video output buffer 300 is empty; or 3. there is no more video stream.

Case 1 occurs at regular intervals that are shorter than the audio decoder buffer delay adbd. The first audio packet will not be inserted into the multiplexed bit stream until the audio encoder buffer delay time aebd has elapsed. However, dummy audio packets (or other useful information included in packets with the same size as audio packets) may be inserted into the multiplexed bit stream instead of audio packets before this time has elapsed. This maintains the video bit rate at the intended video bit rate, and prevents a temporary increase in the video bit rate that may violate the STD buffering constraints.

After the audio encoder buffer delay time aebd has elapsed, an actual audio packet is generated, and the header generator 204 will generate an audio packet header. If the audio packet includes an audio access unit header, the audio time stamp buffer 303 will feed the oldest audio PTS stored therein to the multiplexer 203A, and the multiplexer will include the PTS in the audio packet header. The audio PTS is fed via the adder 323, which increments the oldest audio PTS by the value the total_video_delay calculated by the total_video_delay calculating circuit 363, as described above.

As the multiplexer 203A transfers the audio stream from the audio output buffer 302 to the multiplexed bit stream S1A, the audio time stamp buffer 303 will discard those time stamps whose pointers point to addresses in the audio output buffer equal to the read pointer of the audio output buffer 302.

Audio packets will continue to be generated until all the audio stream generated by the audio encoder 202A from the audio input signal has been inserted into the multiplexed bit stream S1A. If, after this, any other elementary stream data needs to be transmitted, this stream data can be inserted into the multiplexed bit stream S1A. Otherwise, dummy packets are again inserted into the multiplexed bit stream S1A at regular intervals instead of actual audio packets in order to maintain the intended video bit rate.

Concerning case 2, in constant bit rate systems, the video encoder 201A monitors the occupancy of video output buffer 300, and can usually prevent the video output buffer 300 from becoming empty. The video encoder can generate additional video stream to refill the video output buffer by reducing the video compression ratio when the video output buffer approaches empty. If, despite such measures, the video output buffer 300 does become empty, the multiplexer 203A can include packets of other useful information in the multiplexed bit stream $S_{1A}$ instead of the video stream. If such useful information is not available, the multiplexer can include stuffing bits in the multiplexed bit stream to maintain the target bit rate.

In a variable bit rate system, the multiplexer 203A can simply wait until it is time to write an audio packet or, if it is too early to write an audio packet, it can wait until a new video access unit enters the video output buffer 300. This can then lead to generation of a new video packet.

Case 3 occurs when all the video input signal S2 has been converted into the multiplexed bit stream $S_{1A}$. The encoder may continue to generate other packets if data streams for such packets are still to be inserted in $S_{1A}$.

Figure 25:
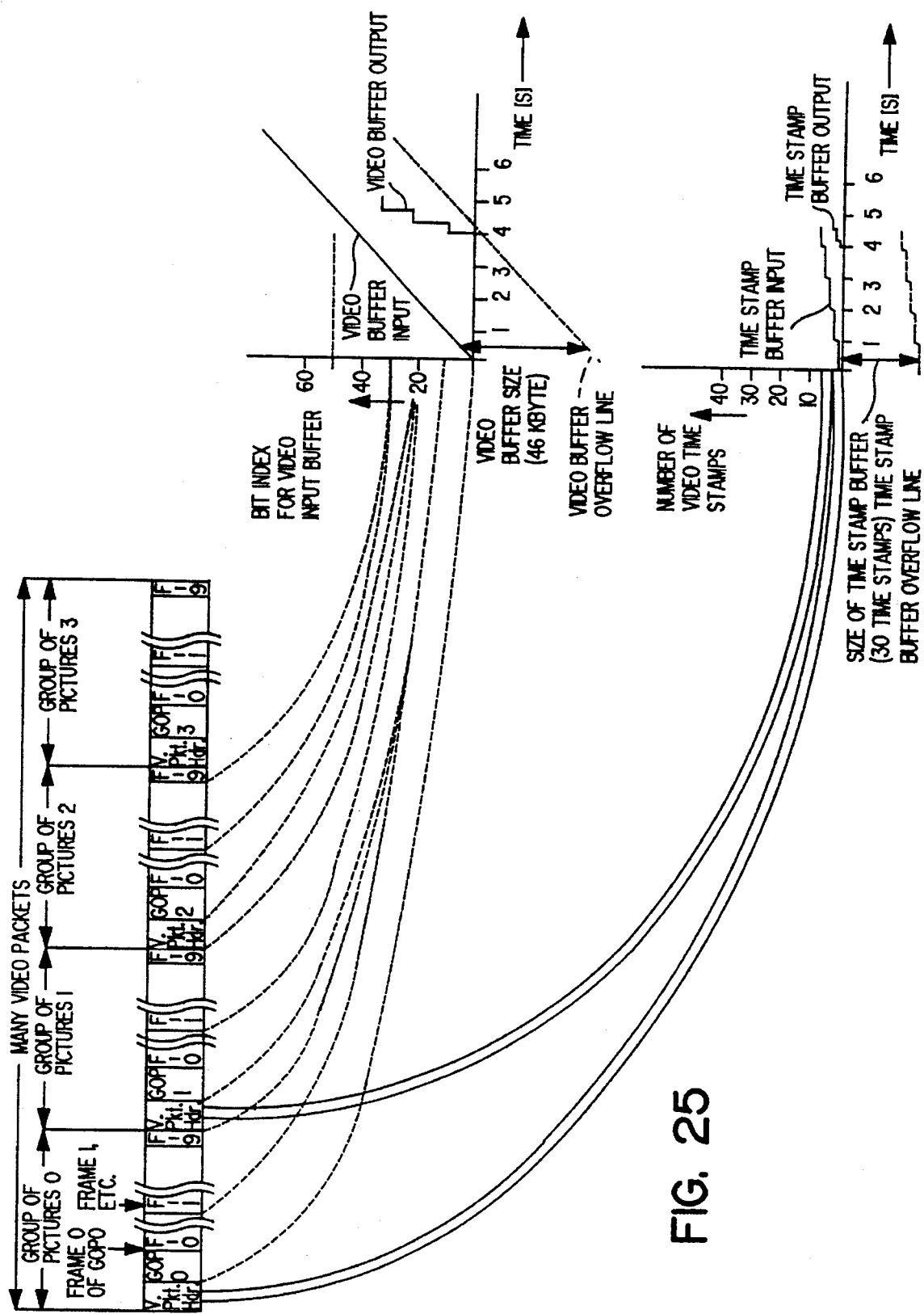
FIG. 25 shows the relationship between the structure of the multiplexed bit stream produced by the second embodiment of the encoder shown in FIG. 22A and the bit indices of the input of the video input buffer and the input and the output of the video time stamp buffer in the second embodiment of the decoder shown in FIG. 23.

FIG. 25 illustrates the operation of the decoder 6A with a low bit rate multiplexed bit stream. The low bit rate multiplexed stream shown in FIG. 25 does not comply with the MPEG-2 still picture video requirements set forth above. The MPEG standard provides a multiplexed bit stream including a video stream with a picture rate that is an integral fraction of the normal picture rate of about 25 or 30 frames per second (e.g., 1/x of the normal picture rate, where x is an integer). The highest picture rate allowed is one half of the normal picture rate. The MPEG standard leaves it to the decoder to perform non-standard processing to derive from the multiplexed bit stream a video signal with the normal pictures rate for feeding to a display device that requires a video signal with a normal picture rate. The decoder does this by reading out each of the decoded pictures stored in its output buffer several times (e.g., x times) at the normal picture rate. The additional processing required to decode the video stream with the below-normal picture rate increases the complexity and cost of the decoder.

Additional complexity in the decoder can be avoided by providing to the decoder a still picture video stream having a normal picture rate. An uncompressed still picture video signal consists of consecutive pictures at the normal picture rate. Consecutive pictures are identical except at the points in the video signal at which the picture changes. Such a still-picture video signal is encoded by coding the first picture after a picture change as an I-picture. All the other pictures in the video signal are also coded, but as minimal P-pictures. Each such P-picture consists of little more than headers, and its video stream consists of only a few hundred bits. Consequently, low bit-rate still picture video can be provided using a video stream that has a normal picture rate with only a slight reduction in the number of bits available to code the I-picture occurring after each picture change.

The structure of the multiplexed bit stream S5A received by the decoder 6A from the medium 5 is shown across the top of FIG. 25. The video stream consists of plural pictures at the standard picture rate, i.e., 25 or 30 frames per second. The pictures are grouped into groups of pictures (GOP), each of which begins with the first picture following a picture change (an I-picture), followed by a number of P-pictures. The number of P-pictures corresponds to the number of normal picture periods between each picture change in the still picture video signal, in the example shown, to nine picture periods. The GOPs are included in the video stream such that each GOP is preceded by a video packet header including time stamps.

FIG. 25 also shows, in the upper bit index curve, the bit index of the video input buffer 62 and, in the lower bit index curve, the bit index of the video time stamp buffer 72.

At the beginning of the video stream, the time stamp in the first video packet header is fed from the demultiplexer 61A into the video time stamp buffer 72.

Once the video packet header has been demultiplexed, the video stream of the first picture accumulates in the video input buffer at a substantially constant rate (the interruptions in the flow that occur each time an audio packet is fed into the audio input buffer 63 and each time a video packet header is demultiplexed have been omitted for clarity). The video stream is contained in several video packets due to the need to include audio packets at regular intervals in the multiplexed bit stream, and the requirement that a time stamp (which requires a video packet header) be included in the video stream at least once every 0.7 seconds. Due to the low input bit rate, it takes about one second for the video stream of one I-picture to accumulate in the video input buffer 62. Then, after the video stream of the first I-picture has been stored in the video input buffer, the video streams of the P-pictures following the I-picture are fed into the video input buffer.

When the picture header of the first picture in the video stream following the video packet header including a time stamp is written into the video input buffer, a pointer to the address of the picture header is written in a table in the video time stamp buffer 62.

During accumulation of the video stream in the video input buffer 62, additional time stamps accumulate in the video time stamp buffer 72, as shown in the lower bit index curve. These time stamps do not cause the video time stamp buffer to overflow because the encoder controlled the addition of time stamps to the video stream in consideration of the occupancy of the video time stamp buffer.

After the initial buffering delay, which allows sufficient video stream to accumulate in the video input buffer 62, the video stream of the first I-picture is removed from the video input buffer. In the example shown, the initial buffering delay is four seconds. Once the initial buffering delay is over, the video decoder 65 removes access units of the video stream from the video input buffer at the normal picture rate. During removal of these video streams from the video input buffer, the bit index shown in the Figure changes imperceptibly due to the small size of the video stream of these pictures. The video decoder also checks the table in the video input buffer using the read pointer to the video buffer 62. From the table, the video decoder can determine whether the picture has a time stamp (in still picture video, all the I-pictures will a time stamp, but not all the P-pictures will have a time stamp. In full motion video, not all pictures will have a time stamp since the time stamp buffer has insufficient size to accommodate a time stamp for every picture). If the picture has a time stamp, the time stamp for the picture will be removed from the video input buffer, and will be used to determine the decoding time of the picture, i.e., the time at which the video decoder will remove the video stream of the picture will be removed from the video input buffer for decoding. If the picture lacks a time stamp, the decoding time will be determined by the decoder clock. The resulting decoded pictures are fed to the decoder output at the normal picture rate to provide the still picture display.

In phase-locked systems, time stamps are only required to set the start up delays of the audio decoder and the video decoder. Because the decoders are locked to a common reference, there is no need to use the time stamps to maintain synchronism between the video decoder and the audio decoder. In such a system, the first audio time stamp and the first video time stamp are respectively used to set the audio start up delay and the video start up delay. All other time stamps are ignored.

In such a system according to the invention, the system target decoder is defined as follows. The video time stamp buffer 52 and the audio time stamp buffer 53 each have a size of only one time stamp. Operation of the video decoder 55 is defined so that it removes a time stamp from the video time stamp buffer only at the beginning of the multiplexed bit stream and at no other time. Operation of the audio decoder 56 is defined so that it removes a time stamp from the audio time stamp buffer 53 only at the beginning of the multiplexed bit stream and at no other time. The video decoder 55 and the audio decoder 56 are locked to a common clock reference.

With such a system target decoder, the encoder will add the first video time stamp generated and the first audio time stamp generated to the multiplexed bit stream. Since the STD will require no more time stamps, the encoder adds no more time stamps to the multiplexed bit stream. This gives the possibility to eliminate the time stamp fields from the packet headers, allowing the bits saved to be used for other purposes.

The invention has been described with respect to a system in which both audio and video streams are included in the multiplexed bit stream. However, the invention can be applied equally well to systems in which either an audio stream or a video stream is included in the multiplexed bit stream without the other. The invention can also be applied to streams resulting from compressing other types of information signal. The invention has also been described with respect to the MPEG-1 and MPEG-2 standards, but the invention can be applied equally well to information streams and bit streams that do not comply with the MPEG standards.

I claim:

1. A method of generating a bit stream by multiplexing non-compressed auxiliary information with an information stream, the information stream being obtained by compressing fixed-size units of an information signal with a varying compression ratio to provide varying-sized units of the information stream, the auxiliary information being for use in subsequently processing the information stream, the auxiliary information being composed of auxiliary information units, each of the auxiliary information units corresponding to one of the units of the information signal, the method comprising steps of:

dividing the information stream in time into information stream portions;

dividing the non-compressed auxiliary information in time into auxiliary information portions;

interleaving the information stream portions and the auxiliary information portions to provide the bit stream; and controlling the information stream dividing, auxiliary information dividing, and interleaving steps by emulating decoding of the bit stream by a hypothetical system target decoder including demultiplexer means for demultiplexing the bit stream, a serial arrangement of an information stream buffer and an information stream decoder, and a serial arrangement of an auxiliary information buffer and an auxiliary information processor, each serial arrangement being connected to the demultiplexer means, the information stream dividing, auxiliary information dividing, and interleaving steps being controlled such that the information stream buffer and the auxiliary information buffer neither overflow nor underflow.

2. The method of claim 1, wherein, in the step of controlling the information stream dividing, auxiliary information dividing, and interleaving steps:

the demultiplexer means receives the bit stream and extracts therefrom the information stream and the auxiliary information for feeding to the information stream buffer and the auxiliary information buffer, respectively;

the information stream buffer has a first target size;

the auxiliary information buffer has a second target size;

the information stream decoder removes the varying-sized units of the information stream from the information stream buffer at a first target timing; and the auxiliary information processor removes the corresponding auxiliary information units from the auxiliary information buffer at a second target timing.

3. The method of claim 2, wherein, in the interleaving step:

the bit stream comprises plural layers; and the information stream portions and the auxiliary information portions are interleaved in the same one of the plural layers of the bit stream.

4. The method of claim 3, wherein the auxiliary information includes directory information for the information stream.

5. The method of claim 4, wherein:

the information stream includes plural access points, access points being ones of the varying-sized units of the information stream that are expandable without requiring expansion of others of the varying-sized units of the information stream; and the directory information includes a unit of directory information relating to each of the access points.

6. The method of claim 5, wherein:

in the step of dividing the auxiliary information into auxiliary information portions, the directory information is divided into directory packets each including a number of the units of the directory information determined by the second target size;

in the step of dividing the information stream into information stream portions, each one of the information stream portions into which the information stream is divided includes the access points to which the directory information in a respective one of the directory packets relates; and in the interleaving step, the respective one of the directory packets is interleaved adjacent the one of the information stream portions.

7. The method of claim 2, wherein, in the interleaving step:

the bit stream comprises plural layers; and the information stream portions are interleaved in a first layer of the bit stream, and the auxiliary information portions are interleaved in a second layer of the bit stream, different from the first layer.

8. The method of claim 7, wherein the auxiliary information is a set of time stamps for decoding ones of the variable-sized units units of the information stream.

9. The method of claim 8, wherein:

in the controlling step, the auxiliary information buffer has an occupancy determined by the second target size, the auxiliary information fed from the demultiplexer means, and the auxiliary information removed by the auxiliary information processor;

the step of dividing the information stream into information stream portions divides the information stream into plural information packets;

the step of dividing the auxiliary information into auxiliary information portions results in auxiliary information portions each composed of one of the time stamps;

the step of interleaving the information stream additionally includes a step of generating an information packet header for each of the information packets; and in the step of interleaving the information stream portions and the auxiliary information portions, one of the auxiliary information portions is inserted into the information packet header of ones of the information packets selected according to the occupancy of the auxiliary information buffer.

10. The method of claim 8, wherein:

in the controlling step, the auxiliary information buffer has an occupancy determined by the second target size, the auxiliary information fed from the demultiplexer means, and the auxiliary information removed by the auxiliary information processor;

the step of dividing the information stream into information stream portions divides the information stream into plural information packets;

the step of dividing the auxiliary information into auxiliary information portions results in auxiliary information portions each composed of one of the time stamps;

the step of interleaving the information stream portions additionally includes a step of generating an information packet header for each of the information packets;

in the step of interleaving the information stream portions and the auxiliary information portions, the auxiliary information portions are periodically inserted into the information packet header of the information packets at a time stamp coding frequency; and in the controlling step, at least one of the time stamp coding frequency and the second target size is controlled in such a manner that maximizes the occupancy of the information stream buffer without causing the information stream buffer to overflow.

11. The method of claim 7, wherein:

the information stream decoder is one of plural information stream decoders, the information stream decoders being phase locked; and the auxiliary information buffer has a size set to accommodate one and no more than one auxiliary information unit.

12. An encoder for generating a bit stream, the encoder comprising:

means for compressing fixed-size units of an information signal with a varying compression ratio to provide varying-sized units of an information stream;

information stream dividing means for dividing the information stream in time into information stream portions;

auxiliary information dividing means for dividing non-compressed auxiliary information in time into auxiliary information portions, the auxiliary information being for use in subsequently processing the information stream, the auxiliary information being composed of auxiliary information units, each of the auxiliary information units corresponding to one of the units of the information signal;

multiplexing means for sequentially arranging the information stream portions and the auxiliary information portions to provide the bit stream, the multiplexing means including a control means for controlling the information stream dividing means and the auxiliary information dividing means by emulating decoding of the bit stream by a system target decoder including demultiplexer means for demultiplexing the bit stream, a serial arrangement of an information stream buffer and an information stream decoder, and a serial arrangement of an auxiliary information buffer and an auxiliary information processor, each of the serial arrangements being connected to the demultiplexer means, the control means controlling the information stream dividing means and the auxiliary information dividing means such that the information stream buffer and the auxiliary information buffer neither underflow nor overflow.

13. The encoder of claim 12, wherein:

the demultiplexer means receives the bit stream and extracts therefrom the information stream and the auxiliary information for feeding to the information stream buffer and the auxiliary information buffer, respectively;

the information stream buffer has a first target size;

the auxiliary information buffer has a second target size;

the information stream decoder removes the varying-sized units of the information stream from the information stream buffer at a first timing; and the auxiliary information processor removes the corresponding auxiliary information units from the auxiliary information buffer at a second target timing.

14. The encoder of claim 12, wherein:

the bit stream provided by the multiplexing means comprises plural layers; and the multiplexing means arranges the information stream portions and the auxiliary information portions in the same one of the plural layers of the bit stream.

15. The system of claim 12, wherein:

the bit stream provided by the multiplexing means comprises plural layers; and the multiplexing means arranges the information stream portions in a first layer of the bit stream and arranges the auxiliary information portions in a second layer of the bit stream, different from the first layer.

16. A system wherein an information signal is compressed for transfer, together with non-compressed auxiliary information, to a medium as a bit stream, and wherein the bit stream is transferred from the medium and is processed to recover the information signal by expansion, and to recover the auxiliary information, the auxiliary information being for use in subsequently processing the information signal, the system comprising:

an encoder comprising:

means for compressing the information signal to provide an information stream, fixed-sized units of the information signal being compressed using a varying compression ratio to provide varying-sized units of the information stream, and multiplexing means for sequentially arranging time-divided portions of the information stream and time-divided portions of the non-compressed auxiliary information to provide the bit stream for transfer to the medium, the multiplexing means including control means for determining a division of the information stream and of the auxiliary information into the respective time-divided portions by emulating decoding of the bit stream by a system target decoder including demultiplexer means for demultiplexing the bit stream, a serial arrangement of an information stream buffer and an information stream decoder, and a serial arrangement of an auxiliary information buffer and an auxiliary information processor, each of the serial arrangements being connected to the demultiplexer means, the information stream buffer and the auxiliary information buffer each having a size; and a decoder, comprising:

demultiplexing means for extracting the information stream and the auxiliary information from the bit stream transferred from the medium, first input buffer means for receiving the auxiliary information from the demultiplexing means, the first input buffer means having a size of at least the size of the auxiliary information buffer, means for removing each of the auxiliary information units from the first input buffer means, second input buffer means for receiving the information stream from the demultiplexing means, the second input buffer means having a size of at least the size of the information stream buffer, and decoder means for removing each one of the varying-sized units of the information stream from the second input buffer means, and for expanding the one of the varying-sized units of the information stream removed from the second input buffer means to recover a respective one of the fixed-sized units of the information signal.

17. The system of claim 16, wherein the control means determines the division of the information stream and of the auxiliary information into the respective time-divided portions such that the bit stream, when subject to the emulated decoding by the system target decoder causes the information stream buffer and the auxiliary information buffer neither to underflow nor overflow.

18. The system of claim 16, wherein: the bit stream provided by the multiplexing means has plural layers; and the multiplexing means arranges the time-divided portions of the information stream and of the non-compressed auxiliary information in the same one of the plural layers of the bit stream.

19. The system of claim 18, wherein the auxiliary information is directory information relating to the information stream.

20. The system of claim 19, wherein:

the information stream includes plural access points, access points being ones of the varying-sized units of the information stream that are expandable without requiring expansion of others of the varying-sized units of the information stream; and the directory information includes a unit of directory information relating to each one of the access points.

21. The system of claim 19, wherein:

the control means determines a division of the directory information into directory packets each including a number of units of the directory information, and determines a division of the information stream into the information stream portions such that each one of the information stream portions into which the information stream is divided includes the access points to which the directory information in a respective one of the directory; packets relates; and the multiplexing means multiplexes the respective one of the directory packets adjacent the one of the information stream portions.

22. The system of claim 16, wherein:

the bit stream provided by the multiplexing means has plural layers; and the multiplexing means arranges the information stream portions in a first layer of the bit stream and arranges the auxiliary information portions in a second layer of the bit stream, different from the first layer.

23. The system of claim 22, wherein the auxiliary information is a set of time stamps for decoding ones of the varying-sized units of the information stream.

24. The system of claim 23, wherein:

the auxiliary information buffer has an occupancy determined by the size of the auxiliary information buffer, the auxiliary information fed from the demultiplexer means, and the auxiliary information removed by the auxiliary information processor;

the control means is for:

determining a division of the information stream into plural information packets and generating an information packet header for each of the information packets, determining a division of the set of time stamps into auxiliary information portions each composed of one of the time stamps;

periodically inserting ones of the auxiliary information portions into the information packet header of selected ones of the information packets at a time stamp coding frequency; and controlling at least one of the time stamp coding frequency and the size of the auxiliary information buffer in such a manner that maximizes the occupancy of the information stream buffer without causing the information stream buffer to overflow.

25. A method of deriving a bit stream from an information signal, the method comprising steps of:

compressing units of the information signal to provide units of an information stream, the units of the information stream including access points, access points being ones of the units of the information stream that are expandable without requiring expansion of others of the units of the information stream;

deriving pointers from the information stream, each of the pointers pointing to one of the access points in the information stream; and multiplexing the information stream with the pointers to provide the bit stream, the information stream being multiplexed with the pointers by:
generating information packets each including a portion of the information stream,
generating pointer packets each including different ones of the pointers, and
locating a set of the information packets containing plural consecutive ones of the access points adjacent a one of the pointer packets containing ones of the pointers pointing only to the plural consecutive ones of the access points.

26. The method of claim 25, wherein the multiplexing step includes steps of:

generating dummy pointers, and generating pointer packets each including the dummy pointers;

multiplexing the information packets with the pointer packets including the dummy pointers prior to the deriving step; and overwriting the dummy pointers in each of the pointer packets in the bit stream with ones of the pointers derived in the deriving step, the ones of the pointers overwritten into each one of the pointer packets being the ones of the pointers pointing to the plural consecutive ones of the access points immediately preceding the one of the pointer packets in the bit stream.

27. A method of deriving a bit stream from an information signal, the method comprising steps of:

providing an encoder including:
means for compressing units of the information signal to provide units of an information stream,
first buffer means, having a size, for buffering the units of the information stream,
means for generating a time stamp when the first buffer means receives each of the units of the information stream,
second buffer means, having a size, for buffering the time stamps, and
multiplexing means for multiplexing the information stream from the first buffer means and the time stamps from the second buffer means to provide the bit stream;

defining a hypothetical system target decoder, the hypothetical system target decoder including demultiplexer means for demultiplexing the bit stream, a serial arrangement of an information stream buffer and an information stream decoder, and a serial arrangement of a time stamp buffer and a time stamp processor, each serial arrangement being connected to the demultiplexer means;

determining a first size for the first buffer means and a second size for the second buffer means by emulating decoding of the bit stream using the hypothetical system target decoder; and encoding the information signal using the encoder with the size of the first buffer means and the size of the second buffer means respectively set to the first size and the second size determined by the determining step.

28. The method of claim 27, wherein:

in the step of defining the system target decoder:
the information stream buffer and the time stamp buffer each have a size, and
the information stream decoder decodes the information stream in response to ones of the time stamps removed from the time stamp buffer by the time stamp processor; and in the determining step, the first size for the first buffer means and the second size for of the second buffer means are determined from the size of the information stream buffer and the size of the time stamp buffer.

29. The method of claim 28, wherein:

in the encoder, the multiplexing means periodically inserts the time stamps into the bit stream at a time stamp coding frequency;

the information stream has a bit rate; and the determining step includes steps of:
determining a buffering delay from the time stamp coding frequency and the bit rate, and
determining the first size for the first buffer means and the second size for the second buffer means from the buffering delay.

30. A decoder for a bit stream obtained by multiplexing non-compressed auxiliary information with an information stream, the information stream being obtained by compressing fixed-size units of an information signal with a varying compression ratio to provide varying-sized units of the information stream, the auxiliary information being for use in subsequently processing the information stream, the auxiliary information including auxiliary information units, each of the auxiliary information units corresponding to one of the units of the information signal, the decoder comprising:

demultiplexing means for extracting the information stream and the auxiliary information from the bit stream;

first input buffer means for receiving the auxiliary information from the demultiplexing means;

removing means for removing each of the auxiliary information units from the first input buffer means;

second input buffer means for receiving the information stream from the demultiplexing means; and decoder means for removing one of the varying-sized units of the information stream from the second input buffer means in response to each of the auxiliary information units removed from the first input buffer means by the removing means, and for expanding the one of the varying-sized units removed from the second input buffer means to recover a respective one of the fixed-size units of the information signal.

31. The decoder of claim 30, wherein the decoder means removes the one of the varying-sized units of the information stream from the second input buffer means at a time indicated by each of the auxiliary information units removed from the first input buffer means by the removing means.

* * * * *